United States Patent
Enomoto et al.

[11] Patent Number: 5,833,160
[45] Date of Patent: Nov. 10, 1998

[54] PHOTO FILM CASSETTE INCLUDING AN IMPROVED FLANGE DESIGN FOR RETAINING THE FILM

[75] Inventors: Masahiro Enomoto; Mototada Yasui; Masuhiko Hirose; Seiichi Watanabe; Keiji Shigesada; Takashi Ohgiyama; Naoyoshi Chino, all of Kanagawa, Japan

[73] Assignee: Fuji Photo Film Co., Ltd., Kanagawa, Japan

[21] Appl. No.: 531,966

[22] Filed: Sep. 21, 1995

[30] Foreign Application Priority Data

Sep. 21, 1994 [JP] Japan .................................. 6-226895
Mar. 15, 1995 [JP] Japan .................................. 7-056308

[51] Int. Cl.$^6$ .................................................. G03B 23/02
[52] U.S. Cl. ........................ 242/348; 396/512; 242/614.1
[58] Field of Search ............................... 242/348, 348.4, 242/357, 614, 614.1; 396/511, 512, 514, 516

[56] References Cited

U.S. PATENT DOCUMENTS

| | | |
|---|---|---|
| 4,832,275 | 5/1989 | Robertson . |
| 4,834,306 | 5/1989 | Robertson et al. . |
| 4,848,693 | 7/1989 | Robertson . |
| 4,875,638 | 10/1989 | Harvey ..................... 396/512 |
| 5,083,155 | 1/1992 | Kataoka et al. . |
| 5,151,730 | 9/1992 | Kemp et al. . |
| 5,211,348 | 5/1993 | Enomoto . |
| 5,251,841 | 10/1993 | Takatori et al. ........... 242/348 |
| 5,262,811 | 11/1993 | Zander et al. ............. 242/348 |
| 5,271,577 | 12/1993 | Takahashi et al. . |
| 5,296,887 | 3/1994 | Zander . |
| 5,407,146 | 4/1995 | Takahashi et al. . |
| 5,570,152 | 10/1996 | Kaya ........................ 396/515 |

FOREIGN PATENT DOCUMENTS

| | | |
|---|---|---|
| 4026196 | 1/1963 | Japan . |
| 4310362 | 12/1964 | Japan . |
| 6-148808 | 5/1994 | Japan . |
| 6-68047 | 9/1994 | Japan . |

*Primary Examiner*—Donald P. Walsh
*Assistant Examiner*—William A. Rivera
*Attorney, Agent, or Firm*—Sughrue, Mion, Zinn, Macpeak & Seas, PLLC

[57] ABSTRACT

A photo film cassette includes a spool core, on which the photo film is wound in a form of roll. A cassette shell contains the spool core in rotatable fashion. First and second flanges are respectively secured to ends of the spool core, for regulating positions of sides of the photo film roll. A first ring-like lip is formed integrally with a periphery of the first flange, is projected toward the roll, is contacted on one edge of an outermost turn of the roll, and prevent the roll from being loosened. The first and second flanges are formed from resin in accordance with injection molding. The resin has temperature of thermal deformation being 80° C. or higher under 18.6 kg/cm$^2$, modulus in elasticity in flexure being 13,000–30,000 kg/cm$^2$, surface hardness being 80 or more in Rockwell R-scale, and high fluidity in molds for the injection molding. The first and second flanges have an outer diameter of 15 mm or more, thickness of 0.3 mm or less, and a maximum projected area of 100 mm$^2$ or more as measured with a contour thereof kept substantially circular.

27 Claims, 42 Drawing Sheets

F I G. 15A
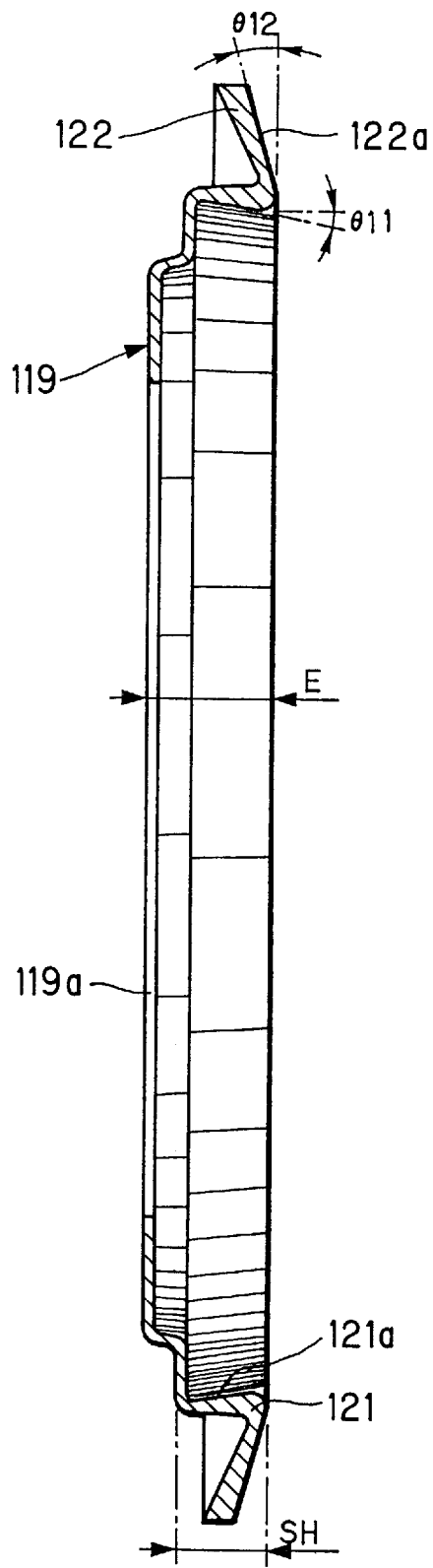
F I G. 15B
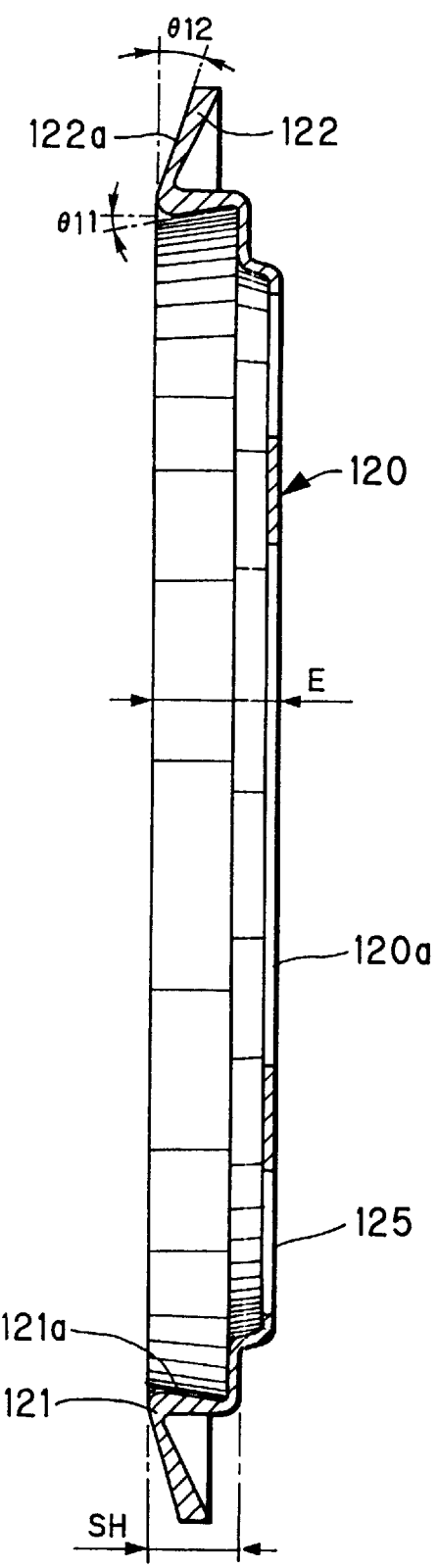

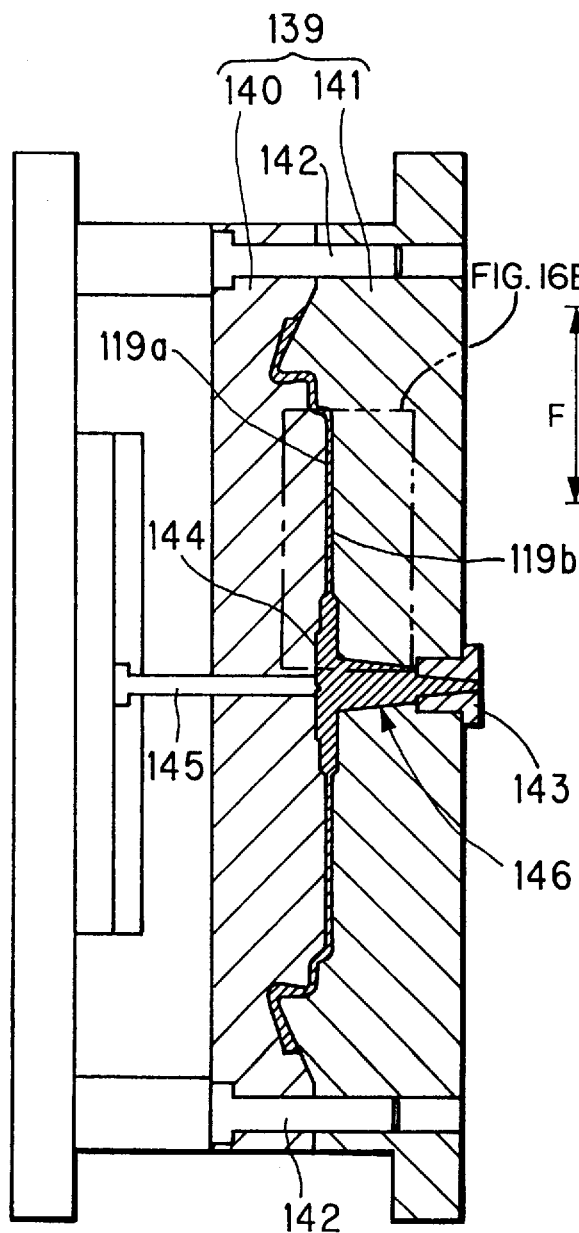
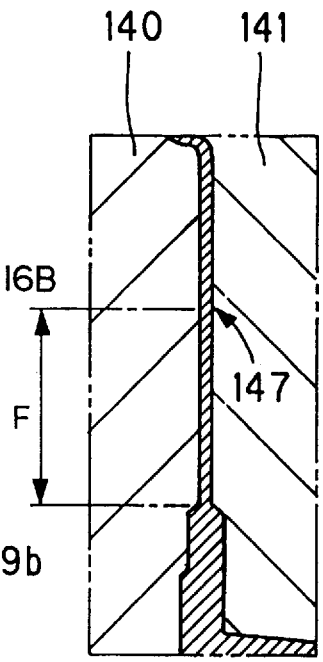
FIG. 16A
FIG. 16B

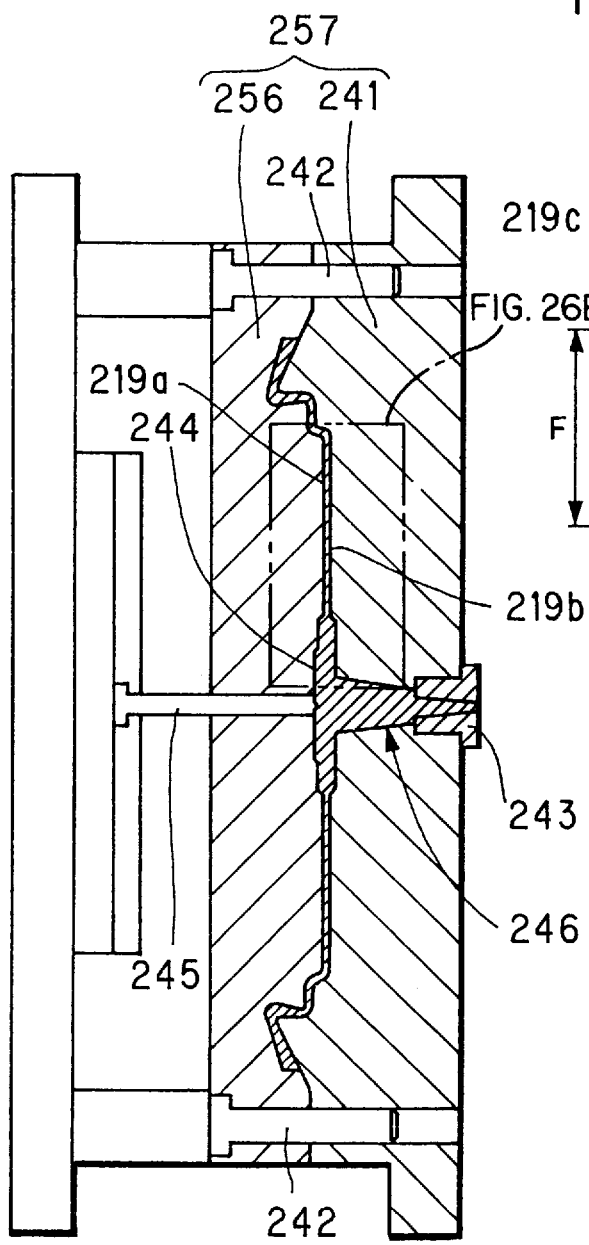
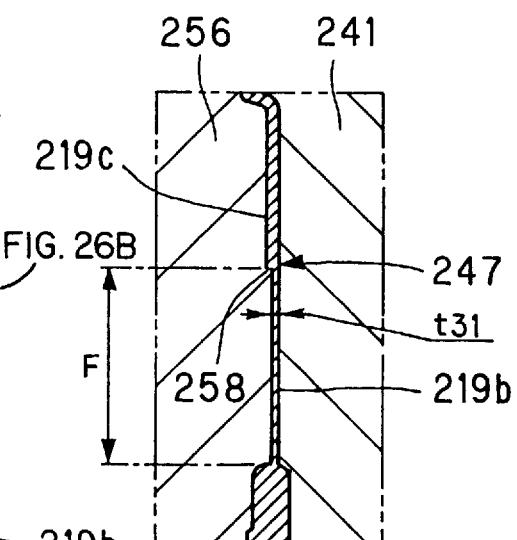
FIG. 26A
FIG. 26B

F I G. 28
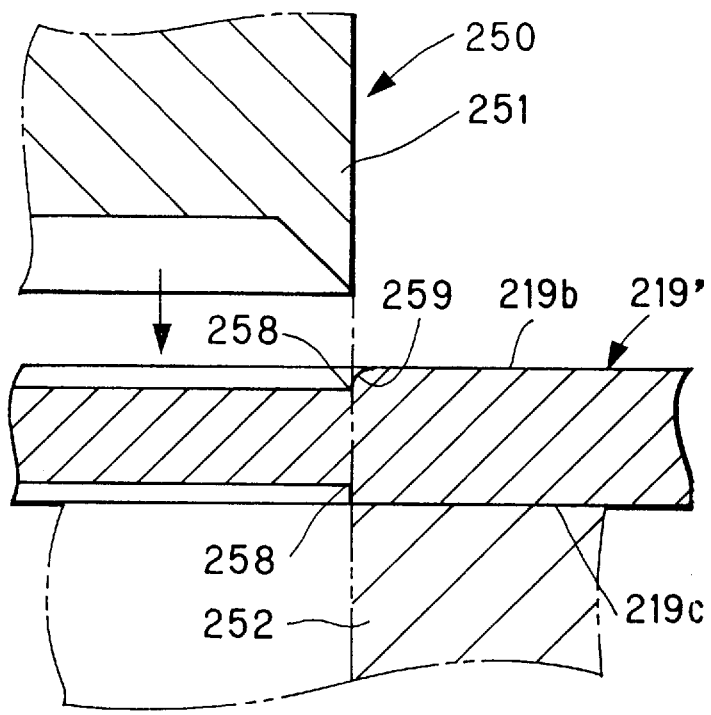

FIG. 29A   FIG. 29B
FIG. 29C
FIG. 29D
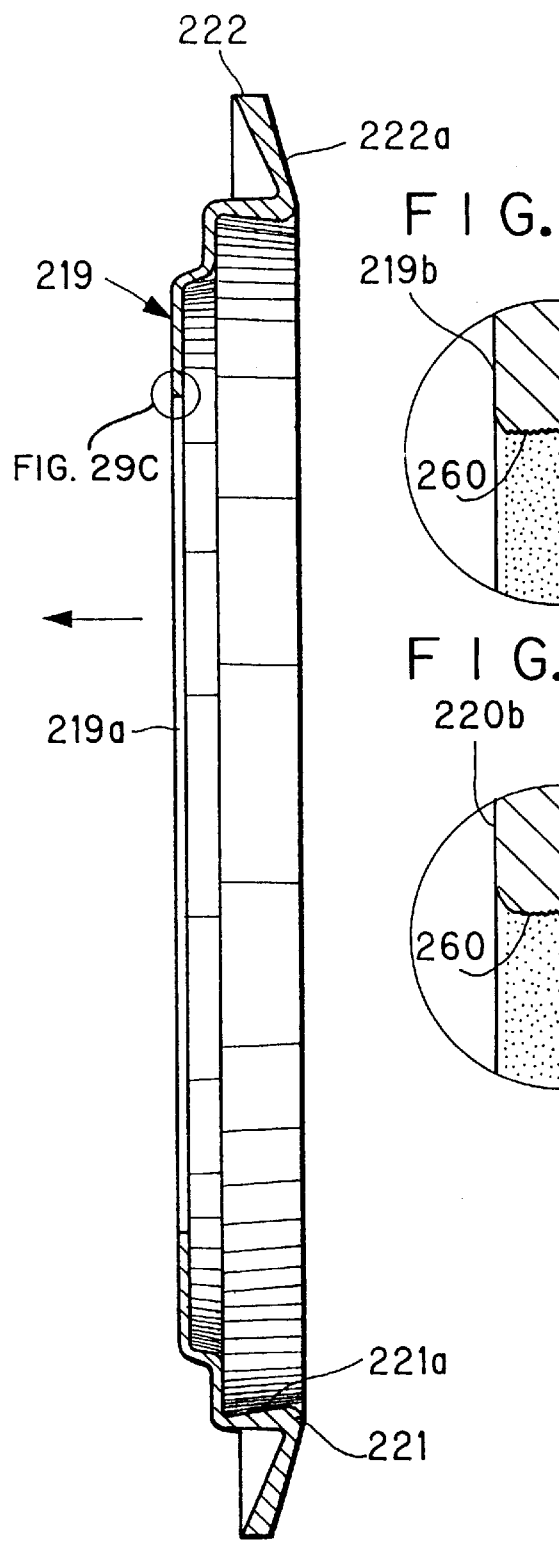
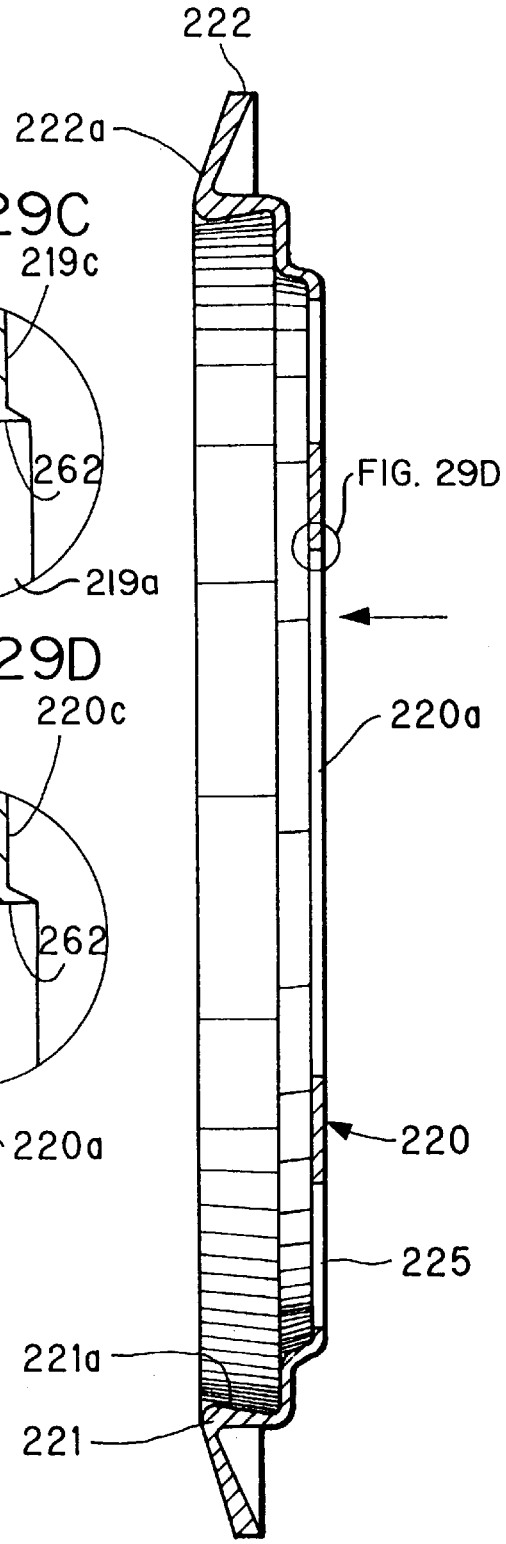

FIG. 30A  FIG. 30B
FIG. 30C
FIG. 30D
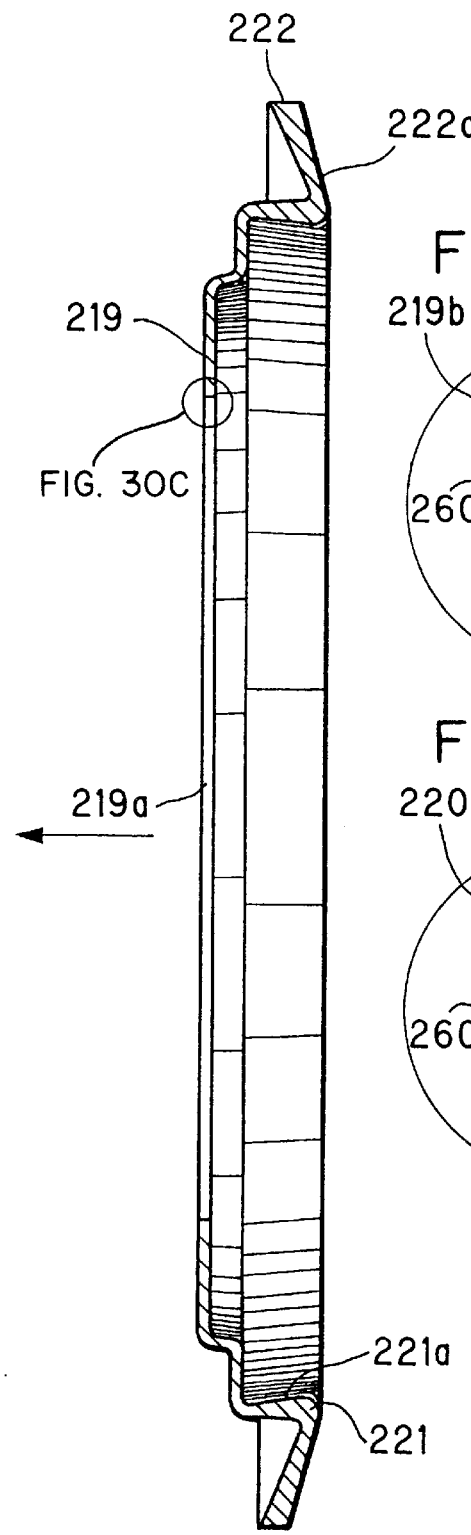
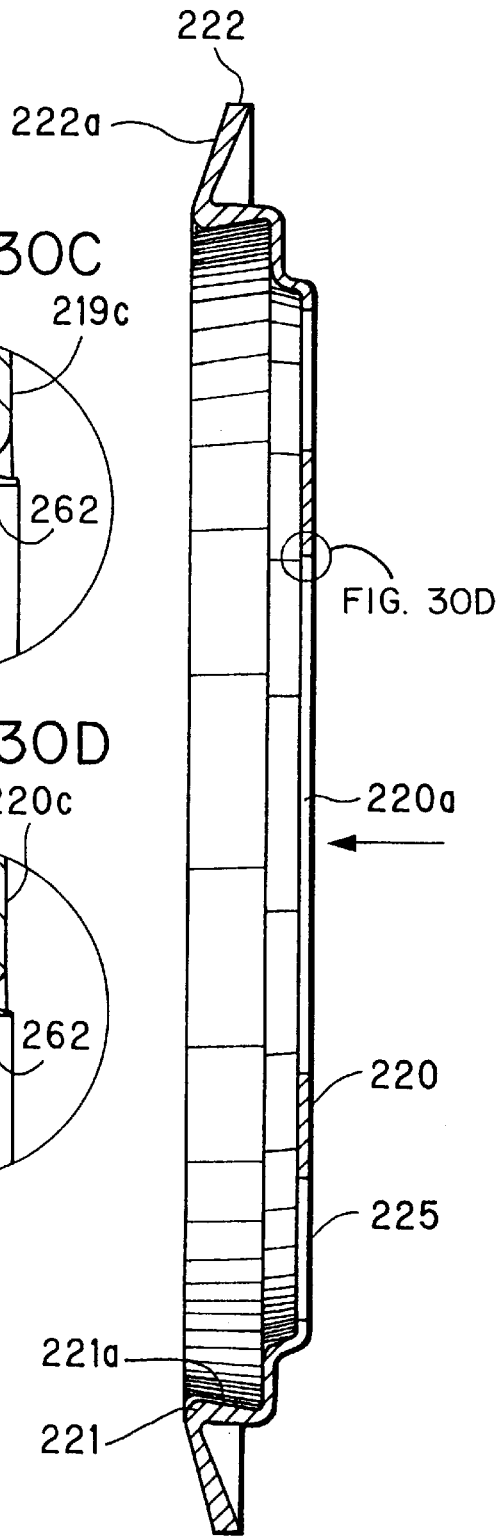
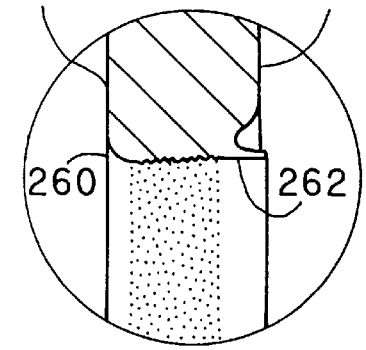
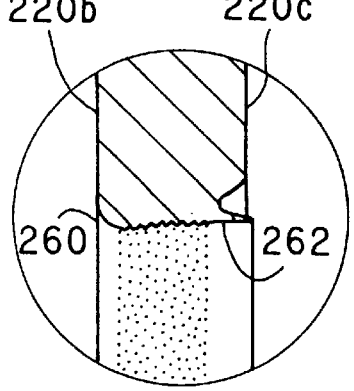

FIG. 31A   FIG. 31B
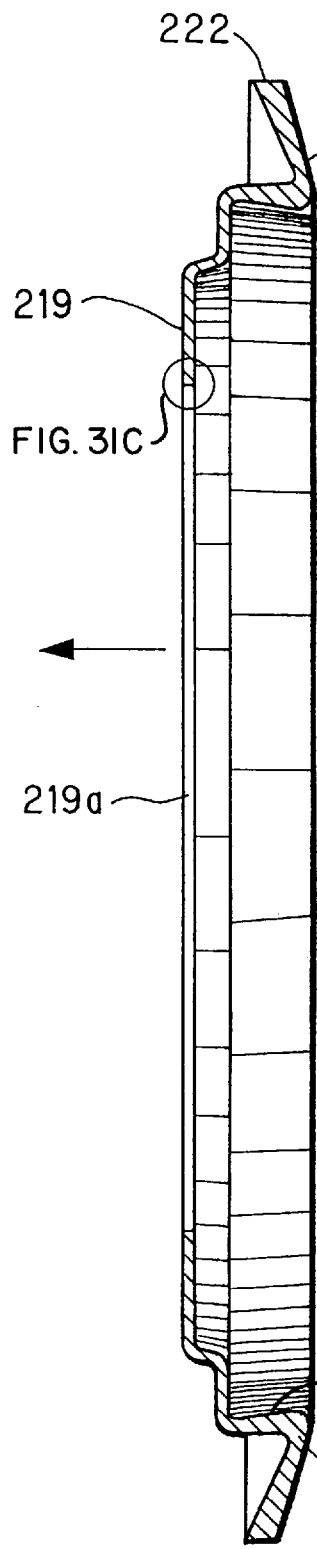
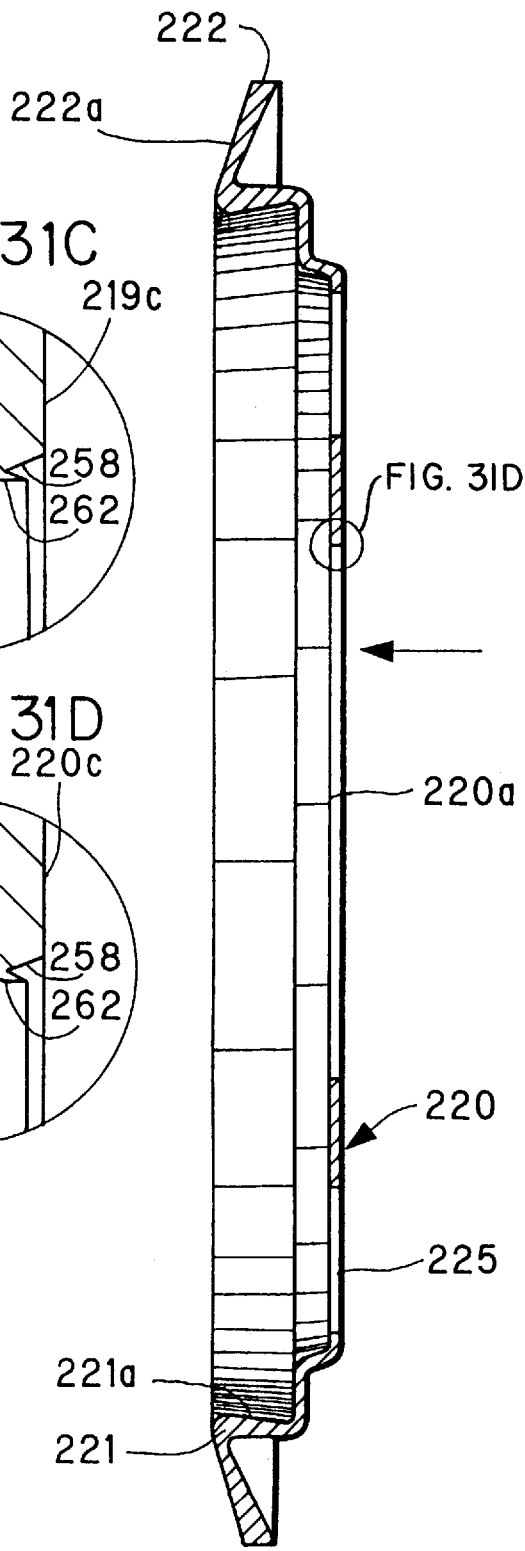
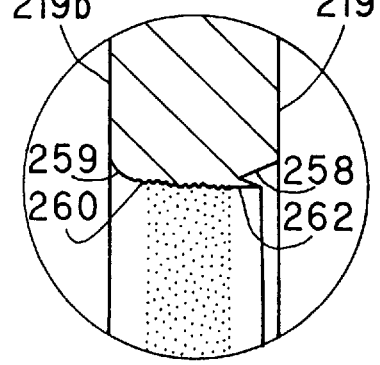
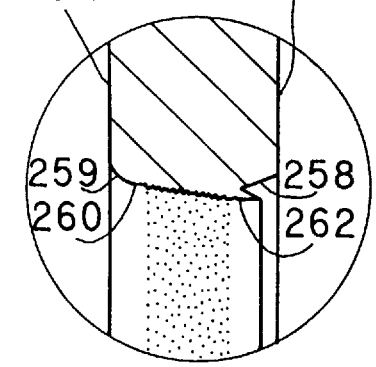

F I G. 33
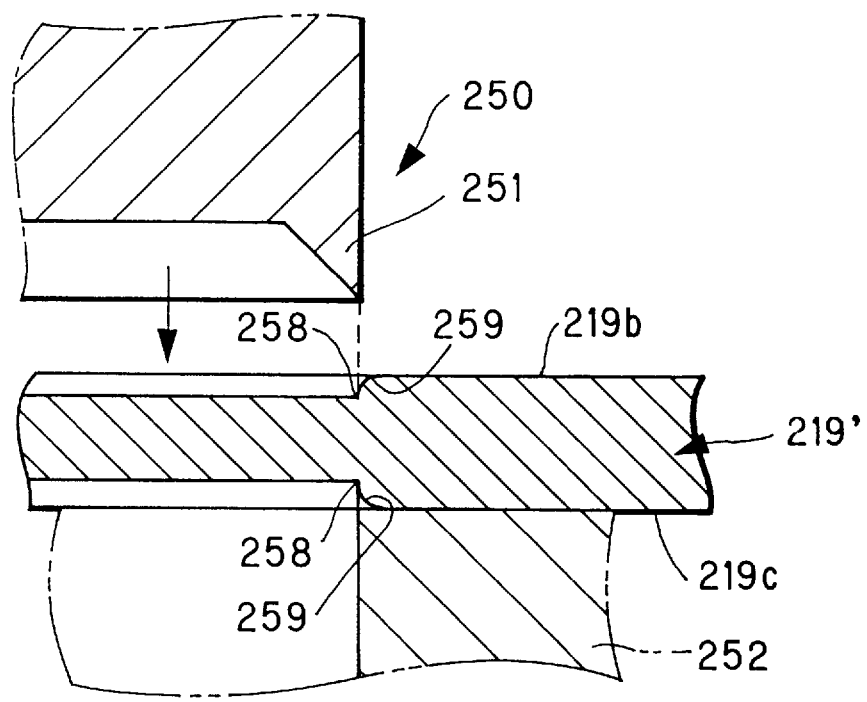

F I G.35
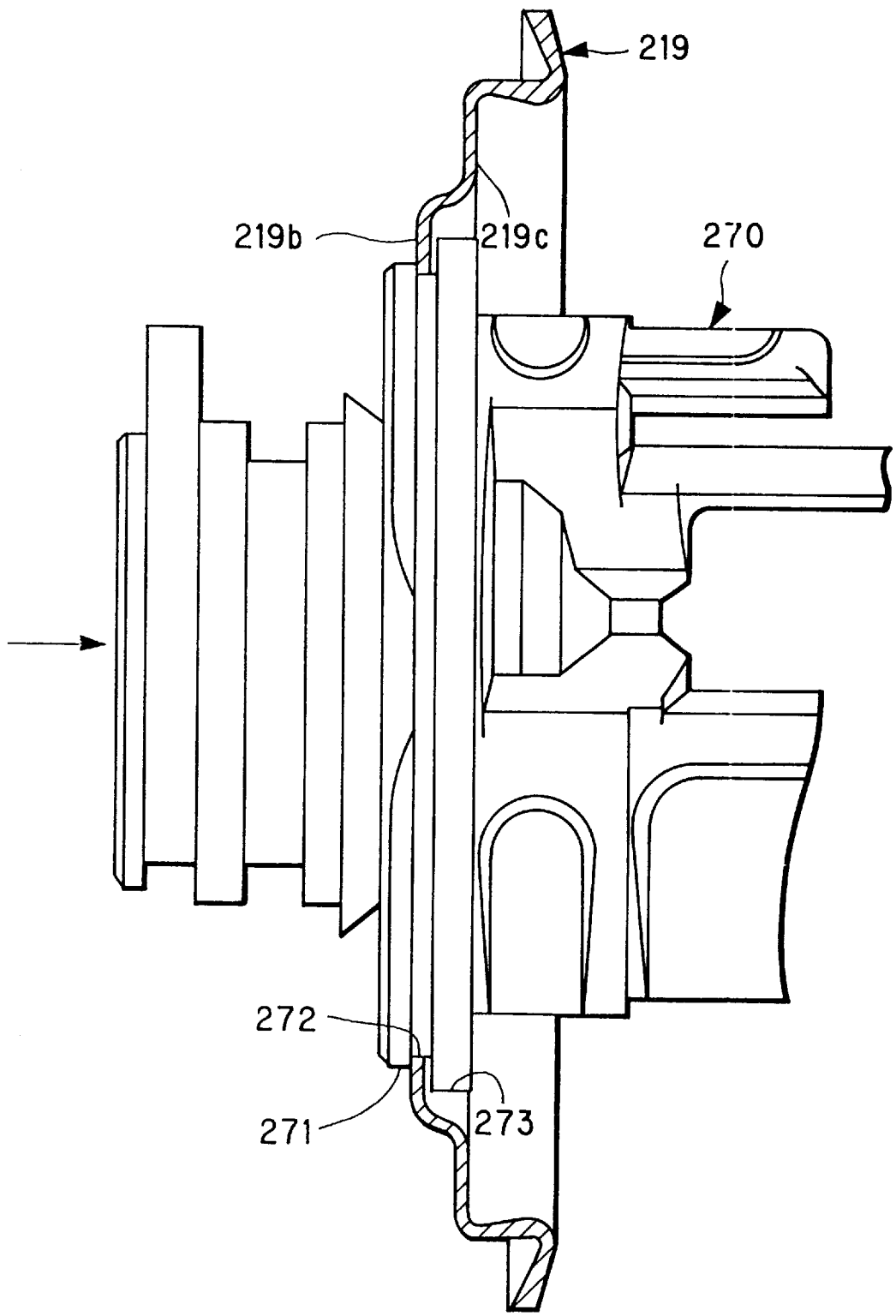

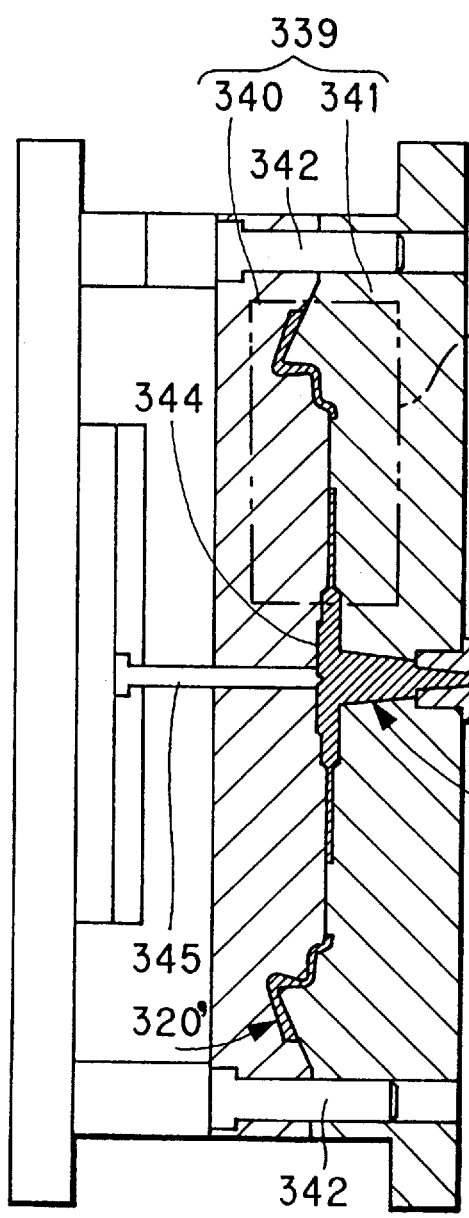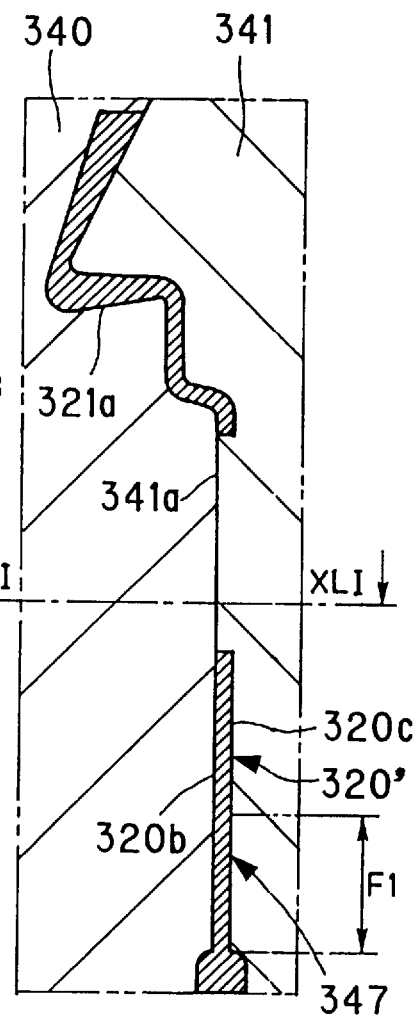

F I G. 40
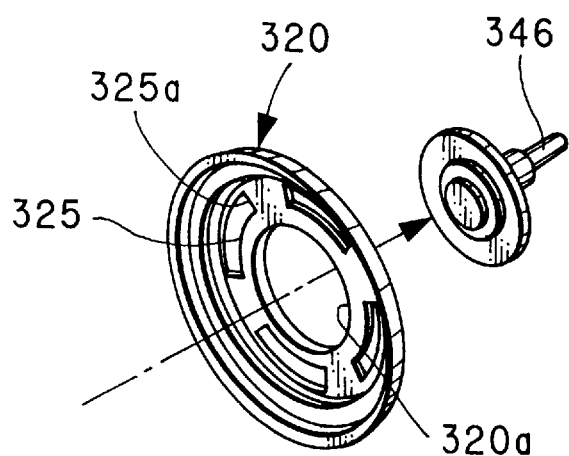

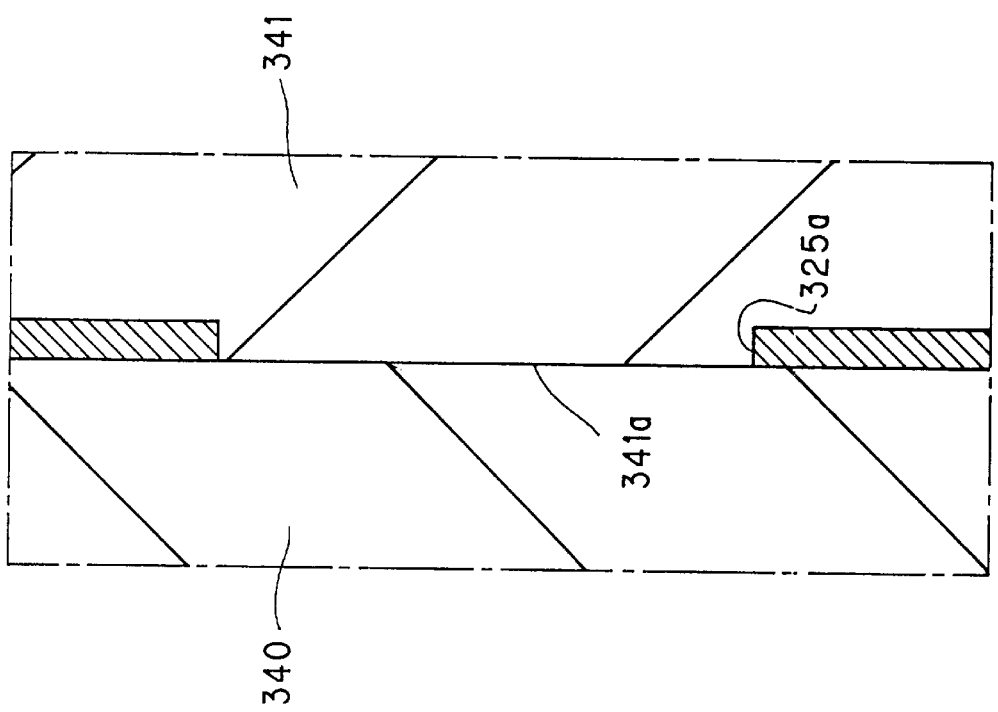
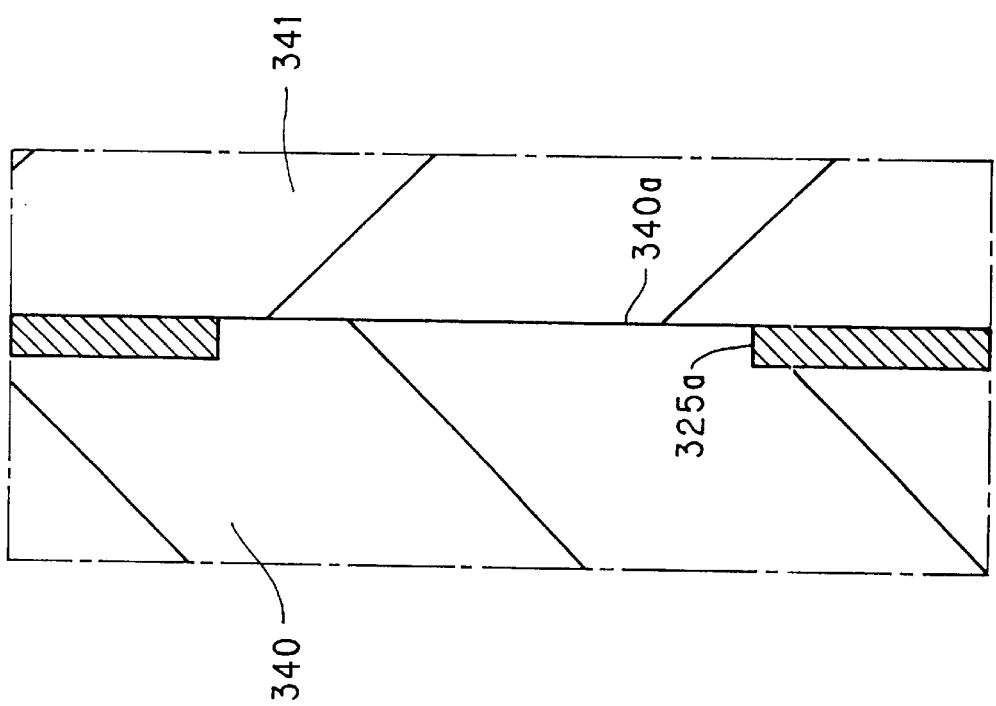

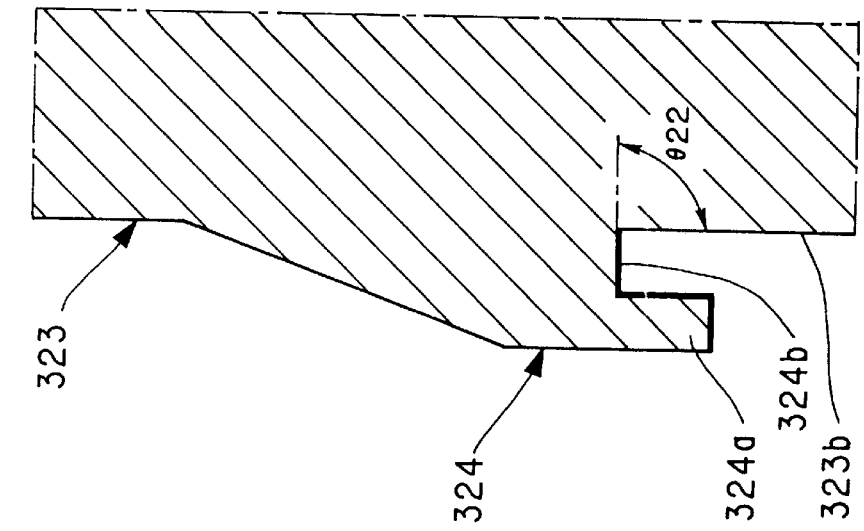

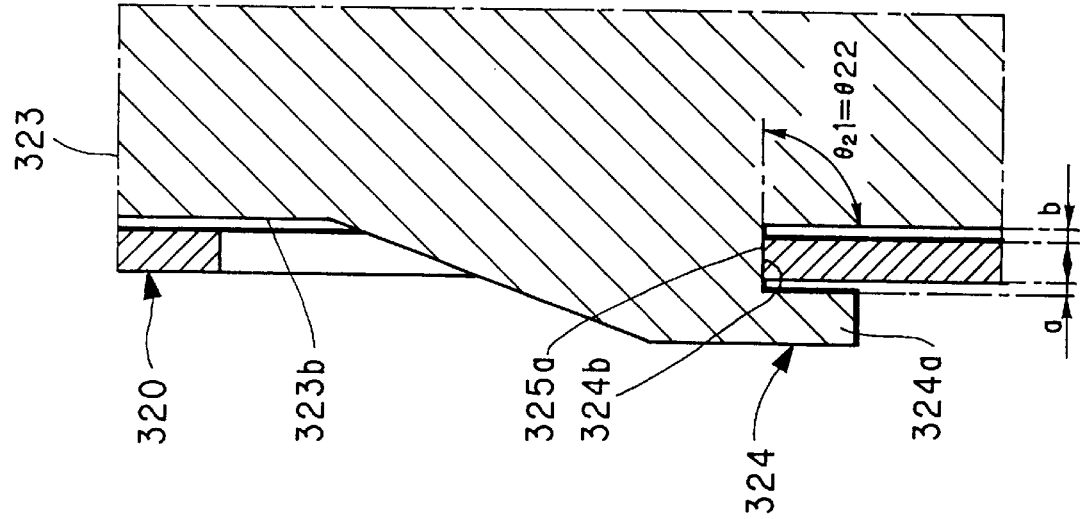
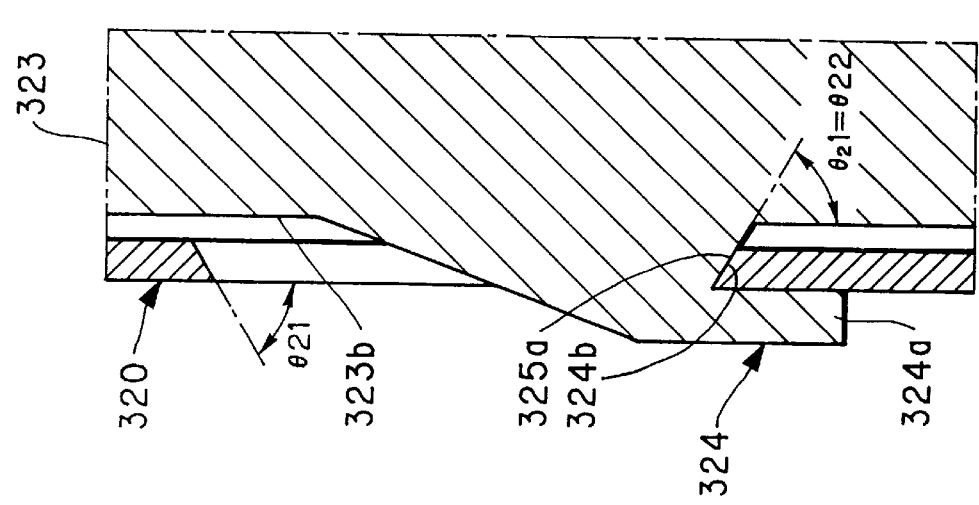

PHOTO FILM CASSETTE INCLUDING AN IMPROVED FLANGE DESIGN FOR RETAINING THE FILM

BACKGROUND OF THE INVENTION

1. Field of the Invention

The present invention relates to a photo film cassette containing a photo film. More particularly, the present invention relates to an improvement of a photo film cassette of which a leader of the photo film is exited by rotation of a spool in an unwinding direction.

2. Description Related to the Prior Art

There is a type of photo film cassette, of which a leader of unexposed photo film is pre-contained in the cassette shell, and advanced to an outside of the cassette shell when a spool is rotated in an unwinding direction. Such a type of cassette is suggested in U.S. Pat. Nos. 4,832,275, 4,834,306, 4,848,693 (corresponding to JP-A 2-18545), 5,151,730 (corresponding to JP-A 4-320258), 5,271,577 (corresponding to JP-A 3-37645), 5,296,887, and 5,407,106 (corresponding to JP-A 3-37645). Also, there is a cartridge for containing a developed photo film having the same structure as the above type, for facilitating the handling and the preservation of the developed photo film, as disclosed in U.S. Pat. No. 5,083,155 (corresponding to JP-A 3-179341).

The spool is constituted of a spool core and two flanges, which are disposed on the spool core, for contact with the ends of a roll of the photo film, to restrain the turns of the photo film. In the cassette of the leader-advancing type, it is necessary to transmit rotation of the spool to the roll of the photo film. To this end, the flanges of the spool are provided with respective ring-like lips formed on their periphery and projected toward one another. The ring-like lips are located to cover edges of the outermost turn of the photo film, and prevent the roll from being loosened.

To advance the leader of the photo film, it is necessary to spread both flanges in the vicinity of a photo film passageway, to release the ring-like lips from regulation. The flanges are rotatable, and are not rotated without being deformed. The flanges are formed with a small thickness. But the same flanges require sufficient rigidity, resistance to abrasion, and amounts of other characteristics.

To impart adequate characteristics to flanges, such as rigidity and resistance to abrasion, it is necessary to select resin suitably as a raw material. The method of forming the flanges must be also considered in the selection of the resin. There are suggestions of a preferred resin and forming method in U.S. Pat. No. 5,211,348 (corresponding to JP-A 4-251841) and JP-A 6-148808. In those suggestions, a continuous resin sheet of a polyethylene type having a small thickness (0.3 mm) is formed by extrusion. The continuous sheet is thermoformed in a forming step in accordance with the vacuum forming or pressure forming. The continuous sheet is punched in a regular shape in a punching step, to form the flanges.

In this method of producing flanges, a continuous sheet of resin is drawn from a sheet roll, is heated in a heating step, and subjected to the vacuum forming or pressure forming in the forming step. The continuous sheet is punched in the punching step, to obtain the flanges. The sheet is withdrawn in a withdrawing step. It is inevitable that a manufacturing system for those steps is large and expensive. The withdrawn sheet after the punching step is surplus remaining as waste of raw material. Also, there is a low precision of sizes of the molded pieces due to the vacuum forming or pressure forming and the pieces cannot be formed at a precise desired thickness.

In the known cassette of the leader-advancing type, there is a separator claw formed integrally with the cassette shell. To advance the leader of the photo film to the outside, the separator claw is contacted on an end of the leader during the rotation, separates it from the roll, and directs it to the outside of the cassette shell through the photo film passageway.

To release the photo film from contact with ring-like lips, there are several known structures. In one of the structures, a pair of separator claws are formed to lie in positions along a width of the photo film. Support portions of the separator claws operate to deform part of the ring-like lips in directions away from one another. In another structure, a single separator claw is formed. After the separator claw separates an end of the leader from the roll of the photo film, side edges of the photo film spread the ring-like lips in directions away from one another in partial deformation.

It is inevitable that the photo film has high rigidity. When the photo film is wound in a roll form, the photo film has considerably great force tending to recover its original straight form. The ring-like lips require resistance to the recovering force of the photo film to prevent the roll of the photo film from being loosened. To avoid deformation or the spreading of ring-like lips, there is a proposal in JP-U 68047 in which a greater thickness is imparted to the ring-like lips for the purpose of reinforcement.

Inside the cassette shell, there is high friction between the outer turns of the photo film and the inside faces of the ring-like lips. The ring-like lips are likely to be rubbed and worn, so that resin powder is created. It is likely that the resin powder exits with the photo film from the cassette shell, contaminates the inside of a camera, and is photographed with an image on the photo film. In view of reducing the friction between the photo film and the ring-like lips, there are documents, such as U.S. Pat. No. 4,848,693 and JP-U 6-68047, proposing flanges of which a ring-like lip has an inside face inclined as viewed in cross section, the inclination being in a direction away from an axis of the spool in accordance with the increase in the height of the ring-like lip.

Having the inclination, the inside face of the ring-like lips is an undercut to be released from a mold, in forming the flanges by the injection molding. It is likely in the injection molding that the undercut of the molded piece fails to be ejected, and if ejected forcibly, cannot resist deformation.

To avoid deformation of ring-like lips against the recovering force of the photo film in the roll form, there is also a suggestion in which ring-like lips are provided with respective ring-like projections, which are formed on their periphery and projected away from a rotational axis of the spool.

As referred to above, the plural known structures may release the photo film from regulation of looseness in contact with ring-like lips. Certainly the leader of the photo film is easy to advance. However, there are shortcomings: the ring-like projections are contacted on the photo film and/or the support portions of the separator claws, and are likely to be rubbed and worn. To reduce friction between the photo film and the ring-like projections, U.S. Pat. No. 4,848,693 proposes flanges of which a ring-like projection has inclination in a direction opposite to a projected direction of the ring-like lip. Namely, the two ring-like projections are inclined to come away from one another in their projected direction around the ring-like lips. The inside faces of the two ring-like projections operate for guiding the photo film into the space between the ring-like lips while the photo film is wound.

While the spool is rotated in the direction of winding the photo film, tension is being applied to the photo film. The photo film passes between the ring-like lips, and is wound about the spool core safely. But without application of the tension to the photo film, there is a problem in that rotation of the spool core causes the photo film to wind on the ring-like projections, not on the spool core. The ring-like projections are likely to collapse in such a case. The failure in guiding the photo film into a space between the ring-like lips is remarkably serious when the ring-like projections have a considerably great angle of inclination.

However, the flange producing method in U.S. Pat. No. 5,211,348 and JP-A 6-148808 has a problem in that it is difficult to form the inclination in a tolerable range of a predetermined angle, in view of low precision of the shape of the molded pieces due to the vacuum forming or pressure forming. No suitable inclination can be formed in a range resistant to the collapse in contact with the photo film.

In consideration of forming flanges by the injection molding capable of production at high speed, at large scale and with automation, a mold mark remaining on a molded flange is a problem in that it causes scratches to the photo film and difficulties in the film advancement. The construction of a gate of molds thus requires improvement. With the ring-like lips and ring-like projections formed about the somewhat thin flanges, melted resin flows only slowly to the distal end of the molds. The injection molding is thus likely to cause unwanted creation of short shot and sink marks locally.

SUMMARY OF THE INVENTION

In view of the foregoing problems, an object of the present invention is to provide a photo film cassette of which flanges of a spool can be produced precisely with great ease.

Another object of the present invention is to provide a photo film cassette with a spool of which a flange is moldable with a ring-like lip in reliably safe release from a mold, even though the ring-like lip has an undercut.

An additional object of the present invention is to provide a photo film cassette with a spool of which a ring-like projection is resistant to collapse, the ring-like projection being formed around a ring-like lip projected around each flange of the spool.

A further object of the present invention is to provide a photo film cassette in which two flanges can be easily secured to a spool core.

Still another object of the present invention is to provide a photo film cassette with a spool of which edges of engaging openings are resistant to applied force, the engaging openings being formed in one of two flanges of the spool for transmission of rotation of the spool core to flange.

In order to achieve the above and other objects and advantages of this invention, a photo film cassette includes a spool core, on which the photo film is wound in a form of roll. A cassette shell contains the spool core in rotatable fashion. First and second flanges are respectively secured to ends of the spool core, for regulating positions of sides of the photo film roll. A first ring-like lip is formed integrally with a periphery of the first flange, is projected toward the roll, is contacted on one edge of an outermost turn of the roll, and prevents the roll from being loosened. The first and second flanges are formed from resin by injection molding. The resin has temperature of thermal deformation of 80° C. or higher under 18.6 kg/cm$^2$, a modulus of elasticity in flexure of 13,000–30,000 kg/cm$^2$, a surface hardness of 80 or more in Rockwell R-scale, and a high fluidity in molds for the injection molding. The first and second flanges have an outer diameter of 15 mm or more, a thickness of 0.3 mm or less, and a maximum projected area of 100 mm$^2$ or more as measured with a contour thereof kept substantially circular.

In a preferred embodiment, the ring-like lip has an inside face contacted with the outermost turn of the roll. The inside face is inclined at angle of 2–10 degrees to come nearer to the spool core in a projected direction of the ring-like lip from the first flange. The ring-like lip has increasing thickness in the projected direction.

In another preferred embodiment to produce the flanges, first and second disk pieces to be the first and second flanges are molded. A punch device is moved through a middle of the first and second disk pieces, and in a direction of relative movement of the spool core in insertion through the first and second flanges, to punch the first and second bearing holes in the first and second flanges.

In a further preferred embodiment, plural engaging openings are formed in the first flange and arranged about the first bearing hole, and formed in injection molding for the first flange. A barrel member is secured to the spool core and contacted on an exterior face of the first flange. A ratchet claw is disposed on the barrel member, and includes: a claw base portion projected from the barrel member toward the first flange; and a claw tip portion formed on the claw base portion, projected in a rotational direction of unwinding the photo film about the spool core, and engaged with one of the engaging openings when the spool core is rotated in the unwinding direction to transmit rotation of the spool core to the first flange. The ratchet claw is free from the one engaging opening during rotation of the spool core in a winding direction. A gap bottom is defined on the ratchet claw and between the claw tip portion and the barrel member, formed in inclination, and contacted on an engaging edge of the engaging openings in the unwinding direction. The engaging edge of the engaging openings is inclined in a direction of being fitted on the gap bottom.

In still another preferred embodiment, a ring-like projection is formed on a periphery of the ring-like lip in a radial direction of the first flange. The ring-like projection is inclined away from the roll at an angle of 1–30 degrees with reference to the radial direction of the first flange, and has increasing thickness in the radial direction of the first flange.

BRIEF DESCRIPTION OF THE DRAWINGS

The above objects and advantages of the present invention will become more apparent from the following detailed description when read in connection with the accompanying drawings, in which:

FIGS. 15A and 15B are cross sections illustrating two flanges in the cassette of FIG. 14;

FIG. 16A is a cross section illustrating a mold set for the injection molding of a molded piece for the flange of FIG. 15A;

FIG. 16B is an enlargement of a portion of the mold set of FIG. 16A;

FIG. 26A is a cross section illustrating a variant, where a mold set is used for molding a piece to be the flange of FIG. 22;

FIG. 26B is an enlargement of a portion of the mold set of FIG. 26A;

FIG. 28 is an explanatory view in cross section, illustrating a variant shape of a molded piece to be the flange of FIG. 22;

FIGS. 29A and 29B are cross sections illustrating the flanges punched from the molded pieces of FIGS. 24 and 25;

FIGS. 29C and 29D are enlarged views of the flange showing a broken face formed on the punched edge of the bearing holes;

FIGS. 30A and 30B are cross sections illustrating the flanges punched from each molded piece of FIG. 26;

FIGS. 30C and 30D are enlarged views of the flange showing a broken face formed on the punched edge of the bearing holes;

FIGS. 31A and 31B are cross sections illustrating the flanges punched from each molded piece of FIG. 28;

FIGS. 31C and 31D are enlarged views of the flange showing a broken face formed on the punched edge of the bearing holes.

FIG. 33 is an explanatory view in cross section, illustrating still another variant shape of a molded piece, with an associated punch/die set;

FIG. 35 is an explanatory view in elevation, illustrating a state where one flange of the spool of FIG. 34 is secured to a flange receiving portion;

FIG. 39A is a cross section illustrating a mold set used for molding a piece to be the flange of FIG. 36;

FIG. 39B is an enlarged portion of a mold set of FIG. 39A;

FIG. 40 is a perspective view illustrating a step of punching out a runner, to produce the flange;

FIG. 41 is a section taken on line XLI—XLI in FIG. 39B, illustrating the mold set;

FIGS. 42, 43 and 44 are sections taken in manners similar to FIG. 41, illustrating other examples of mold sets;

FIG. 45A is a cross section illustrating a ratchet claw of the barrel member of FIG. 37;

FIGS. 45B and 45C are cross sections illustrating other preferred examples of ratchet claws;

FIG. 46 is an explanatory view in cross section, illustrating the flange from the piece of FIG. 41 or 42 and the ratchet claw of FIG. 45A, in combination;

FIG. 47 is an explanatory view in cross section, illustrating the flange from the piece of FIG. 43 and the ratchet claw of FIG. 45B, in combination;

DETAILED DESCRIPTION OF THE PREFERRED EMBODIMENTS OF THE PRESENT INVENTION

Figure 1:
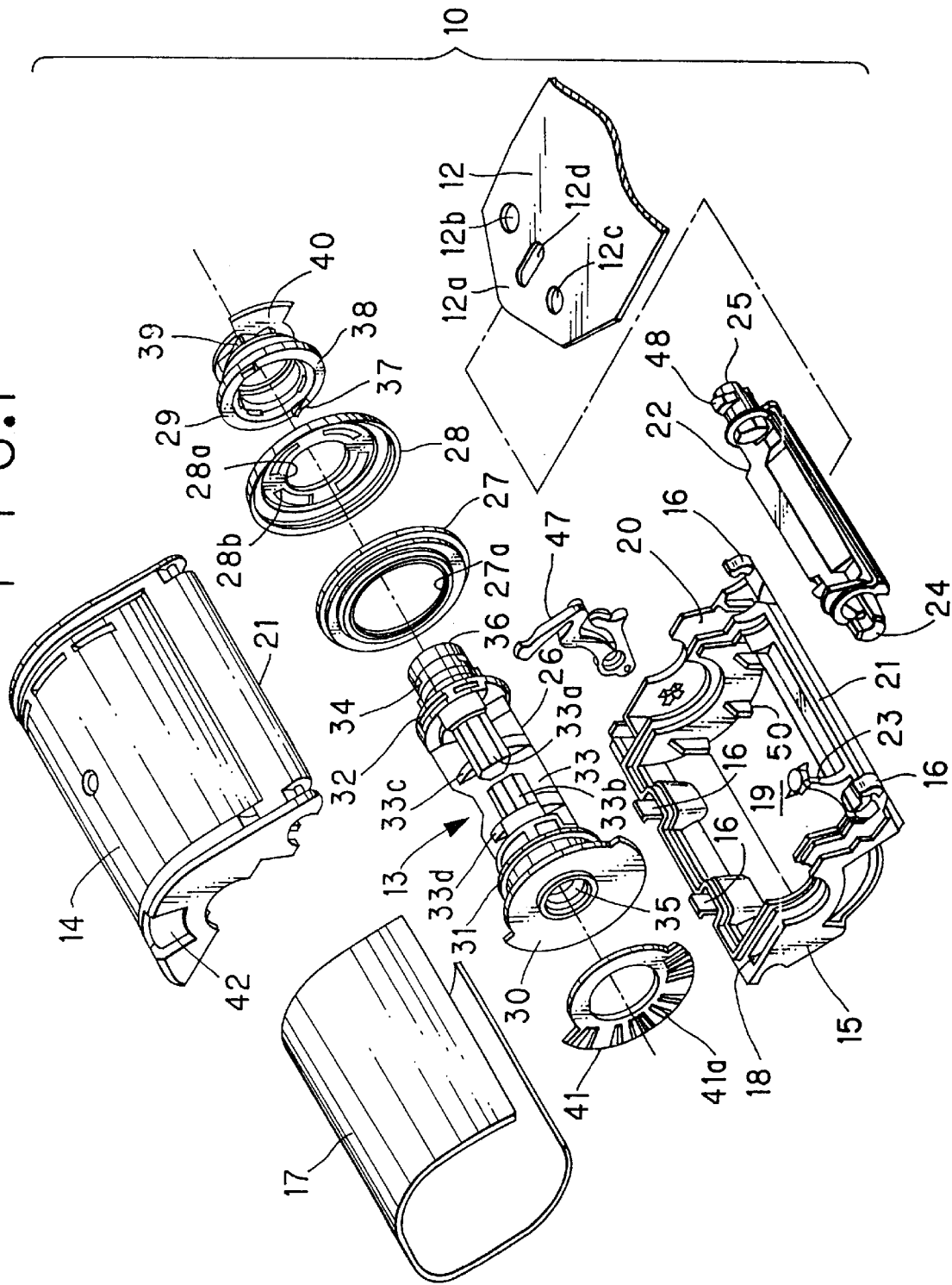
FIG. 1 is an exploded perspective view illustrating a photo film cassette of the present invention.
Figure 2:
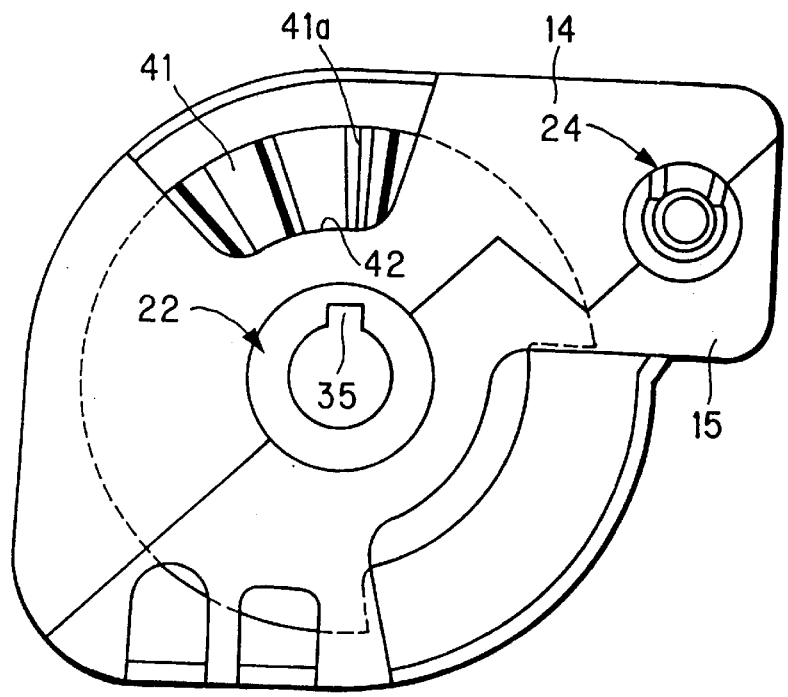
FIG. 2 is a side elevation illustrating the cassette of FIG. 1.

In FIG. 1, a photo film cassette 10 has a cassette shell 11, in which a spool 13 is contained with photo film 12 wound thereabout. When the spool 13 is rotated in a direction of unwinding the photo film 12, a leader of the photo film 12 is advanced to the outside of the cassette shell 11.

The cassette shell 11 consists of an upper shell half 14 and a lower shell half 15, each of which is formed from resin as a single piece. The shell halves 14 and 15 are fitted together by retaining four hooks 16 of the lower shell half 15 to the upper shell half 14. The outside of the cassette shell 11 is provided with a sticker 17.

The inside of the cassette shell 11 is divided into an information chamber 18, a photo film roll chamber 19 and an indicator chamber 20. Part of the juncture between the upper shell half 14 and the lower shell half 15 constitutes a photo film passage port 21 through which the photo film 12 is passed. The photo film passage port 21 has a shutter 22 which can be closed to prevent ambient light from entry, and a separator claw 23 for separating a leader of the spool 13. Distal ends of the shutter 22 have keys 24 and 25, which, when the photo film cassette 10 is loaded into a camera, are connected to driving shafts for opening/closing the shutter 22. The shutter 22 can be rotated to assume positions of opening/closing the photo film passage port 21.

The spool 13 includes a spool core 26, a pair of flanges 27 and 28 respectively being 18 mm across, and a barrel member 29, all of which are respective single pieces of resin. The spool core 26 includes a data plate 30, two receiving portions 31 and 32 for the flanges 27 and 28, a cutout 33 for retention of the photo film, a receiving portion 34 for the barrel member 29, and the keys 35 and 36, all of which are unified as a single piece. The keys 35 and 36 are connected to a driving shaft of a camera loaded with the photo film cassette 10. The driving shaft rotates to cause the spool core 26 to rotate.

The inside of the cutout 33 has resilient pressing ridges 33a and 33b and retaining claws 33c and 33d. Two retaining holes 12b and 12c formed in a trailer 12a of the photo film 12 are retained on the retaining claws 33c and 33d. The ridges 33a and 33b are fitted in a slot 12d formed between the retaining holes 12b and 12c. The ridges 33a and 33b press the trailer 12a to prevent the retaining claws 33c and 33d from accidental disengagement from the retaining holes 12b and 12c. The photo film 12, with the trailer 12a secured, is wound about the spool core 26.

The barrel member 29 includes a disk 38 with ratchet claws 37, a gear 39 and an indicator plate 40, all of which are unified as single piece. The barrel member 29 is fitted on the spool core 26 and is rotatable integrally with the spool core 26.

When the spool 13 with the photo film 12 is included in the cassette shell 11, the flanges 27 and 28 are contained in the roll chamber 19 with the photo film 12. The data plate 30 is contained in the information chamber 18. The indicator plate 40 and the gear 39 are contained in the indicator chamber 20.

In FIG. 1, the inside of the data plate 30 is provided with an adhesive sticker 41 on which a bar code 41a is printed. The bar code 41a represents information inclusive of film sensitivity, a maximum number of photographable frames, a type of the photo film, and the like. The bar code 41a is read by a reading sensor in a camera or a photographic printer while the spool 13 is rotated in an unwinding direction. The bar code 41a is accessed through an access opening 42 formed in the upper shell half 14. Note that the sticker 41 can be eliminated. Instead the bar code 41a may be printed directly on the data plate 30 by pad printing, or hot stamping.

The film used for the hot stamping has a film base, a release layer, a protective layer, a metal membrane and an adhesive membrane. The adhesive membrane operates for transfer to a printing medium. In printing, the layers over the release layer are transferred to the printing medium, and separated from the film base at the release layer. In detail, the film base is polyester film with a thickness of 12–30 $\mu$m. The release layer has a thickness of 100–500 angstroms. The protective layer includes a metal deposit layer with a thickness of 300–1200 angstroms. The release layer is formed from silicone resin, surface-active agent, fatty acid, lubricant, and the like. The metal deposit layer may be aluminum, chromium and the like. The protective layer is resin containing a transparent coloring agent, and preferably a coating having thickness of 1–5 $\mu$m. Examples of the adhesive layer are copolymer of acrylic ester and vinyl chloride, polyvinyl butyral, polyamide, copolymer of vinyl acetate and vinyl chloride, and the like. Preferable thickness of the adhesive layer is 0.5–5 $\mu$m. Furthermore, the bar code label may be thermally transferred to the spool core 26 while it is molded, instead of the pad printing and the hot stamping.

The indicator plate 40 is adapted to indication of either of exposed and unexposed statuses of the photo film 12 in the cassette shell 11. The indicator plate 40, as illustrated in FIG. 31 is positioned at any one of four indicator windows 43, 44, 45 and 46 which are formed in the indicator chamber 20 and different in the shape. It is possible to recognize any of the statuses of the photo film 12 when the indicator plate 40 is seen inside the windows 43–46.

Figure 3:
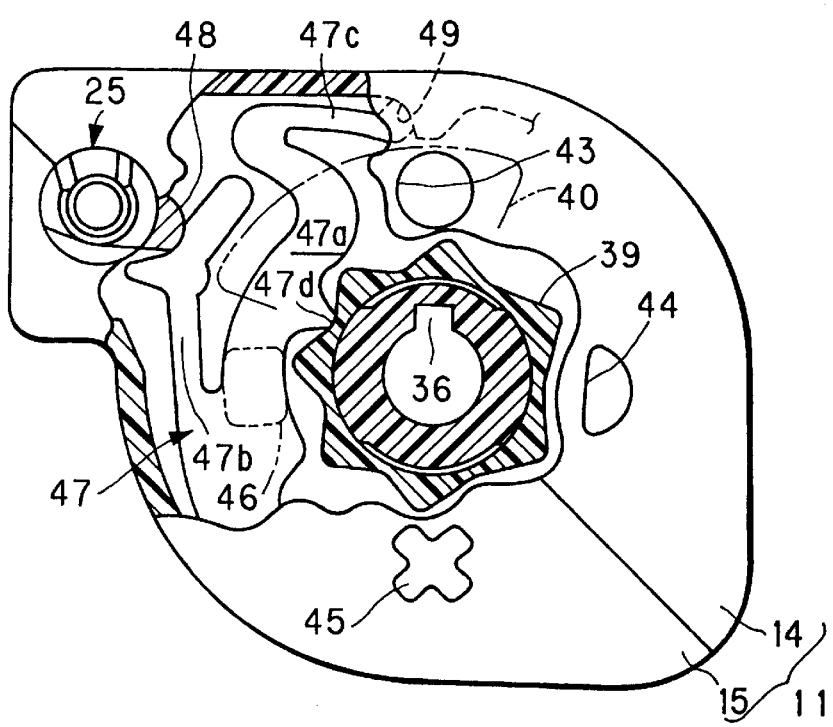
FIG. 3 is a side elevation opposite to FIG. 2, with a portion broken away, illustrating the cassette.

The indicator chamber 20 contains a spool lock 47, which is in mesh with the gear 39. The spool lock 47 allows the spool 13 to rotate when the shutter 22 is in the open position, and hinders the spool 13 from rotating when the shutter 22 is in the closed position. The spool lock 47, as illustrated in FIG. 3, includes a lock lever 47a, elastically deformable arms 47b and 47c on the ends of the lock lever 47a, and an engaging claw 47d on the middle of the lock lever 47a. When the shutter 22 is in the closed position, the arm 47b is contacted on a key 48, to press the engaging claw 47d against the gear 39. The gear 39 is engaged with the engaging claw 47d, to stop the spool 13 from rotating. While the photo film cassette 10 is unexposed, the shutter 22 is in the closed position which keeps the engaging claw 47d engaged with the gear 39.

The arm 47c contacts an engaging projection 49 in the indicator chamber 20, and biases the lock lever 47a in a direction of disengaging the engaging claw 47d from the gear 39. When the shutter 22 is in the open position, the key 48 is released from pressing the arm 47b. The arm 47c operates to disengage the engaging claw 47d from the gear 39, to render the spool 13 free to rotate. The driving shafts of the camera rotate the shutter 22 to the open position. In response to this, the spool 13 is enabled to rotate. The photo film is then advanced or rewound.

Figure 4:
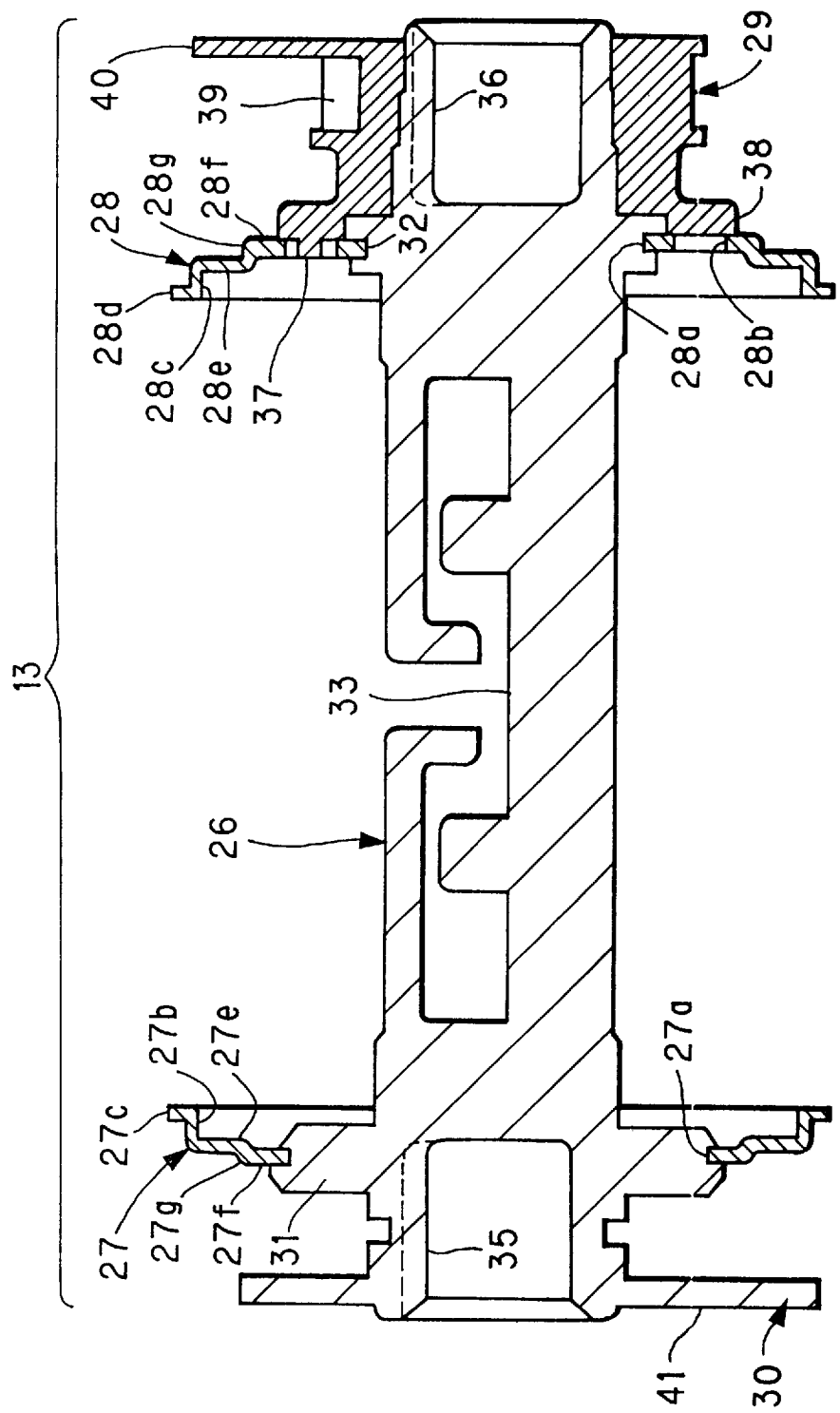
FIG. 4 is a horizontal section illustrating a spool of the cassette.

As illustrated in FIG. 4, the flanges 27 and 28 are mounted on the receiving portions 31 and 32 and disposed between the data plate 30 and the barrel member 29 to define a space large enough for the width of the photo film 12. For the flange mounting, the spool core 26 is insertable into the flanges 27 and 28 while being moved in a single direction, for the purpose of facilitating automatic assembly. The receiving portion 31 has a greater diameter about the spool core 26 than the receiving portion 32. In consistency, the flange 27 has a larger bearing hole 27a, and the flange 28 has a smaller bearing hole 28a. The bearing hole 27a in the flange 27 is moved past the receiving portion 32 and then secured to the receiving portion 31 in rotatable fashion. The bearing hole 28a in the flange 28 is disposed on the receiving portion 32 in rotatable fashion.

The flange 28 on the other side is provided with four holes 28b in a ring wall of the flange 28 perpendicular to an axis of the spool core 26. The engaging openings 28b are arranged in circular fashion. When the spool core 26 is rotated in the unwinding direction, one of the ratchet claws 37 of the barrel member 29 are engaged with the engaging openings 28b. One of the ratchet claws 37 in engagement transmits rotation of the spool core 26 to the flange 28. When the spool core 26 is rotated in the winding direction (reverse to the unwinding direction), the ratchet claws 37 remain unengaged with the engaging openings 28b, to keep the flange 28 free from the rotation of the spool core 26.

As illustrated in FIG. 4, the flange 27 has a ring-like lip 27b formed integrally with its periphery. The flange 28 has a ring-like lip 28c. When the spool core 26 is rotated in the unwinding direction, the ring-like lips 27b and 28c cover ends of the outermost turns of the photo film roll, transmit rotation of the spool core 26 to the photo film 12, and keep the photo film 12 from being loosened. When the photo film 12 is wound, the flange 28, unlike the flange 27, is stopped from rotating. Though the photo film 12 to be wound is rotated while slipped in contact with the ring-like lip 28c, the ring-like lip 28c still keeps the photo film 12 from being loosened.

The photo film 12 has the leading end, which is contacted on the separator claw 23 during the rotation of the spool core 26 in the unwinding direction, and directed toward the photo film passage port 21. The leader of the photo film 12 is advanced to the outside of the photo film 12 while spreading the ring-like lips 27b and 28c. The roll chamber 19 in the shell halves 14 and 15 has flange regulating ridges 50 (see FIG. 1) for preventing the flanges 27 and 28 from being bent at positions that are not close to the photo film passage port 21.

Figure 5:
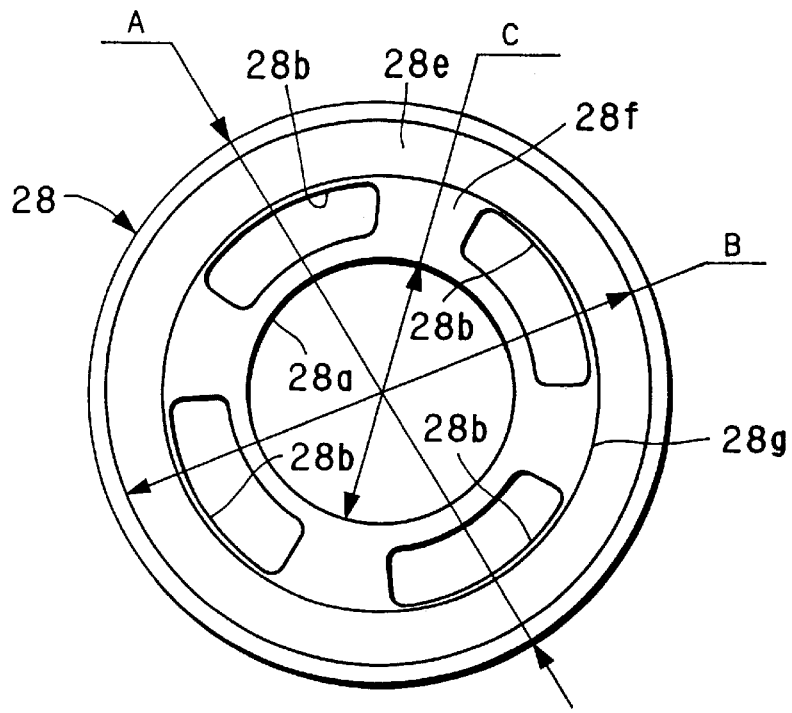
FIG. 5 is a side elevation illustrating one of two flanges of the spool.
Figure 6:
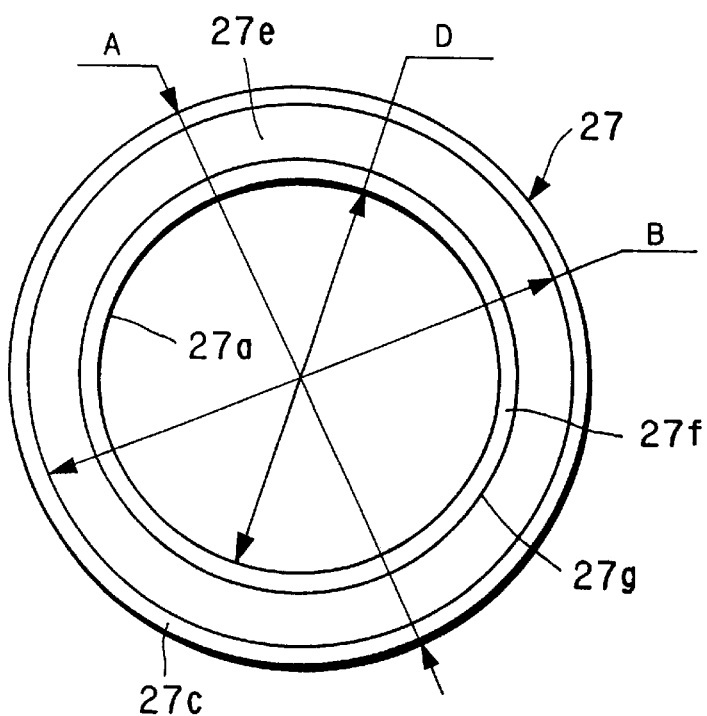
FIG. 6 is a side elevation illustrating another of the two flanges.

The flanges 27 and 28, as illustrated in FIGS. 5 and 6, have a circular contour as viewed in the axial direction. A projected area of the flanges 27 and 28 in projection in the same axial direction is 100 mm² except for the openings and holes. The preferred thickness of the flanges 27 and 28 is 0.3 mm or less, for the purpose of easy deformation and the reduction of frictional resistance against the regulating ridges 50 (See FIG. 1). The flanges 27 and 28 must be produced from material resistant to abrasion and wear, to avoid creation of resin powder even when rubbed on the regulating ridges 50 or the photo film 12.

The material for the flanges 27 and 28 is required to have sufficient rigidity, in view of preventing the photo film 12 from being loosened. The photo film cassette 10 is produced to contain the photo film 12 before exposure as well as after exposure, and thus is used for a long time. Accordingly the flanges 27 and 28 are required to have durability and such resistance to heat that the flanges 27 and 28 remain undeformed even when subjected to high temperature for several hours. In consideration of this, the flanges 27 and 28 is formed of resin meeting conditions as follows:

(1) Temperature of thermal deformation: 80° C. or higher under 18.6 kg/cm², as measured in accordance with ASTM D648. Preferably 90° C. or higher, and desirably 100° C. or higher.

(2) Modulus in elasticity in flexure: 13,000–30,000 kg/cm², as measured in accordance with ASTM D790. Preferably 15,000–29,000 kg/cm², and desirably 16,000–28,000 kg/cm².

(3) Surface hardness: 80 or more in Rockwell R-scale, as measured in accordance with ASTM D785. Preferably 90 or more, and desirably 100 or more.

Eight examples A–H were used for experimentally producing the flanges 27 and 28, with which ten samples of the photo film cassette 10 were produced. Performance of advancing the leader, creation of resin powder, and deforming amount with heat were checked, and evaluated as shown in TABLES 1 and 2:

TABLE 1

| | Characteristics | | |
|---|---|---|---|
| | Thermal Deforming Temperature (°C. at 18.6 kg) | Modulus of Elasticity in Flexure (kg/cm²) | Surface Hardness, in Rockwell R-Scale |
| A | 94 | 22,000 | 105 |
| B | 85 | 16,000 | 90 |
| C | 110 | 26,400 | 115 |
| D | 66 | 12,000 | 65 |
| E | 50 | 18,400 | 71 |
| F | 65 | 25,500 | 119 |
| G | 136 | 30,900 | 120 |
| H | 93 | 46,300 | 120 |

TABLE 2

| | Evaluation | | | | |
|---|---|---|---|---|---|
| | Force for Leader Advancement | Resistance to Drawing Film | Repeated Unwinding and Winding | Powder Creation from Flanges | Deforming Amount with Heat |
| A | Good | Good | Good | Good | Fair |
| B | Good | Good | Good | Fair | Fair |
| C | Good | Good | Good | Good | Good |
| D | Failure | Good | Failure | Failure | Failure |
| E | Good | Good | Good | Failure | Failure |
| F | Good | Good | Good | Good | Failure |
| G | Good | Failure | Failure | Good | Good |
| H | Good | Failure | Failure | Good | Fair |

The eight examples A–H of resin in TABLES 1 and 2 are as follows:

A: nylon-modified polyphenyl ether, including 55 wt. % of nylon 6/6, 35 wt. % of polyphenyl ether (PPE), and 10 wt. % of ethylene propylene rubber (EPR);

B: polypropylene-modified polyphenyl ether, including 55 wt. % of polypropylene (PP), 40 wt. % of polyphenyl ether (PPE), and 5 wt. % of ethylene propylene rubber (EPR);

C: polyacetal (DURACON M90-44 (trade name) manufactured by Polyplastics Co., Ltd.);

D: polyethylene (HI-ZEX 2200 (trade name) manufactured by Mitsui Petrochemical Industries Ltd.);

E: ultra-high-molecular-weight polyethylene (LUBMER L3000 (trade name) manufactured by Mitsui Petrochemical Industries Ltd.);

F: polyamide (AMILAN CM-1017K (trade name) manufactured by Toray Co., Ltd.);

G: non-crystalline nylon (GRIVORY EX3038 (trade name) manufactured by EMS Japan);

H: nylon MXD6 (RENY 6002 (trade name) manufactured by Mitsubishi Gas Chemical Co., Ltd.).

To evaluate the "force for leader advancement" in the TABLE above, a sinker of 180 grams was placed on the leader of the photo film 12, while the spool 13 was rotated to advance the leader. When the leader was successfully advanced from all the ten samples as long as 170 mm, it was evaluated as "Good". Otherwise it was evaluated as "Failure", for example, when there was at least one sample among the ten from which the leader could not advanced, or when the photo film 12 was flexed accidentally.

To evaluate the "resistance to drawing film" in the TABLE, the leader of the photo film 12 was nipped by a nip roller, which was rotated to draw the photo film 12 out of the cassette. When the maximum resistance to the drawing of the photo film 12 was 200 grams or lower for all the ten samples of the cassette, then it was evaluated as "Good". When the maximum resistance was over 200 grams for at least one sample among the ten, then it was evaluated as "Failure".

To evaluate the "repeated unwinding and winding" (durability) in the TABLE above, operation of drawing the photo film 12 out of the cassette shell 11 and subsequently rewinding the photo film 12 into the cassette shell 11 was repeated for 100 times. When the repeated operation of the photo film 12 was successful with all the ten samples, it was evaluated as "Good". When there was at least one sample among the ten in which the repeated operation was stopped without being completed, it was evaluated as "Failure".

To evaluate the "powder creation from flanges" 27 and 28 in the TABLE above, the photo film cassette 10 after the repeated unwinding and winding was opened. The inside of the photo film cassette 10 was inspected. When no resin powder was recognized in any of the ten samples, then it was evaluated as "Good". When some resin powder existed but was negligible for practical use of the cassette, then it was evaluated as "Fair". When considerable resin powder existed which would interface with practical use, then it was evaluated as "Failure".

To evaluate the "deforming amount with heat", the leader of the photo film 12 was protruded from the cassette shell 11 by a length of 200 mm, and was left to stand under high temperature of 80° C. for two hours. The cassette shell 11 was then disassembled. The deforming amount of the flanges 27 and 28 were visually checked. When there was no deformation, it was evaluated as "Good". When there was small but harmless deformation, it was evaluated as "Fair". When there was deformation enough to hinder the leader advancement, it was evaluated as "Failure". The photo film 12 used in the experiments was Super HG 400 (trade name) manufactured by Fuji Photo Film Co., Ltd., and having a length for 36 exposures.

In conclusion of the experiments, the examples A, B and C of TABLES 1 and 2 were found preferable:

A: nylon-modified polyphenyl ether, including 55 wt. % of nylon 6/6, 35 wt. % of polyphenyl ether (PPE), and 10 wt. % of ethylene propylene rubber (EPR);

B: polypropylene-modified polyphenyl ether, including 55 wt. % of polypropylene (PP), 40 wt. % of polyphenyl ether (PPE), and 5 wt. % of ethylene propylene rubber (EPR);

C: polyacetal (DURACON M90-44 (trade name) manufactured by Polyplastics Co., Ltd.).

To form the flanges 27 and 28, injection molding is desirable. In injection molding, the resin is heated at first, rendered fluid, entered in a closed mold with high pressure or high speed, cooled, hardened, and a product is obtained by opening the mold. Injection molding is desirable because the producing efficiency is the greatest, and the thickness of molding can be regularized with easiness. However injection molding is unsuitable to the polyethylene resin as disclosed in U.S. Pat. No. 5,211,348, because the thickness cannot be regularized, and short shot occurs to the flanges 27 and 28 which have thickness of 0.3 mm or less, an outer diameter of 15 mm or more, and a maximum projected area of 100 mm$^2$ measured with its contour kept circular. Therefore it is possible to form the flanges 27 and 28 being 0.3 mm or thinner from resin which has characteristics meeting the ranges as indicated above, and has greater fluidity in a mold than the polyethylene resin: examples are nylon-modified polyphenyl ether, polyolefin-modified polyphenyl ether, and polyacetal.

The nylon-modified polyphenyl ether is constituted by polyphenyl ether (PPE) and nylon blended with the polyphenyl ether (PPE). Preferred percentage of composition of nylon-modified polyphenyl ether is 30–70 wt. % of nylon, 20–60 wt. % of polyphenyl ether (PPE), and 0–20 wt. % of thermoplastic elastomer. Desirable percentage of the composition is 40–65 wt. % of nylon, 25–55 wt. % of polyphenyl ether (PPE), and 3–15 wt. % of thermoplastic elastomer. The most advantageous percentage of the composition is 45–60 wt. % of nylon, 30–50 wt. % of polyphenyl ether (PPE), and 5–13 wt. % of thermoplastic elastomer.

Preferred examples of nylon to be blended in the nylon-modified polyphenyl ether are nylon 6, nylon 6/6, nylon 12, nylon 46, non-crystalline nylon, and semi-aromatic nylon. Preferred examples of thermoplastic elastomer are ethylene propylene rubber (EPR) and styrene butadiene rubber.

The polyolefin-modified polyphenyl ether is constituted by polyphenyl ether (PPE) and blended polyolefin (PO). Preferred percentage of composition of polyolefin-modified polyphenyl ether is 30–70 wt. % of polyolefin (PO), 20–70 wt. % of polyphenyl ether (PPE), and 0–20 wt. % of thermoplastic elastomer. Desirable percentage of the composition is 40–65 wt. % of polyolefin (PO), 25–60 wt. % of polyphenyl ether (PPE), and 3–15 wt. % of thermoplastic elastomer. The most advantageous percentage of the composition is 45–60 wt. % of polyolefin (PO), 30–50 wt. % of polyphenyl ether (PPE), and 5–13 wt. % of thermoplastic elastomer.

Preferred examples of polyolefin (PO) for polyolefin-modified polyphenyl ether are polypropylene (PP) and polyethylene. Preferred examples of thermoplastic elastomer are ethylene propylene rubber (EPR) and styrene butadiene rubber.

If higher resistance to heat is desired to the nylon-modified polyphenyl ether and/or the polyolefin-modified polyphenyl ether, then the percentage of the polyphenyl ether (PPE) can be increased. If higher strength is desired, then the percentage of the nylon and/or the polyolefin can be increased. If lower stiffness is desired, then the percentage of the rubber can be increased.

The flanges 27 and 28, as illustrated in FIG. 4, have respective flange outer ring walls 27e and 28e with the ring-like lips 27b and 28c, rise portions 27g and 28g, and inner ring walls 27f and 28f. The inner ring walls 27f and 28f are retracted over the level of the flange outer ring walls 27e and 28e as viewed in the cross section. This shape causes a difficulty in the injection molding, as the short shot is likely to occur locally in the mold where the resin is unlikely to flow smoothly. To avoid this, a method of the injection/compression molding is still preferred instead of the simple injection molding.

The injection/compression molding is a method in which resin is injected into a mold before the inside of the mold is compressed, to obtain a desired shape of the resin. This is characterized in that the front of the resin while melted receives regular pressure. No gradient of pressure takes place in the flow direction. The orientation of the resin occurs in the direction vertical to the compression. Warpage thus unlikely to occur. Shrinkage in molding is reduced. It is possible to form a molded piece with high precision. There are various ways of effect compression in the mold. Of course the present invention is not limited to those examples.

To effect compression in the mold:

(1) pressure is applied by the mold closing, after injecting resin at low pressure into the slightly opened mold;

(2) pressure is applied by the elastic deformation of the mold while closed;

(3) pressure is applied by pressing a stationary mold against a movable mold;

(4) the injection/compression is effected by changing the mold closing force in two steps;

(5) pressure is applied by the mold closing, after injecting resin into the open mold.

If a mold mark is formed in a portion of the flanges 27 and 28 contacting the photo film 12 and/or the spool core 26, it is likely that difficulties occur, such as scratches of the photo film 12 and hindrance to the leader advancement. Examples of such a mold mark are a parting line and a gate mark. Generally, the more flanges are produced, the more likely it is that burrs occur along the parting line. Consequently the flanges 27 and 28 are formed with small ring-like projections 27c and 28d about the ring-like lips 27b and 28c, as illustrated in FIG. 4. The ring-like projections 27c and 28d are adapted to contact and separation between the stationary and movable molds. Parting lines may be formed on the periphery of the ring-like projections 27c and 28d. Should burrs be formed, they are easy to remove.

It is general in the injection molding to let a gate mark remain in a recess. However it is not preferred to let the flanges 27 and 28 have any gate mark, because the flanges 27 and 28 respectively have the bearing holes 27a and 28a in the center and the ring-like lips 27b and 28c in the periphery. Accordingly it is preferable to use a method of the in-mold degating, according to which a gate mark is cut away inside the mold.

Figure 7:
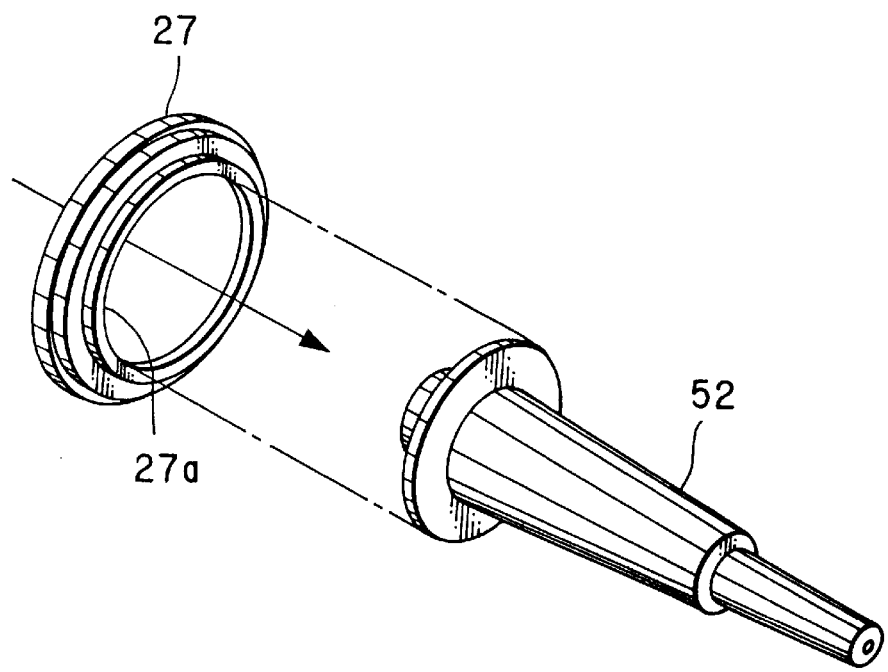
FIG. 7 is an explanatory view illustrating a step of in-mold degating.

In-mold degating is a method in which a gate mark is cut away automatically by a hydraulic cylinder in the mold. In the present embodiment, the gate of the mold is positioned to correspond to the bearing hole 27a of the flange 27, as illustrated in FIG. 7. Immediately after the molding, a runner 52 with the gate mark is cut away (punched off) from the flange 27. The flange 27, from which the runner 52 has been removed, does not have any gate mark. This method is advantageous as the subsequent cutting of the gate mark after the removal from the molding can be eliminated. It is possible to enlarge the gate size, and then reduce the pressure in the molding. This is advantageous as distortion in the molded piece can be reduced. Note that in-mold degating can be used for producing the opposite flange 28.

Figure 8:
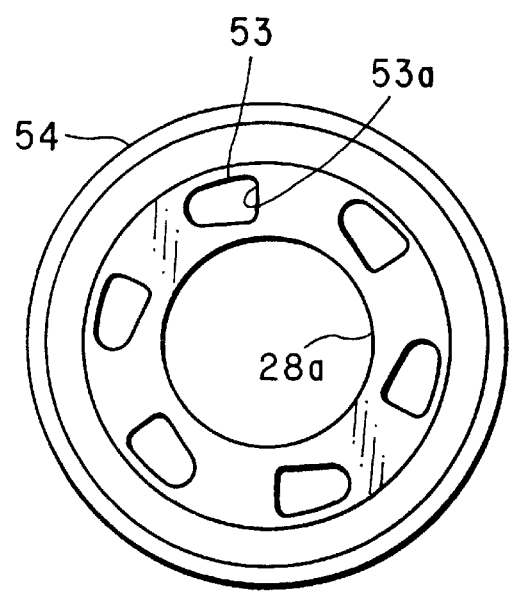
FIG. 8 is a side elevation illustrating another preferred flange, in which engaging openings has a straight engaging edge in association with ratchet claws.

The flange 28 has the engaging openings 28b for engagement with the ratchet claws 37, and also has a difficulty in the mold where the resin is unlikely to flow smoothly. To facilitate the flow of the resin, the area of the engaging openings 28b is reduced, to form six engaging openings 53 in a flange 54, as illustrated in FIG. 8. Note that the number of the engaging openings 28b can be two or more, preferably four or more, and may be determined as desired. When the two ratchet claws 37 are formed, it is preferred to form the 2–12 openings 28b, more preferably 4–10 openings 28b, and desirably 6–8 openings 28b. If there are an odd number of ratchet claws 37, it is preferred to form one to four times as many engaging openings 28b as the ratchet claws 37. If there are three ratchet claws 37, 3, 6, 9 or 12 engaging openings 28b can be formed.

The flange 54 in FIG. 8 has also a feature of the modified shape of the engaging openings 53. The engaging openings 53 have a partially straight edge 53a to be engaged with the ratchet claws 37. All the six engaging openings 53 are rotationally symmetrical with reference to the center of the flange 54. The shape of the straight edge 53a renders reliable the engagement with the ratchet claws 37. Thus, efficiency in transmission is raised.

Figure 9:
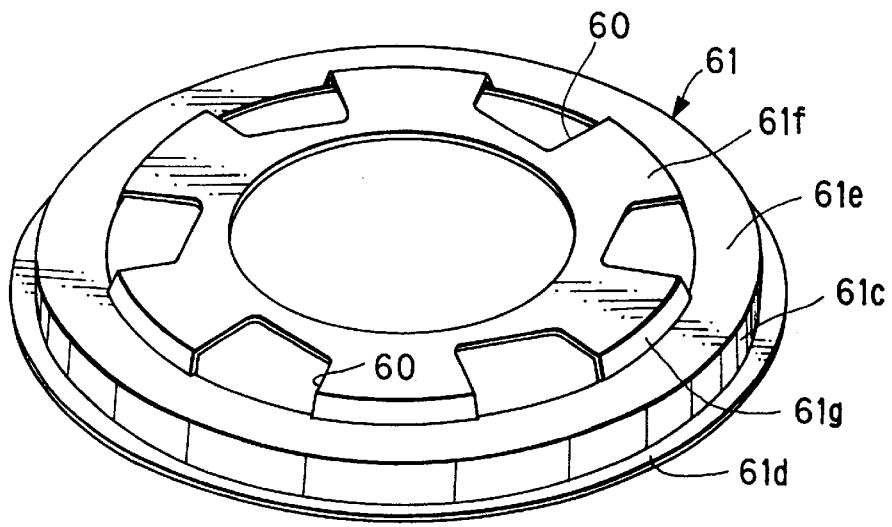
FIG. 9 is a perspective view illustrating another preferred flange, in which the resistance to drawing the photo film is lowered even under low temperature.

FIGS. 9 and 10 illustrate a flange 61 in which engaging openings 60 are extended to a rise portion 61g which is L-shaped as viewed in cross section. The rise portion 61g is disposed between an outer ring wall 61e and an inner ring wall 61f. The engaging openings 60 are formed to open between the inner ring wall 61f and the rise portion 61g. It is possible to keep the flange 61 flexible even in a severe condition such as low temperature of $-10°$ C. or lower, at lowest $-30°$ C. When the photo film cassette 10 is provided with the flange 61, there is no increase in resistance to drawing the film in low temperature conditions.

Figure 10A:
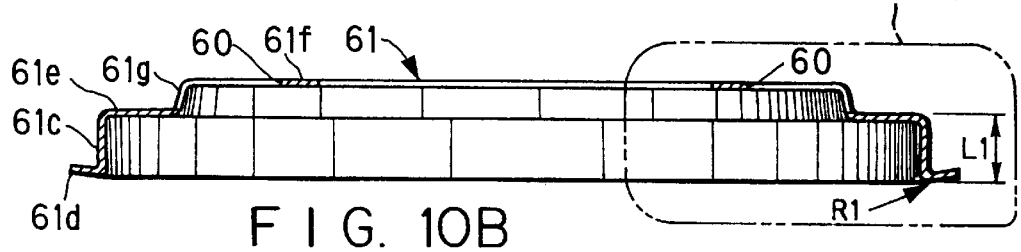
FIG. 10A is a cross section illustrating the flange of FIG. 9.
Figure 10B:
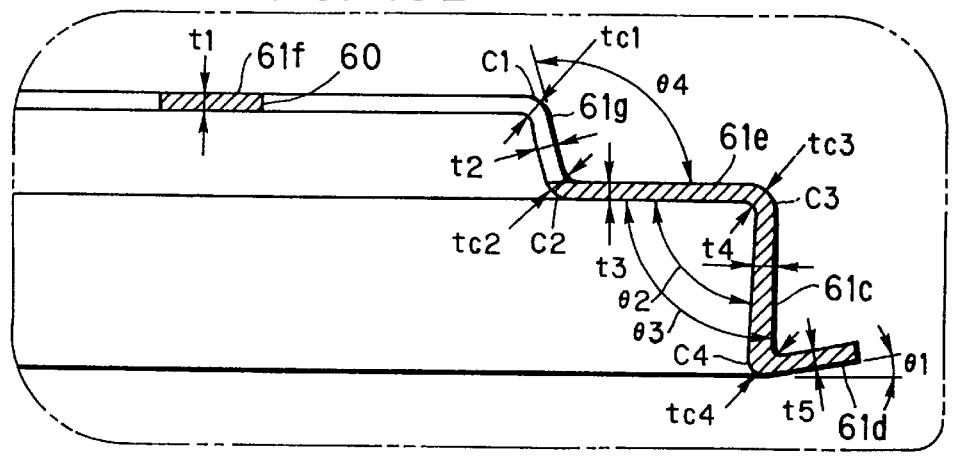
FIG. 10B is an enlargement of a portion of the flange of FIG. 10A.
Figure 11:
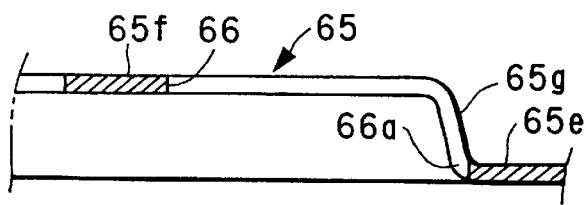
FIG. 11 is a cross section in enlargement, illustrating an engaging opening in another preferred flange.

Instead of the engaging openings 60 in the inner ring wall 61f and the rise portion 61g in FIGS. 9 and 10, a flange 65 can have engaging openings 66 as illustrated in FIG. 11. The engaging openings 66 are formed to come to an outer ring wall 65e. The engaging openings 66 have a facet of an edge coming to the outer ring wall 65e. The facet is erected in the rise direction of rise portions 65g. Reference numeral 65f designates an inner ring wall. An area 66a of the facet is preferably as small as possible, because the face of the outer ring wall 65e contacts the turns of the photo film. The facet area 66a can be determined in consideration of the durability. The flange 65 has an advantage of flexibility greater than that of the flange 61 under low temperature conditions. The resistance to drawing the film can be lowered as compared with the flange 61 in FIG. 9.

It is unnecessary to regularize the thickness of the flange 61 formed by the injection molding. Preferably the flange 61 can have a thickness which is partially varied as desired for the performance to the flange 61. As illustrated in FIG. 10, let t1 be thickness of the inner ring wall 61f. Let t2 be thickness of the rise portion 61g. Let t3 be thickness of the outer ring wall 61e. Let t4 be thickness of a ring-like lip 61c. Let t5 be thickness of a ring-like projection 61d. The sizes t1–t5 can be varied in the range of 0.10–0.30 mm. Let tc1 be thickness of a corner C1 between the inner ring wall 61f and the rise portion 61g. Let tc2 be thickness of a corner C2 between the rise portion 61g and the outer ring wall 61e. Let tc3 be thickness of a corner C3 between the outer ring wall 61e and the ring-like lip 61c. Let tc4 be thickness of a corner C4 between the ring-like lip 61c and the ring-like projection 61d. The sizes tc1–tc4 can be varied in the range of 0.05–0.25 mm. A desirable range for t1–t5 is 0.13–0.25 mm. A desirable range for tc1–tc4 is 0.08–0.20 mm.

Should t1–t5 be smaller than 0.1 mm, the injection molding process is difficult. Should t1–t5 be greater than 0.3 mm, the resistance to drawing the film with the flange 61 assembled in the cassette is excessively high. Let k be a ratio of the maximum thickness to the minimum thickness. The ratio k can be in the range of $1 \leq k \leq 6$, preferably $1 \leq k \leq 2.7$. Note that it is possible to determine the thicknesses tc1–tc4 of the corners C1–C4 equal to the thicknesses t1–t5. It is also possible to change thickness of the gate portion. If the gate portion is provided with greater thickness, the molding process is facilatated, as the resistance to the flow of the resin is reduced.

In FIGS. 10A and 10B, the inner ring wall 61f, the rise portion 61g, the outer ring wall 61e, the ring-like lip 61c, and the ring-like projection 61d are so formed that the sizes t1–t5 are 0.15 mm. The corners C1, C2 and C3 are so formed that the sizes tc1–tc3 are 0.10 mm. Let θ1 be an angle defined between the ring-like projection 61d and the outer ring wall 61e. The angle θ1 has a range of 0–30 degrees, and is 10 degrees in the present embodiment. When θ1 is zero, the ring-like projection 61d is parallel to the outer ring wall 61e, to facilitate preparation of the mold for the flange. The corner C4 between the ring-like lip 61c and the ring-like projection 61d is directly contacted with the photo film 12. Let R1 a radius of curvature at which the corner C4 is rounded off. The radius R1 has an effect on the leader advancement and resistance to drawing the film. The radius R1 has a range of 0.10–0.60 mm, and is 0.40 mm in the present embodiment. Let θ2 be an angle defined between the outer ring wall 61e and the inside of the ring-like lip 61c. Let θ3 be an angle defined between the outer ring wall 61e and the outside of the ring-like lip 61c. The angle θ2 has a range of 81–89 degrees, and is 85 degrees in the present embodiment. The angle θ3 has a range of 90 degrees or more, and is 90 degrees in the present embodiment, consistent with the draft of the mold. The ring-like lip 61c and the corner C4 are thicker than other portions, but enjoy great durability resistant against deformation caused by contact between the corner C4 and the turns of the photo film. Let θ4 be an angle defined between the outer ring wall 61e and the rise portion 61g. The angle θ4 has a range of 90–135 degrees, and is 100 degrees in the present embodiment.

TABLE 3 shows results of experiments conducted while changing the area of the engaging openings 60 in the flange 61 having the sizes above in FIGS. 10A and 10B. Let S1 be a total area of all the engaging openings 60. Let S2 be a total area of the rise portion 61g and the inner ring wall 61f as developed on a plane. Sample cassettes were experimentally prepared by changing a ratio S1/S2. The resistance to the drawing the film at the low temperature was measured, to obtain the results in the TABLE. As understood from the TABLE, the resistance to the drawing the film was effectively lowered when the ratio S1/S2 was 30–85%. A preferable range of S1/S2 was 35–80%. A desirable range of S1/S2 was 40–75%. Note that, in the evaluation in TABLE 3, A represents "Excellent", B represents "Good", C represents "Fair" and barely usable, D represents "Below average" requiring improvement for use, and E represents "Failure" and unusable.

TABLE 3

| Open Ratio S1/S2 (%) | Resistance to Drawing Film (g) | Force for Leader Advancement (g) |
| --- | --- | --- |
| 20 | 300, E | 500 or higher, A |
| 25 | 280, D | 500 or higher, A |
| 30 | 250, C | 400 or higher, B |
| 40 | 230, B | 400 or higher, B |
| 60 | 180, B | 400, B |
| 70 | 150, B | 400, B |
| 80 | 130, B | 300, B |
| 85 | 110, A | 200, C |
| 90 | 100, A | 150, D |
| 95 | 50, A | 100 or lower, E |

The height L1 of the ring-like lip 61c is in a range of 1.0–1.2 mm, preferably in a range of 1.2–1.8 mm. Should L1 be smaller than 1.0 mm, the ring-like lip 61c could not squeeze the turns of the photo film. In such a case, it would be impossible for rotation of the spool to advance the leader, as the diameter of the roll of the photo film could not be regulated by the circumference lip. TABLE 4 shows results of experiments conducted while changing the height L1 of the ring-like lip 61c. Sample cassettes were experimentally prepared for various values of L1. The resistance to the drawing the film, the force for the leader advancement, durability ("repeated unwinding and winding"), and injection-moldability were observed at the temperature of −20° C. Note that a Comparable Example in the TABLE was a cassette with flanges formed by the vacuum forming as is known in the art. As a result, the resistance to drawing the film was low according to the present invention. The force for leader advancement related to the flanges of the present invention was equal to or greater than the flanges of the Comparable Example made from vacuum forming. The durability of the flanges of the present invention was higher than that of the flanges of the Comparable Example. Note that the signs A–E represent the same as those in TABLE 3.

TABLE 4

| | t4 (mm) | L1 (mm) | Resistance to Drawing Film (g) | Force for Leader Advancement (g) | Durability (times) | Injection-Moldability |
| --- | --- | --- | --- | --- | --- | --- |
| Comp. Ex. | 0.10 | 1.5 | 120, B | 400 or higher B | 100 or less E | E |
| Samples | 0.13 | 2.2 | 280, E | under 300 B | 100 or less E | C |
| | 0.13 | 2.0 | 200, B | 300 or higher B | 500 or more B | C |
| | 0.13 | 1.7 | 180, B | 500 or higher B | 500 or more B | C |
| | 0.15 | 1.5 | 150, B | 500 or higher B | 500 or more B | B |
| | 0.20 | 1.3 | 160, B | 400 or higher B | 500 or more B | A |
| | 0.23 | 1.1 | 200, B | 300 or higher B | 500 or more B | A |

TABLE 4-continued

| t4 (mm) | L1 (mm) | Resistance to Drawing Film (g) | Force for Leader Advancement (g) | Durability (times) | Injection-Moldability |
|---|---|---|---|---|---|
| 0.25 | 1.0 | 200, B | 300 or higher B | 500 or more B | A |
| 0.30 | 1.0 | 250, C | 300 or higher B | 200 or more B | A |
| 0.30 | 1.5 | 350, E | 500 or higher B | 100 or less E | A |

The in-mold degating method as illustrated in FIG. 7 should have good performance in cutting by regulating the clearance for the degating with high precision, and thus requires a complex structure of the mold. For mass production of the same flanges, there is an upper limit in number of producing the flanges, due to the structure of the mold having limited productivity. It is possible, instead of the in-mold degating method, to form the flanges in by punching. A molded piece is removed from the mold with gate mark and/or the runner portion remaining on the molded piece. When the molded piece is cooled down nearly to room temperature, the gate mark and/or the runner portion can be punched out of the molded piece to obtain the flange. For collective production of this molded piece, a great number of cavities can be formed in a single mold set. Mass production of greater scale is thus enabled. The mold set can thus have a simpler structure, and is highly easier to be inspected for maintenance.

To punch a molded piece 69 after the molding, a reference projection 72 is formed on a scrap portion 71 of the molded piece 69. The reference projection 72 has a reference face 72a as a frustum of a cone concentric to the molded piece 69, and has a top face parallel to the bottom face of the molded piece 69. The reference face 72a is inclined, and adapted to guiding of the molded piece 69 into a die of a punching machine in an exactly determined position for a flange 70. The punching machine cuts the molded piece 69 along two lines CUT1 and CUT2, to cut away the scrap portions 71 and 73, so that the flange 70 can be a well-centered ring between two circles with high precision. It is possible to form the scrap portion 71 thicker than the flange 70, and to strengthen the reference face 72a, for the purpose of further heightening the precision in the punching. Note that the inside of the reference projection 72 opposite to the reference face 72a can be used for guiding the molded piece 69 into a die of the punching machine.

Figure 12:
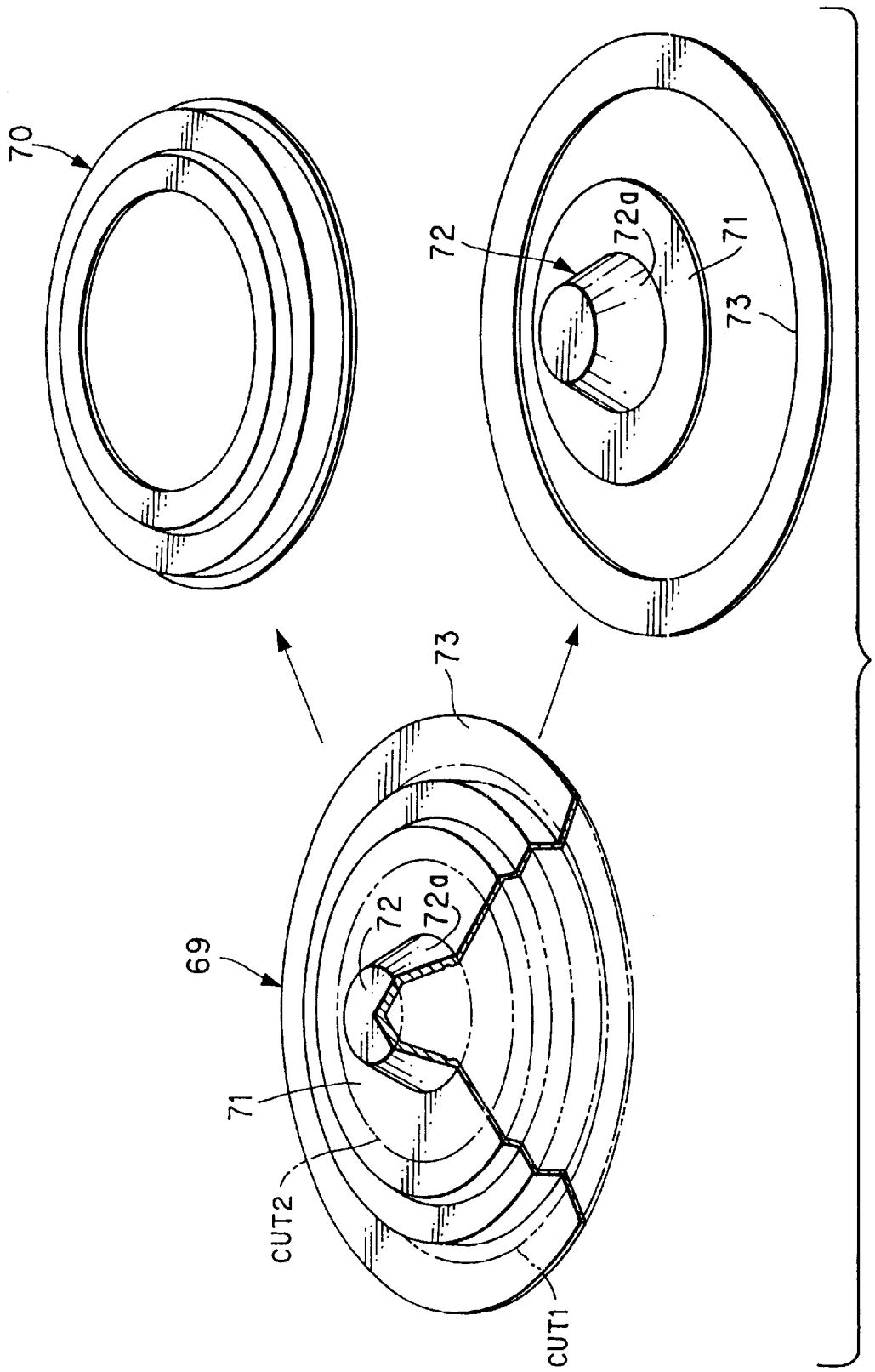
FIG. 12 is a perspective view illustrating another preferred embodiment, in which a flange is formed by punching a molded piece while cutting away a scrap portion.
Figure 13A:
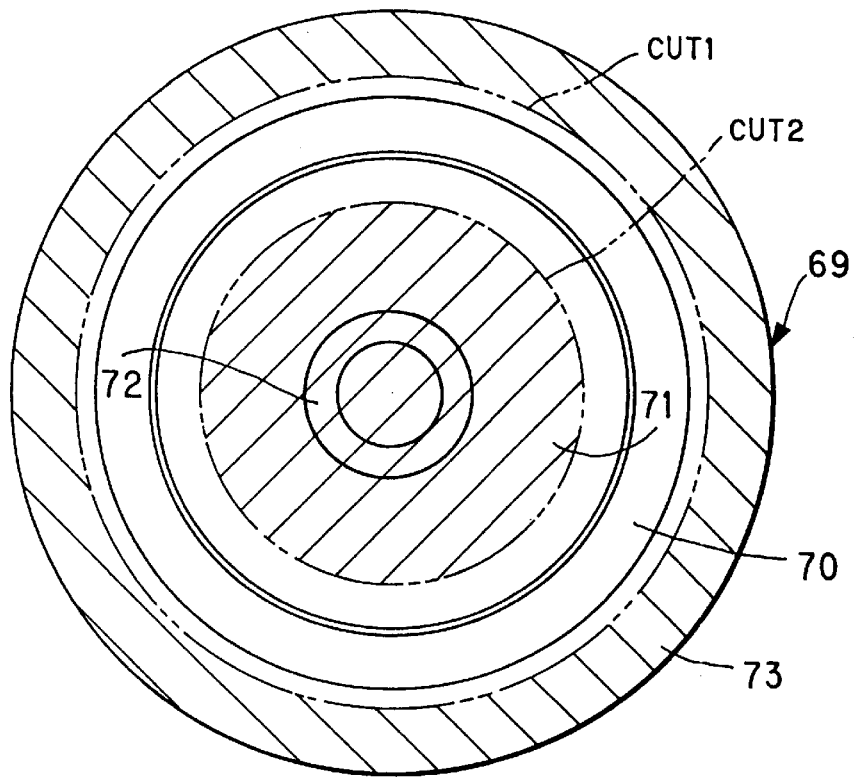
FIG. 13A is a plan view illustrating the molded piece of FIG. 12.
Figure 13B:
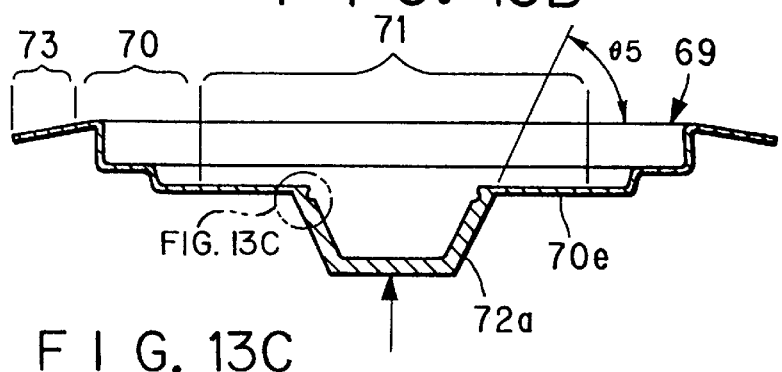
FIG. 13B is a cross section illustrating the molded piece of FIG. 12.
Figure 13C:
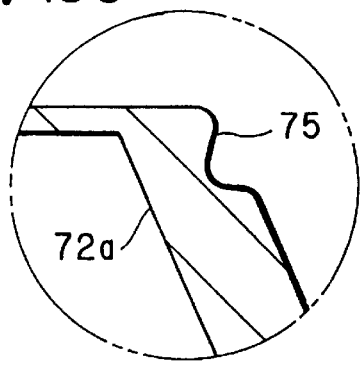
FIG. 13C is an enlargement of a portion of the molded piece of FIG. 13B.

In FIGS. 13A to 13C, let θ5 be an angle at which the reference face 72a is inclined with reference to a flange ring wall 70e. θ5 can be in a range of 30–90 degrees, preferably in a range of 45–85 degrees. Note that, instead of the reference face 72a as a frustum of a cone, an alternative reference face for positioning can be formed cylindrically, conically, prismatically, pyramidally, as a frustum of a pyramid, or semi-spherically. Further, it is alternatively possible to form a projection or a groove which generally has a crossed shape, an L-shape or a circular shape and has a V-shape, U-shape or a semi-circular shape as viewed in cross section, for the purpose of positioning in the punching as reference face. In FIGS. 12, 13A to 13C, the flange 70 has no opening for a ratchet claw. It is possible to apply the use of the punching to the flanges 61 and 65 with the engaging openings as illustrated in FIGS. 9 and 11.

The flange produced by punching as noted above was checked experimentally. The flange was produced with the dimensions of t1–t5 in FIGS. 10A and 10B to be 0.15 mm, and tc1–tc3 to be 0.10 mm, and the angles θ1=90°, θ2=85°, θ3=90°, θ4=100°. The resistance to drawing the film was reduced approximately to 150 grams from 200 grams, namely reduced by nearly 25%. In the durability testing, operation of drawing the photo film 12 out of the cassette shell 11 and subsequently rewinding the photo film 12 into the cassette shell 11 was successfully repeated for 500 times, which compared to the 250 times, was twice as high durability. The ratio of success in winding of the photo film into the cassette without applying back tension was approximately 75%, which was an increase of over 50%.

As resin for the flanges in the embodiments of FIGS. 9, 11 and 12, nylon-modified polyphenyl ether, polystyrene-modified polyphenyl ether, polyolefin-modified polyphenyl ether, polyacetal (POM), polycarbonate (PC) and polyamide (PA). The nylon-modified polyphenyl ether, polystyrene-modified polyphenyl ether, polyolefin-modified polyphenyl ether and polyacetal (POM) are the same as used in the embodiments of FIGS. 5, 6 and 8. Examples of the polystyrene-modified polyphenyl ether are NORYL (trade name, manufactured by Japan GEP Corporation), and ZAIRON (trade name, manufactured by Asahi Chemical Industry Co., Ltd.), both available commercially. Examples of the polycarbonate (PC) are PANLITE (trade name, manufactured by Teijin Kasei Corporation), UPIRON (trade name, manufactured by Mitsubishi Gas Chemical Co., Inc.), LEXAN (trade name, manufactured by Japan GEP Corporation), and NOVAREX (trade name, manufactured by Mitsubishi Chemical Industries Ltd.), all available commercially. Examples of the polyamide (PA) are nylon 6, nylon 6/6, nylon 12, nylon 46, non-crystalline nylon, and semi-aromatic nylon (and other modified nylon), all available commercially. It is also preferable to use alloy of polyphenylene sulfide (PPS) and polyphenyl ether (PPE), alloy of polyphenylene sulfide (PPS) and polybutylene terephthalate (PBT), alloy of polyphenyl ether (PPE) and liquid crystal resin (LCP), and polyphenylene sulfide (PPS) with glass fiber (glass bead or GF) mixed at 5–30 wt. %. Silicone may be mixed into the resin for the flanges. Ratio of the silicone can be preferably 2 wt. % or less, and desirably 1.5 wt. % or less. Should the silicone be over 2 wt. %, the silicone component would be deposited within the molds during the molding. There thus would be problems of dirt around the molded piece, and burn mark and/or short shot due to stopping of air vents in the molds. The silicone can be added to any of polyethylene (PE), polypropylene (PP), polystyrene (PS), acrylonitrile-styrene (AS), acrylonitrile-butadiene-styrene (ABS), polycarbonate (PC), polyphenylene oxide (PPO), modified polyphenylene oxide (PPO), polyamide (PA), polyacetal (POM), polyethylene terephthalate (PET), polybutylene terephthalate (PBT), and polyvinyl chloride (PVC).

In the present embodiment, the sprue gate is used as a direct gate. However another gate may be used instead, such as pin gate, tunnel gate, submarine gate, film gate, ring gate, and disk gate. In FIGS. 13B, and 13C the reference projection 72 has a reversed inclined face 75, which facilitates removal of the molded piece from the molds.

Conventionally it has been difficult to form the finished shape of the flange by injection molding in the small thickness required in the present invention. However the molded piece is provided with greater thickness in positions closer to the gate, and the peripheral portion enlarged over the finished shape of the flange, as illustrated in FIGS. 13B and 13C. The peripheral portion is subsequently scrapped. This is favorable in rendering faster the flow of the resin, facilitating the injection molding, and raising efficiency in production. It is further possible to produce flanges with still smaller thickness.

In the course of the injection molding, it is possible that the piece for the flanges 27, 28, 54, 61, 65 and will eletrostatically stick to the molds, to hinder the removal of the piece from the molds. Also, electrostatic charge hinders advancement of the photo film 12. However, an antistatic agent can be preferably added to the resin for the flanges 27, 28, 54, 61, 65 and 70 for the purpose of preventing these difficulties.

Examples of the antistatic agents are poly(oxyethylene) alkylamine, poly(oxyethylene)alkylamide, poly(oxyethylene) alkyl ether, poly(oxyethylene)alkylphenyl ether, glycerine fatty acid ester, sorbitan fatty acid ester, alkylsulfonate, alkylbenzenesulfonate, alkylsulfate, alkyl phosphate, quaternary ammonium chloride, quaternary ammonium sulfite, quaternary ammonium nitrate, alkylbetaine type, alkylimidazoline type, alkyl alanine type, polyvinylbenzyl type cation, and polyacrylic acid type cation.

To reduce friction of the flanges 27 and 28 with the photo film 12 and the affect of fogging to the photo film 12, the resin for the flanges 27 and 28 can be provided with a lubricant, light-shielding material, antioxidant, thermal stabilizer, plasticizer, and filler, in amounts as much as is consistent with the operation of the present invention.

Examples of lubricants that are usable with resin molded into the flanges 27 and 28, available in the market, are referred to below, as well as manufacturers thereof.

1) Silicone lubricants: dimethyl polysiloxane of various grades and denaturation thereof (manufactured by Sinetsu Chemical Co., Ltd., and Toray Silicone Co., Ltd.).

2) Oleic acid amide lubricants: ARMO SLIP-CP (trade name, manufactured by Lion Akzo Co., Ltd.), NEWTRON (trade name, manufactured by Nippon Fine Chemical Co., Ltd.), NEWTRON E-18 (trade name, manufactured by Nippon Fine Chemical Co., Ltd.), AMIDE-O (trade name, manufactured by Nitto Chemical Industry Co., Ltd.), ALFLOW E-10 (trade name, manufactured by Nippon Oil and Fats Co., Ltd.), DIAMID O-200 (trade name, manufactured by Nippon Kasei Chemical Co., Ltd.), and DIAMID G-200 (trade name, manufactured by Nippon Kasei Chemical Co., Ltd.).

3) Erucic acid amide lubricant: ALFLOW P-10 (trade name, manufactured by Nippon Oil and Fats Co., Ltd.).

4) Stearic acid amide lubricants: ALFLOW S-10 (trade name, manufactured by Nippon Oil and Fats Co., Ltd.), NEWTRON 2 (trade name, manufactured by Nippon Fine Chemical Co., Ltd.), and DIAMID 200 (trade name, manufactured by Nippon Kasei Chemical Co., Ltd.).

5) Bis fatty acid amide lubricants: BISAMIDE (trade name, manufactured by Nitto Chemical Industry Co., Ltd.), Ltd.), DIAMID 200 BIS (trade name, manufactured by Nippon Kasei Chemical Co., Ltd.), and ARMO WAX-EBS (trade name, manufactured by Lion Akzo Co., Ltd.).

6) Nonionic surface active agent lubricants: ELECTROSTRIPPER TS-2 and ELECTROSTRIPPER TS-3 (trade names, manufactured by Kao Corporation).

7) Hydrocarbon lubricants: liquid paraffin, natural paraffin, micro wax, synthetic paraffin, polyethylene wax, polypropylene wax, chlorinated hydrocarbon, and fluorocarbon.

8) Fatty acid lubricants: higher fatty acid (whose preferable number of carbon atoms is $C_{12}$ or more), and oxy fatty acid.

9) Ester lubricants: fatty acid lower alcohol ester, fatty acid polyvalent alcohol ester, fatty acid polyglycol ester, and fatty acid fatty alcohol ester.

10) Alcohol lubricants: polyvalent alcohol, polyglycol, and polyglycerol.

11) Metallic soaps: compounds of higher fatty acids, such as lauric acid, stearic acid, ricinoleic acid, naphthenic acid and oleic acid, and metals, such as Li, Mg, Ca, Sr, Ba, Zn, Cd, Al, Sn, and Pb.

Good examples of a light screen or light-shielding material added to the resin are referred to below. For a cassette of a type specified to containing a developed photo film, no such material is required for resin.

Inorganic compounds:

1) Oxide, such as: silica, diatomaceous earth, alumina, titanium oxide, iron oxide, zinc oxide, magnesium oxide, antimony oxide, barium ferrite, strontium ferrite, beryllium oxide, pumice stone, pumice stone balloon, and alumina fiber.

2) Hydroxide, such as: aluminum hydroxide, magnesium hydroxide, and basic magnesium carbonate.

3) Carbonate, such as: calcium carbonate, magnesium carbonate, dolomite, and danalite.

4) Sulfate and sulfite, such as; calcium sulfate, barium sulfate, ammonium sulfate, and calcium sulfite.

5) Silicate, such as: talc, clay, mica, asbestos, glass fiber, glass balloon, glass bead, calcium silicate, montmorillonite, and bentonite.

6) Carbon, such as: carbon black, graphite, carbon fiber, and carbon hollow sphere.

7) Other compounds, such as iron powder, copper powder, lead powder, tin powder, stainless steel powder, pearlescent pigment, aluminum powder, molybdenum sulfide, boron fiber, silicon carbide fiber, brass fiber, potassium titanate, lead titanate zirconate, zinc borate, barium metaborate, calcium borate, sodium borate, and aluminum paste.

Organic compounds:

Wood meal (pine, oak, sawdust), husk fiber (almond, peanut, rice hull), and various colored fibers, such as cotton, jute, paper strip, cellophane piece, nylon fiber, polypropylene fiber, starch, and aromatic polyamide fiber.

Carbon black is the most preferable, because only a smaller amount of it is bled out of the resin. Preferable ratio of the carbon black to be included is 0.01 wt. % or more. Carbon black is classified according to raw materials as gas black, furnace black, channel black, anthracene black, acetylene black, Ketchen carbon black, lamp black, oil smoke, pine smoke, animal black, and vegetable black.

Among the above, furnace black is preferable because of its light-shielding capacity, low cost and high quality. Acetylene black, and Ketchen carbon black being a denatured by-product, are preferable because of their antistatic properties as well as light-shielding capacity. However these antistatic types of carbon black can be relatively expensive. Different types of carbon black can be mixed in accordance with desired properties.

Among several methods of composing light-shielding material, the master batch method is preferable because of low cost and minimal environmental problems associated with production in factory. JP-B 40-26196 discloses a method in which carbon black is dispersed in solution of polymer in organic solvent, to produce master batch of the polymer and the carbon black. JP-B 43-10362 discloses a method in which carbon black is dispersed in polyethylene, to produce master batch.

For use in the resin of the flanges 27 and 28 contained with photosensitive material, carbon black should not permit of fogging the photo film 12, inhibit changes in photosensitivity of the photo film 12, exhibit a high light-shielding capacity, and pinholes due to granular structure and/or fish eyes in the carbon black mixed into the resin. In view of this, preferred carbon black has pH 6.0–9.0 and an average grain diameter of 10–120 μm. Particularly furnace carbon black is preferable, as it has volatile content of at most 2.0% and oil absorption of at least 50 ml per 100 grams. The channel carbon black is less preferable, because it is inexpensive and has a high possibility of fogging the photo film 12. In selecting any kind of carbon black, affects to the photosensitivity of the photo film must be previously checked.

Representative examples of preferred carbon blacks on the market include Carbon Black #20(B), #30(B), #33(B), #40(B), #41(B), #44(B), #45(B), #50, #55, #100, #600, #950, #1000, #2200(B), #2400(B), MA8, MA11 and MA100 (trade names), all produced by Mitsubishi Chemical Industries Ltd.

Other examples of carbon blacks are Black Pearls 2, 46, 70, 71, 74, 80, 81 and 607, Regal 300, 330, 400, 660 and 991 and SRF-S, Vulcan 3 and 6, Sterling 10, SO, V, S, FT-FF and MT-FF (trade names), all produced by Cabot Corp.; and United R, BB, 15, 102, 3001, 3004, 3006, 3007, 3008, 3009, 3011, 3012, XC-3016, XC-3017 and 3020 (trade names), all produced by Ashland Chemical Co. However, the carbon black is by no means limited to these example.

Ratio of the light-shielding material can be in a range of 0.1–15 wt. %, preferably in a range of 0.5–10 wt. %, and desirably in a range of 1.0–7.0 wt. %.

To prevent thermal deterioration of the resin and to prevent creation of fish eyes and granular structure (unwanted irregularity like grains), an antioxidant can be added preferably to the resin. Examples of antioxidants are as follows:

(a) Phenol-based antioxidants:
6-tert-butyl-3-methylphenyl derivatives; 2,6-di-tert-butyl-p-cresol; 2,6-tert-butyl-4-ethylphenol; 2,2'-methylenebis-(4-ethyl-6-tert-butylphenol); 4,4'-butyridenebis(6-tert-butyl-m-cresol); 4,4'-thiobis(6-tertbutyl-m-cresol); 4,4'-dihydroxydiphenylcyclohexane; alkylated bisphenol; styrenated phenol; 2,6-di-tert-butyl-4-methylphenol; n-octadecyl-3-(3',5'-di-tert-butyl-4'-hydroxyphenyl)propionate; 2,2'-methylenebis(4-methyl-6-tertbutylphenol); 4,4'-thiobis(3-methyl-6-tert-butylphenyl); 4,4'-butylidenebis(3-methyl-6-tert-butylphenol); stearyl-β (3,5-di-tert-butyl-4-hydroxyphenyl)propionate; 1,1,3-tris(2-methyl-4-hydroxy-5-tert-butylphenyl)butane; 1,3,5-trimethyl-2,4,6-tris(3,5-di-tert-butyl-4-hydroxybenzyl) benzene; and terakis[methylene-3-(3',5'-di-tert-butyl-4'-hydroxyphenyl)propionate]methane.

(b) Ketone amine condensate-based antioxidants:
6-ethoxy-2,2,4-trimethyl-1,2-dihydroquinoline; polymers of 2,2,4-trimethyl-1,2-dihydroquinoline; and trimethyldihydroquinoline derivatives.

(c) Allylamine-based antioxidants:
Phenyl-α-naphthylamine; N-phenyl-β-naphthylamine; Nphenyl-N'-isopropyl-p-phenylenediamine; N,N'-di-β-naphthyl-p-phenylenediamine; and N-(3'-hydroxybutylidene)-1-naphthylamine.

(d) Imidazole-based antioxidants:
2-mercaptobenzoimidazole; zinc salt of 2-mercaptobenzoimidazole; and 2-mercaptomethylbenzoimidazole.

(e) Phosphite-based antioxidants:
Alkylated allylphosphite; diphenylisodecylphosphite; sodium tris(nonylphenyl) phosphite; tris(nonylphenyl) phosphite; and triphenyl phosphite.

(f) Thiourea-based antioxidants:
Thiourea derivatives; and 1,3-bis(dimethylaminopropyl)-2-thiourea.

(g) Other antioxidants useful for air oxidation:
Dilauryl thiodipropionate.

Representative examples of commercially available antioxidants are described below.

(1) Phenol-based antioxidants:
SUMILIZER BHT (trade name, manufactured by Sumitomo), IRGANOX 1076 (trade name, manufactured by Ciba Geigy), MARK AO-50 (trade name, manufactured by Adeca-Argus), SUMILIZER BP-76 (trade name, manufactured by Sumitomo), TOMINOX SS (trade name, manufactured by Yoshitomi), IRGANOX 565 (trade name, manufactured by Ciba Geigy), IONOX WSP (trade name, manufactured by ICI), SANTONOX (trade name, manufactured by Monsanto), SUMILIZER WX R (trade name, manufactured by Sumitomo), ANTAGECRYSTAL (trade name, manufactured by Kawaguchi), IRGANOX 1035 (trade name, manufactured by Ciba Geigy), ANTAGE W-400 (trade name, manufactured by Kawaguchi), NOCLIZER NS-6 (trade name, manufactured by Ohuchi Shinko), IRGANOX 1425 WL (trade name, manufactured by Chiba Geigy), MARK AO-80 (trade name, manufactured by Adeca-Argus), SUMILIZER GA-80 (trade name, manufactured by Sumitomo), TOPANOL CA (trade name, manufactured by ICI), MARK AO-30 (trade name, manufactured by Adeca-Argus), MARK AO-20 (trade name, manufactured by Adeca-Argus), IRGANOX 3114 (trade name, manufactured by Ciba Geigy), MARK AO-330 (trade name, manufactured by Adeca-Argus), IRGANOX 1330 (trade name, manufactured by Ciba Geigy), CYANOX 1790 (trade name, manufactured by ACC), IRGANOX 1010 (trade name, manufactured by Ciba Geigy), MARK AO-60 (trade name, manufactured by Adeca-Argus), SUMILIZER BP-101 (trade name, manufactured by Sumitomo), and TOMINOX TT (trade name, manufactured by Yoshitomi).

(2) Phosphorus-based antioxidants:
IRGAFOS 168 (trade name, manufactured by Ciba Geigy), MARK 2112 (trade name, manufactured by Adeca-Argus), WESTON 618 (trade name, manufactured by Vorg-Warner), MARK PEP-8 (trade name, manufactured by Adeca-Argus), ULTRANOX 626 (trade name, manufactured by Vorg-Warner), MARK PEP-24G (trade name, manufactured by Adeca-Argus), MARK PEP-36 (trade name, manufactured by Adeca-Argus), and HCA (trade name, manufactured by Sanko).

(3) Thioether-based antioxidants:
DLTDP "YOSHITOMI" (trade name, manufactured by Yoshitomi), SUMILIZER TPL (trade name, manufactured by Sumitomo), ANTIOX L (trade name, manufactured by Nippon Oil), DMTD "YOSHITOMI" (trade name, manufactured by Yoshitomi), SUMILIZER TPT (trade name, manufactured by Sumitomo), ANTIOX M (trade name, manufactured by Nippon Oil), DSTP "YOSHITOMI" (trade name, manufactured by Yoshitomi), SUMILIZER TPS (trade name, manufactured by Sumitomo), ANTIOS (trade name, manufactured by Nippon Oil), SEENOX 412S (trade name, manufactured by Sipro), MARK AO-412S (trade name, manufactured by Adeca-Argus), SUMILIZER TP-D (trade name, manufactured by Sumitomo), MARK AO-23 (trade name, manufactured by Adeca-Argus), SANDSTAB P-EPQ (trade name, manufactured by Sand), IRGAFOS P-EPQ FF (trade name, manufactured by Ciba Geigy), IRGANOX 1222 (trade name, manufactured by Ciba Geigy), MARK 329K (trade name, manufactured by Adeca-Argus), WESTON 399 (trade name, manufactured by Vorg- Warner), MARK 260 (trade name, manufactured by Adeca-Argus), and MARK 522A (trade name, manufactured by Adeca-Argus).

(4) Metal Deactivator

NAUGARD XL-1 (trade name, manufactured by Uniroyal), MARK CDA-1 (trade name, manufactured by Adeca-Argus), MARK CDA-6 (trade name, manufactured by Adeca-Argus), IRGANOX MD-1024 (trade name, manufactured by Ciba Geigy), and CUNOX (trade name, manufactured by Mitsui Toatsu).

Preferred antioxidants are the phenol-based ones. Commercially available phenol-based antioxidants include IRGANOX series products of Ciba Geigy, SUMILIZER BHT, SUMILIZER BH-76, SUMILIZER WX-R and SUMILIZER BP-101 of Sumitomo Chemical Co., Ltd. It is preferred that two or more types of phenol-based and/or phosphorus-based antioxidants are mixed up in view of higher effect of avoiding oxidization.

The most preferable examples of hindered phenol-based antioxidants are as follows:

1,3,5-trimethyl-2,4,6-tris(3,5-di-tert-butyl-4-hydroxybenzyl)benzene;

tetrakis[methylene-3-(3',5'-di-tert-butyl-4'-hydroxyphenyl)propionate]methane;

octadecyl-3,5-di-tert-butyl-4-hydroxy-hydrocinnamate;

2,2',2'-tris[(3,5-di-tert-butyl-4-hydroxyphenyl) propionyloxy]ethylisocyanurate;

tetrakis(2,4-di-tert-butyl-phenyl)-4,4'-biphenylene diphosphite;

4,4'-thiobis(6-tert-butyl-o-cresol);

2,2'-thobis(6-tert-butyl-4-methylphenol);

tris(2-methyl-4-hydroxy-5-tert-butylphenyl)butane;

2,2'-methylenebis(4-methyl-6-tert-butylphenol);

4,4'-methylenebis(2,6-di-tert-butylphenol);

4,4'-butylidenebis(3-methyl-6-tert-butylphenol);

2,6-di-tert-butyl-4-methylphenol;

4-hydroxymethyl-2,6-di-tert-butylphenol;

2,6-di-tert-4-n-butylphenol;

2,6-bis(2'-hydroxy-3'-tert-butyl-5'-methylbenzyl)-4-methylphenol;

4,4'-methylenebis(6-tert-butyl-o-cresol);

4,4'-butylidene-bis(6-tert-butyl-m-cresol); and 3,9-bis{1,1-dimethyl-2-{β-(3-tert-butyl-4-hydroxy-5-methylphenyl)propionyloxy]ethyl}-2,4,8,10-tetraoxaspiro[5,5]undecane.

Among these, preferred antioxidants have a melting point of 100° C. or higher, and more preferably 120° C. or higher. It is effective to use the hindered phenol-based antioxidants with phosphorus-based antioxidants.

It is possible in the present invention to add additives as required to the resin. Naturally, the additives to be used are not limited to these examples but can be any known kind and depend upon the properties desired. Examples of the additives are as follows.

1) Plasticizer: phthalate ester, glycol ester, fatty acid ester, and phosphate ester.

2) Stabilizer: lead type, cadmium type, zinc type, alkali earth metal type, and organo-tin type.

3) Flame retardant: phosphate ester, halogenated phosphate ester, halide, inorganic matters, and phosphorus-containing polyol.

4) Filler: alumina, kaolin, clay, calcium carbonate, mica, talc, titanium oxide, and silica.

5) Reinforcer: glass roving, metal fiber, glass fiber, milled glass fiber, and carbon fiber.

6) Foaming agent: inorganic foaming agents (ammonium carbonate and sodium bicarbonate), and organic foaming agents (nitroso type and azo type).

7) Vulcanizer: vulcanizing accelerator, and supplement accelerator.

8) Deterioration inhibitor: ultraviolet light absorber, antioxidant, metal inactivation agent, and peroxide decomposer.

9) Coupling agent: silane type, titanate type, chrome type, and aluminum type.

10) Various thermoplastic resins, and rubber.

11) Nucleator: organic nucleator (dibenzylidene sorbitol compound), and inorganic nucleator (calcium carbonate).

In the above embodiments, the ring-like lips 27b and 28c of the flanges 27 and 28 have the common height. It is also possible to give different heights to the ring-like lips of the flanges. The common height of the ring-like lips 27b and 28c allows the flange 28 to be more flexible and less rigid than the flange 27, due to the engaging openings 28b in the flange 28 formed differently from the flange 27. During the winding of the photo film, the photo film is likely to come closer to the flange 28 than the flange 27. This is favorable in avoiding the zigzag movement of the photo film while wound, and rendering neat the roll of the photo film. In spite of this, different heights can be given to the ring-like lips for different effects: the two flanges can have flexibility varied as desired, so as to adjust the course of the photo film to be wound into the cassette.

Figure 14:
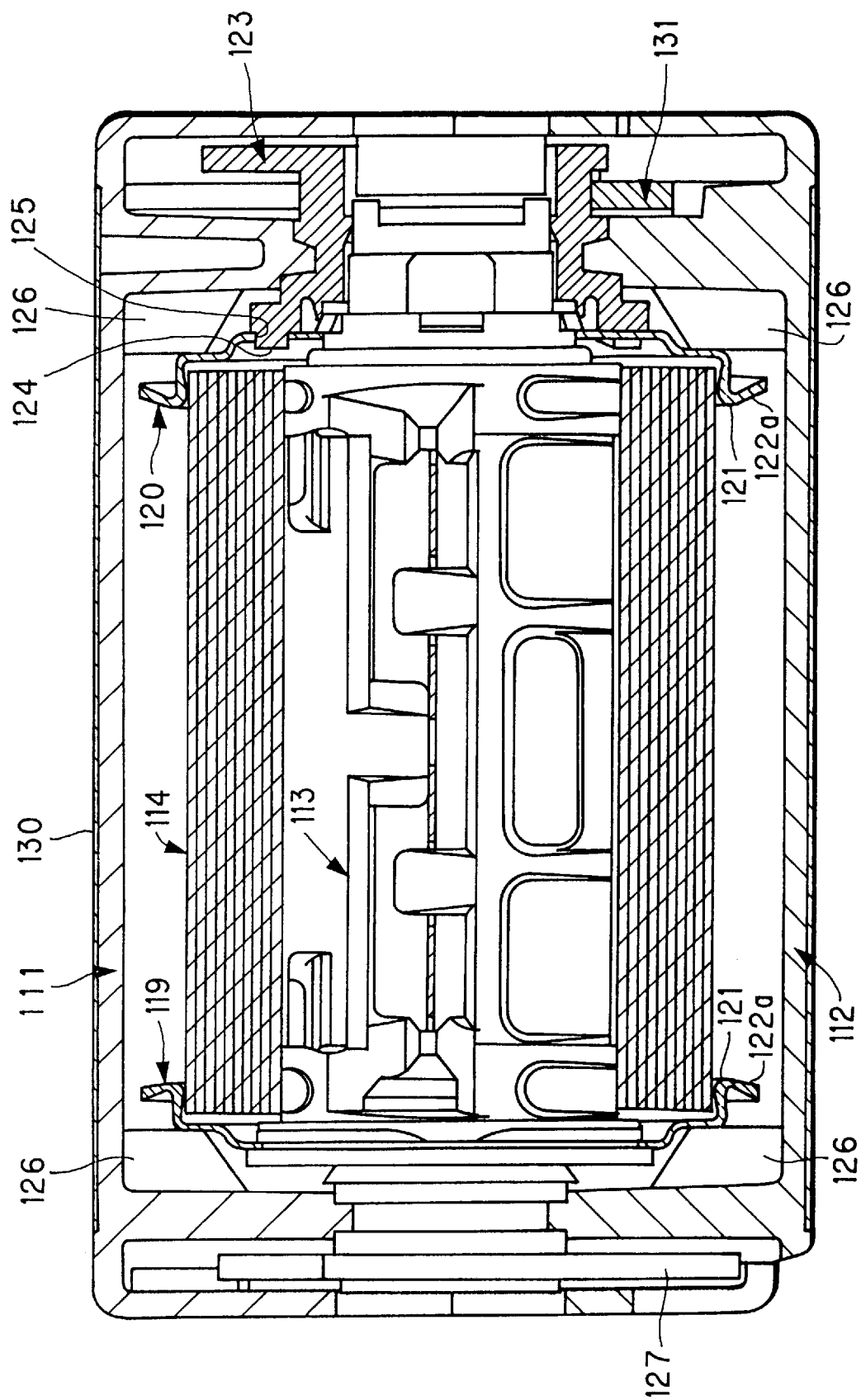
FIG. 14 is a horizontal section illustrating another preferred photo film cassette, in which a ring-like lip of each flange is so shaped that a mold can be easily removed.

Another preferred photo film cassette is referred to now, in which the a ring-like lip of each of the spool flanges is so shaped that the mold can be easily removed, by referring to FIG. 14.

The photo film to be contained in the cassette is constituted by a support and an emulsion layer applied to coat the support. The support is 0.07–0.15 mm thick, and is one of triacetate, polyester, polyphenylene naphthalate, polycarbonate and the like. The emulsion layer corresponds to a type of the photo film. A back layer may be formed on the reverse of the support, and can be nitrocellulose, diacetyl cellulose, triacetyl cellulose, butyral resin, gelatin, polycarbonate, or the like to which a magnetic recording material, antistatic agent, conductive substance, lubricant, or the like may be added.

In FIG. 14, shell halves 111 and 112 are respectively molded from resin, which requires the characteristics of low friction with flanges, resistance to impact of drop, and resistance to thermal deformation. Examples of the resin are styrene resin, polycarbonate resin, acrylonitrile-butadiene-styrene (ABS) resin, polyester resin, nylon resin, modified polyphenylene ether resin, polyacetal resin, polypropylene resin, polyethylene resin, methyl methacrylate resin, Teflon resin, polyphenylene sulfide resin, and mixture of any of those resins.

FIGS. 15A and 15B illustrate flanges 119 and 120, which have an outer diameter of 15 mm or more, an average thickness of 0.07–0.2 mm, and a maximum projected area of 100 $mm^2$ or more inside a circular contour, and are formed by the injection molding from resin of which the modulus of elasticity in flexure is 15,000–30,000 $kg/cm^2$, and which has high fluidity in the mold. The flanges 119 and 120 have respective ring-like lips 121, of which a projecting height SH is 1.1–1.7 mm.

The ring-like lips 121 are reinforced with a greater thickness, for preventing a photo film 114 from being loosened. Each of the ring-like lips 121 has an inside face 121a, which is inclined toward the roll of the photo film 114 in accordance with the increase in the height of the ring-like lips 121. This is for reducing friction created between the outer turns of the photo film 114 and the inside face 121a.

It is easy in the injection molding process to change the thickness partially. However it is likely that the undercut of the molded piece cannot be ejected, and if ejected forcibly, cannot be prevented from deformation. Let $\theta 11$ be an angle defined between the inside face 121a of the ring-like lips 121 and a spool core 113. It is preferred that the inside face 121a of the ring-like lips 121 is so formed that $\theta 11$ is in the range of 2–10 degrees, for the purpose of preventing deformation created upon forcible ejection from the mold. Should $\theta 11$ be more than 10 degrees, the molded piece is rubbed on the movable mold, or deformation occurs to disable ejection. Should $\theta 11$ be less than 2 degrees, no force of unloosening the roll of the photo film 114 can be created.

The ring-like lips 121 have respective ring-like projections 122 on their periphery. The ring-like projections 122 are adapted to reinforcement, and prevent the ring-like lips 121 from being spread. The ring-like projections 122 have respective inside faces 122a confronting one another. The inside faces 122a are inclined to come away from one another in their projected direction, at an angle $\theta 12$ relative to the plane of the disk face of each flange. This is for guiding the photo film 114 from the outside to the inside of the ring-like lips 121 while the photo film 114 is wound. The angle $\theta 12$ has a range of 1–30 degrees, preferably 3–25 degrees, and desirably 5–16 degrees.

The ring-like projections 122 have a thickness that increases outwardly, for avoiding being deformed by the photo film 114 while 122 guides the photo film 114. Let t22 be the thickness of the tip of the ring-like projections 122 (See FIGS. 18A and 18B). A preferable range of t22 is 0.1–0.25 mm, in consideration of the moldability of the flanges, and avoidance of deformation.

On the spool core 113 is fixed a data plate 127 of a sector shape, to which a data flange sticker is attached. A sticker 130 is also attached to a cassette shell 110, and indicates a type of the photo film, and a serial number of the cassette.

The upper shell half 111 has a lock pawl 132 formed integrally therewith. A shutter 116, when rotated to a closed position, is locked by the lock pawl 132. When the cassette is set into a camera, a display device, or the like, then an opener mechanism releases the shutter 116 from the locking at the lock pawl 132. Note that it is possible to eliminate the shutter 116, define a passage port within a port portion 115 and attach light-trapping ribbons to protect the cassette shell 110 from ambient light.

While the photo film 114 is fully contained in the cassette shell 110 as illustrated in FIG. 15, the outer turns of the photo film 114 are partially covered in the ring-like lips 121 of the flanges 119 and 120, and are prevented from being loosened about the spool core 113. When the spool core 113 is rotated in the unwinding direction, the photo film 114 rotates together with the spool core 113.

Regulating ridges 126 inside the shell halves 111 and 112 prevent the flanges 119 and 120 from being spread. In the innermost position of the port portion 115, confronting ones of the regulating ridges 126 are shaped to increase their distance from each other, to decrease their regulating extent. The leader of the photo film 114, after being separated by a separator claw 118, is advanced through a passage port 117. The flanges 119 and 120 are spread outward during the leader advancement. The photo film 114 is advanced between the ring-like lips 121 as it is arch-shaped relative to its width direction. Note that regulating ridges may be disposed only on one side.

When the camera is loaded with the photo film cassette, a mechanism of the camera releases retention of the shutter 116 at the lock pawl 132. The shutter 116 is rotated in the opening direction. Then the spool core 113 is rotated in the unwinding direction, to start advancing the photo film 114. The ring-like lips 121 about the flanges 119 and 120 keep the photo film 114 from being loosened. The photo film 114 rotates with the spool core 113. The leader of the photo film 114 during the rotation is contacted on the separator claw 118, separated from the roll, and directed toward the passage port 117.

With the leader of the photo film 114 moved into the passage port 117, the ring-like lips 121 are spread by the photo film 114. In the innermost position of the port portion 115, the photo film 114 is released from regulation of the ring-like lips 121. Only the flange 120, unlike the flange 119, is rotated in the unwinding direction forcibly by the engagement of a ratchet claw 124 and a engaging opening 125, to advance the leader. Then the photo film 114 is advanced to the outside of the cassette shell 110.

In rewinding, the spool core 113 is rotated in reverse. With the trailer of the photo film 114 secured to the spool core 113, the photo film 114 is wound into the cassette shell 110. In the innermost position of the passage port 117, the flanges 119 and 120 are spread. The inside faces 122a of the ring-like projections 122 guide the photo film 114 toward the inside of the ring-like lips 121 while the ring-like lips 121 are spread by the photo film 114. The photo film 114 is taken up between the flanges 119 and 120, and wound about the spool core 113.

The flanges 119 and 120 are so formed that A=18 mm, B=17 mm, C=7 mm, D=12 mm, E=2.15 mm, and SH=1.5 mm, where A is a diameter of the flanges 119 and 120, B is a minimum diameter of the ring-like lips 121, C is a diameter of a smaller bearing hole 120a in the flange 120, D is a diameter of a greater bearing hole 119a in the flange 119 (See FIGS. 5 and 6), E is a general height of the flanges 119 and 120 as viewed in the axial direction, and SH is the projecting height of the ring-like lips 121, As illustrated in FIGS. 16A and 16B, a mold set 139 for the injection molding of the flange 119 includes a movable mold 140 for the interior side of the flange 119 and a stationary mold 141 for the exterior side of the flange 119. A guide pin 142 is disposed in parallel with the axis of the flange 119 through the bearing hole 119a. The movable mold 140 is moved along the guide pin 142, and simply back and forth to form the flange 119. Note that an alternative mold set which may be used may be a family mold set adapted to simultaneously molding the flanges 119 and 120. It is preferred that the family mold set is constituted by three plates inclusive of a stationary mold, an intermediate die plate and a movable mold. A sprue, a runner and a gate can be disposed between the stationary mold and the intermediate die plate, while a molded flange can be produced between the intermediate die plate and the movable mold.

However the polyethylene resin as disclosed in U.S. Pat. No. 5,211,348 is unsuitable to the injection molding with the mold set 139, because thickness cannot be regularized, and short shot occurs to very thin disk-like pieces. Preferred resin should meet conditions of the above-described range of the characteristic (modulus of elasticity in flexure), and high fluidity as compared with the polyethylene resin. For the high fluidity, the melt flow index (MI value) of the resin should be 70 grams per 10 minutes under the temperature of 280° C. and load of 10 kg in accordance with JIS-K-7210. Those conditions are met by 6/6 nylon alloy Y19A (trade name) manufactured by Sumitomo Chemical Co., Ltd. The resin has characteristics indicated in TABLE 5:

TABLE 5

Density: 1.07, measured as per ASTM D-792;

Yield strength in extension: 590 kg/cm² at the thickness t=3.2 mm, measured as per ASTM D-638;

Tensile elongation at break: 80% at the thickness t=3.2 mm, measured as per ASTM D-638;

Modulus of elasticity in flexure: 22,600 kg/cm² at the thickness t=3.2 mm, measured as per ASTM D-790;

Strength in flexure: 830 kg/cm² at the thickness t=3.2 mm, measured as per ASTM D-790;

Impact strength with Izod notch: 18 kg·cm/cm at 23° C. and at the thickness t=3.2 mm, measured as per ASTM D-256;

Impact strength with notch: 7 kg·cm/cm at −30° C. and at the thickness t=3.2 mm, measured as per ASTM D-256; and Temperature of thermal deformation: 195° C. under 4.6 kg at the thickness t=6.4 mm, measured as per ASTM D-648; and 112° C. under 18.6 kg at the thickness t=6.4 mm, measured as per ASTM D-648.

It is likely that the injection molding causes unwanted creation of weld lines, short shot, warpage, sink marks, crazing, and cracking, in accordance with shapes, positions and the number of the gates. The gate of the present embodiment is a disk gate, or a diaphragm gate. The gate thickness is determined equal to the average thickness of the flanges 119 and 120. The length F of the gate land is determined 0.1–2 mm. Reference numeral 147 designates a disk gate position.

Figure 17:
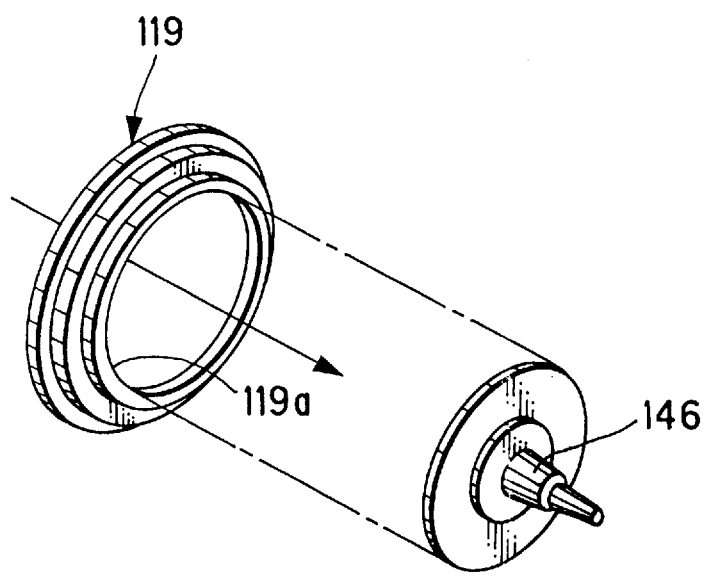
FIG. 17 is an perspective view illustrating a step of punching out a runner, to produce the flange.

A sprue 143 is disposed on the stationary mold 141 and lies on the axis of the flange 120 through the bearing hole 120a. A distal end of a runner lock pin 145 extends to a cold-slug well 144 of the movable mold 140. The runner lock pin 145 operates to draw the molded flange while the movable mold 140 opens, and then to push the molded flange after the movable mold 140 is fully opened. Note that an ejector pin may be added for ejection of the molded flange. As illustrated in FIG. 17. the molded flange is then subjected to the punching in a punching machine, in which a runner 146 is cut away along the disk gate to form the bearing hole 119a.

Cycle time is constituted by injection time, dwell time, cooling time, mold open time, intermediate stage, and mold close time. To improve efficiency in the manufacture depends on shortening the cycle time.

When the movable mold 140 is moved open, it is necessary to remove the molded flange easily from the stationary mold 141. The inside face 121a of the ring-like lips 121 is inclined. If the ring-like lips 121 are given regular thickness, a face of the ring-like lips 121 reverse to the inside face 121a would be an undercut which could not be released easily from a stationary mold. As illustrated in FIG. 18, an outside face 121b of the ring-like lips 121 is preferably provided with small inclination directed opposite to the inside face 121a, as draft for the molding. Should the draft be too great, the flange would have excessive thickness to increase the resistance to the looseness of the film. Failure in advancement of the photo film 114 might occur. Consequently an angle θ13 can have a range of 0–5 degrees, preferably 0–3 degrees.

In consideration of the moldability, the ring-like lips 121 increase in thickness in their projected direction, because the faces 121a and 121b are inclined in the directions of increasing the thickness. If the inside face 121a is simply formed in the range $20° \leq \theta 11 \leq 10°$, it is likely that a root position of the inside face 121a will collapse during the ejection of the piece. This is because lowered strength occurs upon the ejection of the flanges 119 and 120 with the average thickness of 0.07–0.25 mm, when the root position of the inside face 121a is insufficiently rounded and receives concentrated stress, even if the undercut factor is maximum (tolerable extensibility) in consideration of forcible ejection of the molded piece.

Figure 19:
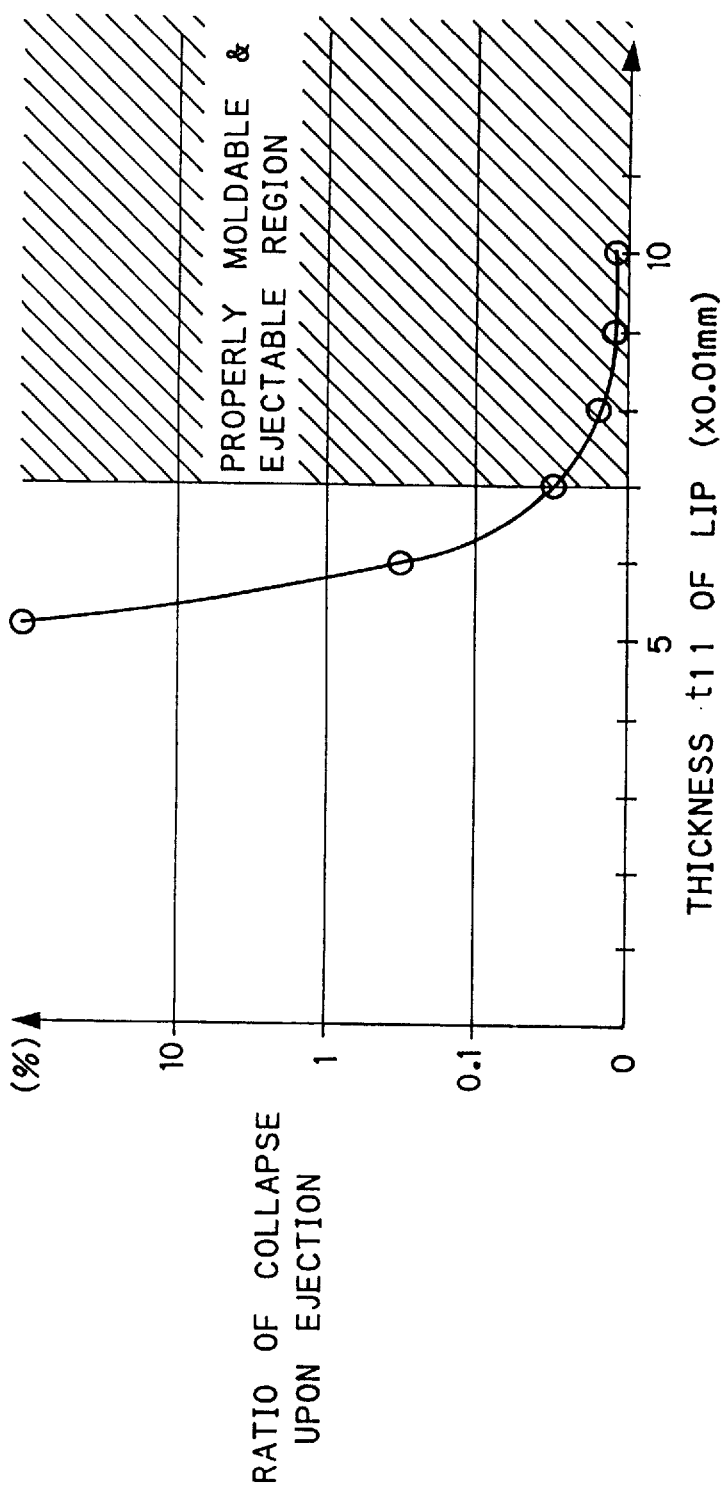
FIG. 19 is a graph illustrating a relationship between a ratio of collapse upon ejection of the molded piece and the thickness of the ring-like lip, as results of experiments.

The extent of preventing the film from being loosened at the ring-like lips 121 is changed in accordance with changes in the thickness θ11 and the radius R11 of the curvature at the root position of the inside face 121a. Experiments were conducted for optimum ranges of t11 and R11, in view of prevention of collapse during the ejection of the flange, and determining the extent of preventing the film from being loosening. Results of the experiments are illustrated in FIG. 19 and TABLE 6.

TABLE 6

| Force for Drawing Film (PF) | | R11 (mm) | | |
|---|---|---|---|---|
| | 0.2 | 0.3 | 0.4 | 0.5 |
| t11 (mm) 0.07 | A | A | A | B |
| 0.10 | A | A | B | C |
| 0.15 | A | A | B | D |
| 0.25 | A | B | B | D |
| 0.30 | B | C | D | D |

It is difficult experimentally to measure the extent of prevention of the photo film from being loosened. In the experiments as conducted, the change in the extent of prevention of the photo film from being loosened was observed by measuring the force for drawing the photo film (referred to as "PF property"). This is because, when the extent of prevention of the photo film from being loosened is great, the friction between the photo film 114 and the ring-like lips 121 is great, and the force for drawing the photo film is great. On the contrary, when the extent of prevention of the photo film from being loosened is small, the friction between the photo film 114 and the ring-like lips 121 is small, and the force for drawing the photo film is small. In TABLE 6, A represents "Excellent", B represents "Good", C represents "Fair", and D represents "Failure".

Further experiments were conducted, to obtain the results of FIG. 19. R11 was determined 0.2 mm, while the corner thickness t11 was changed. The runner lock pin 145 was moved through the movable mold 140 for ejection, due to which there occurred collapse in the root position of the ring-like lips 121. Percentage of occurrence of the collapse is shown in the graph of FIG. 19. As is understood from the graph, the optimum range of t11 was 0.07–0.25 mm. Should t11 be too small, collapse or fold occurs. Should t11 be too great, the force for drawing the film in the TABLE would be too low. The optimum range of R11 was found to be 0.4 mm or smaller. Should R11 be too small, collapse or fold would occur. Should R11 be too great, the force for drawing the film in the TABLE would be too low.

Figure 18A:
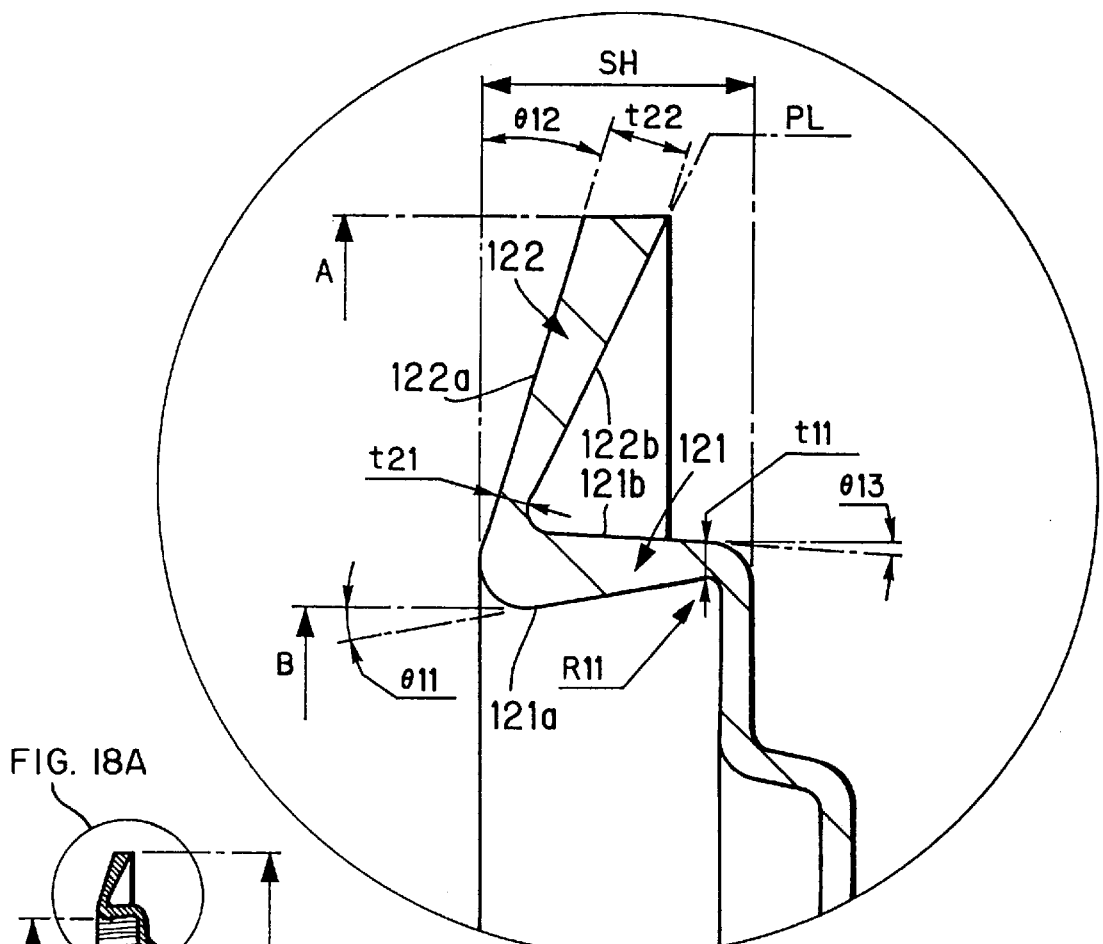
FIG. 18A is a cross section in enlargement, illustrating the ring-like lip with the flange.
Figure 18B:
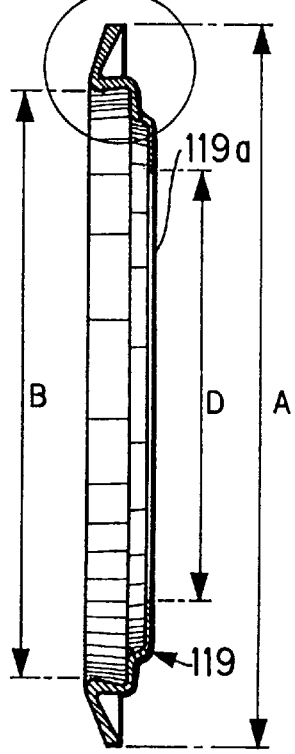
FIG. 18B is a cross-section illustrating the ring-like lip with the flange.

If there remains a mark of the mold in a portion of the flanges 119 and 120, it is likely that difficulties occur, such as scratches of the photo film 114 and hindrance to the leader advancement. In FIGS. 18A and 18B, a parting line PL is positioned along an outside face 122b of each of the ring-like projections 122. Should burrs be formed along the parting line PL, the burrs will not contact the photo film 114. Thus, no burrs are dropped or stuck on the photo film 114.

It is to be noted that, although the mold set in FIG. 16 is used for the flange 19, the flange 20 can be also molded by a similar mold set.

Figure 20:
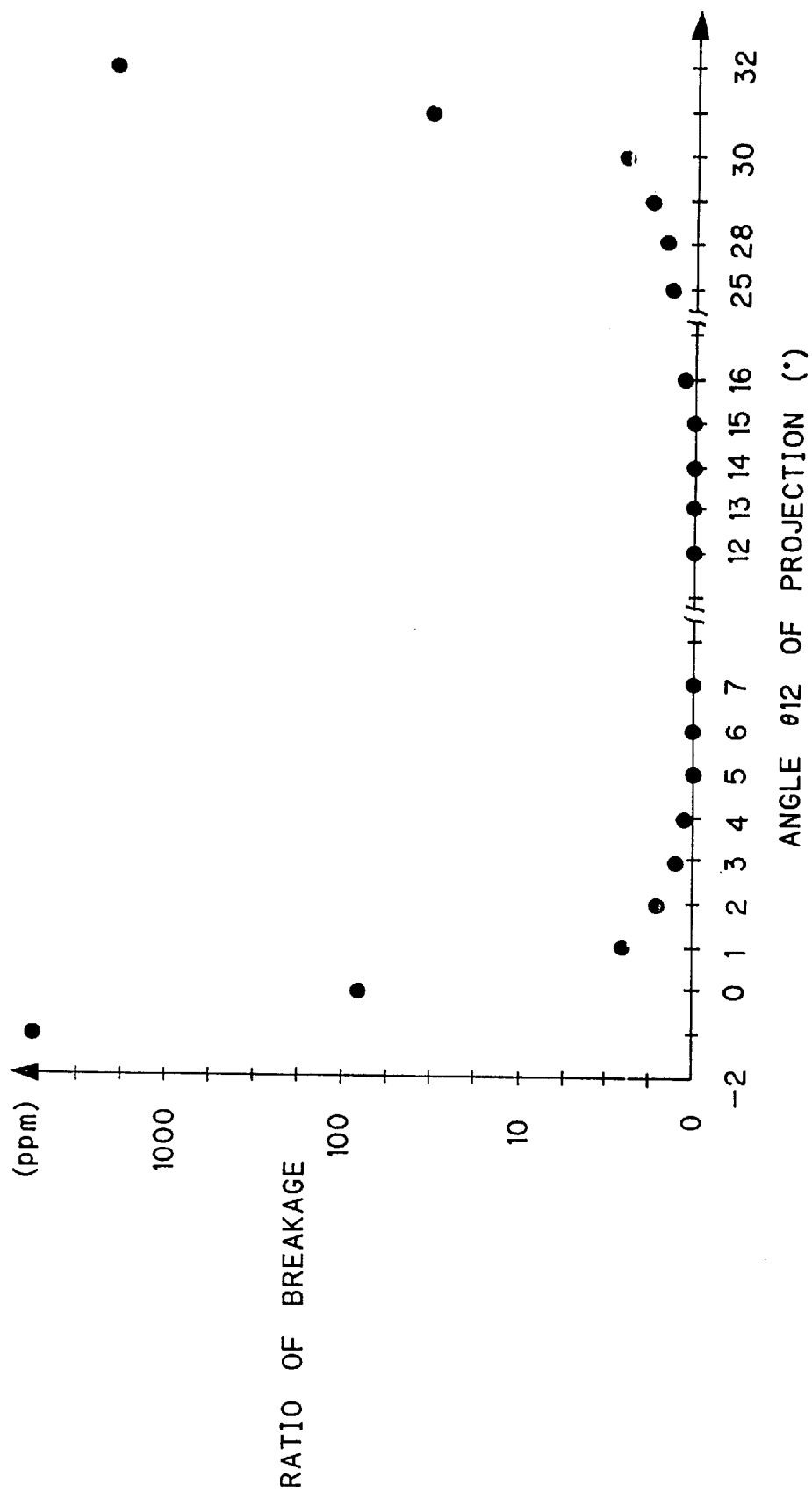
FIG. 20 is a graph illustrating the testing for constructing a variant photo film cassette, in which inclination of inside faces of ring-like projections of flanges is determined suitably.
Figure 21:
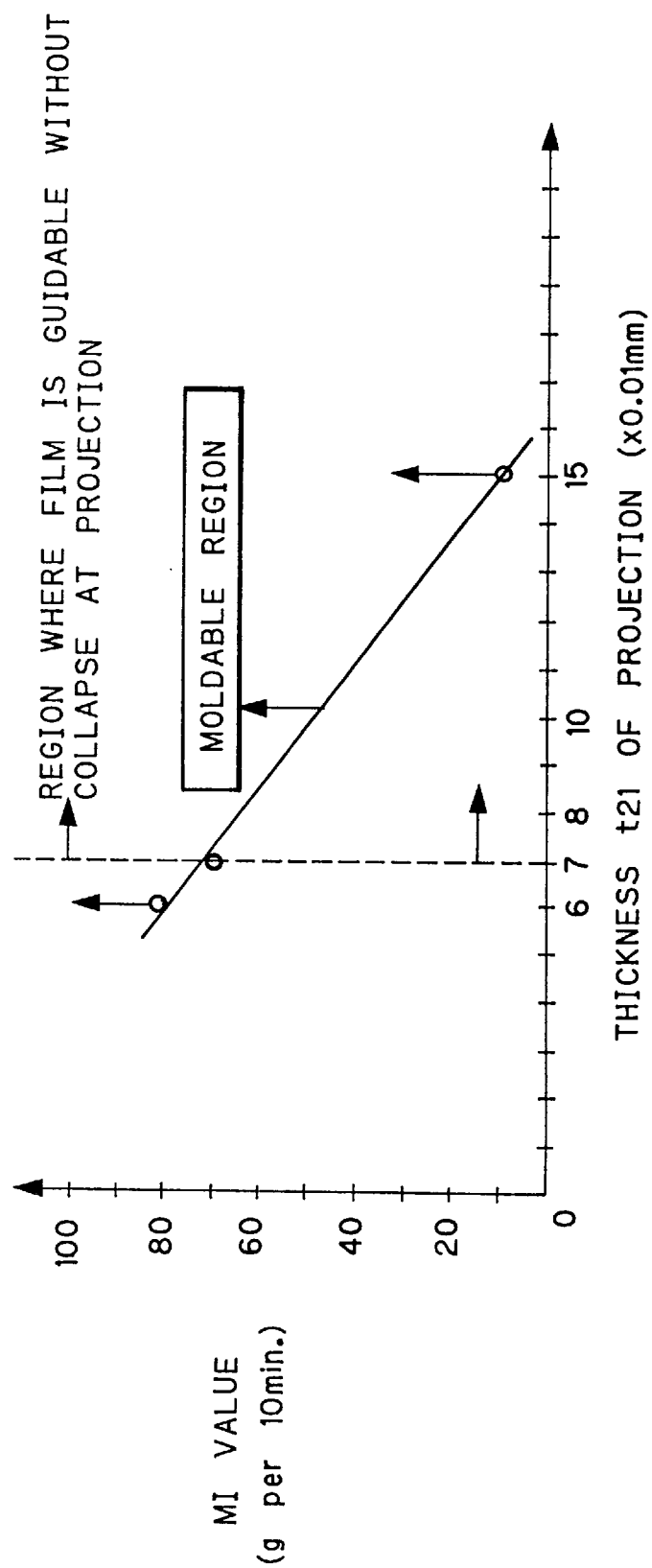
FIG. 21 is a graph illustrating a relationship between fluidity of resin and thickness of the ring-like projections, as results of experiments.

Another embodiment of the photo film cassette is referred to now, in which an angle θ12 of inclining the inside faces 122a of the ring-like projections 122 is determined in a preferable range (See FIGS. 20 and 21). The flanges 119 and 120 of FIGS. 14–18 have an outer diameter of 15 mm or more, an average thickness of 0.07–0.2 mm, and a maximum projected area of 176 mm² or more inside a circular contour, and are formed by the injection molding from resin of which the modulus of elasticity in flexure is 15,000–30,000 kg/cm², and which has high fluidity in the mold.

The flanges 119 and 120 of FIGS. 14–18 are so formed that A=18 mm, B=17 mm, C=7 mm, D=12 mm, E=2.15 mm, and 1.1 mm≦SH≦1.7 mm, where A is a diameter of the flanges 119 and 120, B is a minimum diameter of the ring-like lips 121, C is a diameter of a smaller bearing hole 120a in the flange 120, D is a diameter of a greater bearing hole 119a in the flange 119 (See FIGS. 5 and 6), E is a general height of the flanges 119 and 120 as viewed in the axial direction, and SH is the projecting height of the ring-like lips 121.

The flange 119 is molded. In FIG. 17, the molded flange is then subjected to punching in a punching machine, in which a runner 146 is cut away along the disk gate to form the bearing hole 119a. No gate mark remains on the flange 119. No difficulties occur, such as scratches of the photo film 114 and hindrance to the leader advancement. Note that it is also possible to adapt the in-mold degating, according to which a gate mark is cut away inside the mold along the disk gate.

Cycle time is constituted by injection time, dwell time, cooling time, mold open time, intermediate stage time, and mold close time. Improved efficiency in the manufacture depends on shortening the cycle time. However failure in the injection molding, such as short shot, is likely to occur, due to the shape causes of the flange 119 and 120: The flanges 119 and 120 respectively have the flange inner ring walls about the bearing holes 119a and 120a, which are retracted over the level of the flange outer ring walls with the ring-like lips 121, as viewed in the cross section. The resin is likely not to flow smoothly in the mold locally, for example to the distal end of the ring-like projections 122 (end of the cavity). A maximum distance l between the disk gate and the distal end of the mold is considerably great. The average thickness t is considerably small. The ratio of l/t is from 130 to 140, although the ratio l/t in the injection molding is generally from 50 to 80.

The inside face 121a of the ring-like lips 121 is an undercut to be released from the movable mold 140. It is likely that the undercut of the molded piece is not easily ejected, and if ejected forcibly, will be deformed.

In general, it is conceivable to use a known method in which a side core is added and moved perpendicularly to the back-and-forth direction of movement for the purpose of release of the undercut portion. However there are problems of high cost and low efficiency: molds must have a complex structure; cycle time for the molding must be longer; and the molds are rapidly abraded. Otherwise, it is conceivable to use a known method in which a mold for the circular shape is rotated during the release of the mold. However there are problems of high cost due to the complex structure of the mold.

In view of the cost, it is preferable that the mold set 139 for the flange is constituted by a pair of molds, of which the movable mold can be moved simply back and forth in the axial direction of the spool.

Should the photo film 114 be wound without application of any tension, the photo film 114 might wind about the ring-like projections 122 to collapse the ring-like projections 122. Then the leader of the photo film 114 could not be advanced. The difficulty in the leader advancement depends on the angle θ12 at which the ring-like projections 122 are inclined. Experiments were conducted to observe a value at which the θ12 was optimized. Results of the experiments are illustrated in FIG. 20.

FIG. 20 illustrates a preferred range of θ12. When the angle θ12 of the ring-like projections 122 was too great, there was higher ratio of difficulties in the leader advancement due to collapse of the ring-like projections 122. When the angle θ12 of the ring-like projections 122 was too small, it was also likely that the ring-like projections 122 collapsed. Consequently the preferred range of θ12 was found to be 1–30 degrees, desirably 3–25 degrees, and more desirably 5–16 degrees.

The ring-like projections 122 require sufficient strength for guiding the photo film 114 without being collapsed. It is undesired to reduce the space between the molds below a lower limit, because short shot would occur locally in the mold where the resin would be unlikely to flow smoothly. It is necessary to observe the thickness of the ring-like projections 122 relative with the fluidity of the resin in the mold set 139. Experiments were conducted with various examples of resin and various values of the thickness of the ring-like projections 122. Results of the experiments are illustrated in FIG. 21.

As illustrated in FIG. 21, it was found that the ring-like projections 122 must have a thickness of 0.07 mm or more, for guiding the photo film 114 without being collapsed. For good moldability in the mold set 139 in which this remarkably small thickness was formed, the melt flow index (MI value) of the preferred resin should be at least 70 grams per 10 minutes under the temperature of 280° C. and load of 10 kg in accordance with JIS-K-7210.

This condition was met by 6/6 nylon alloy Y19A (trade name) manufactured by Sumitomo Chemical Co., Ltd.

Should the ring-like projections 122 be partially thickened over 0.07 mm for the purpose of greater strength, unwanted inner stress would occur in the thickened portion, to cause deformation and cracking. It is preferred that the thickness of the ring-like projections 122 is increased toward their tip, in gradual fashion with inclination. Let t21 be thickness of the root of the ring-like projections 122. Let t22 be thickness of the tip of the ring-like projections 122. The moldability, strength of the ring-like projections 122 and the regulating force for the spread of the ring-like lips 121 are changed in accordance with t21 and t22. Experiments were conducted to observe optimum sizes. Results are illustrated in TABLE 7.

TABLE 7

| t12 (mm) | t22 (mm) | Moldability | Force for Drawing Film (PF) | Force for Leader Advancement (STAR) |
|---|---|---|---|---|
| 0.06 | 0.06 | D | A | C |
|  | 0.08 | C | A | C |
|  | 0.10 | C | A | B |
|  | 0.25 | C | A | B |
|  | 0.30 | B | A | A |
| 0.07 | 0.08 | C | A | C |
|  | 0.10 | B | A | B |
|  | 0.25 | A | A | A |
|  | 0.30 | A | A | A |
| 0.10 | 0.10 | B | A | B |
|  | 0.25 | A | A | A |
|  | 0.30 | A | A | A |
| 0.20 | 0.25 | A | C | A |

TABLE 7-continued

| t12 (mm) | t22 (mm) | Mold- ability | Force for Drawing Film (PF) | Force for Leader Advancement (STAR) |
|---|---|---|---|---|
|  | 0.30 | A | D | A |
| 0.30 | 0.30 | A | D | A |

To evaluate the moldability in the TABLE, the easiness in release from the mold set 139, smoothness of the outer surface, and existence of distortion, wrinkles and spots were checked. In the TABLE, A represents "Excellent" without any defects. B represents "Good" without any problem of defects. C represents "Fair". D represents "Failure" with significant defects. It was observed that the moldability is lower according to the regularized extent of thickness of the ring-like projections 122.

According to changes in the thickness of the ring-like projections 122, the force of regulating the spread of the ring-like lips 121 was changed. The cassette was the type in which the leader of the photo film 114 was advanced by the rotation of the spool core 113. Excessive friction between the photo film 114 and the ring-like lips 121 made it unable to advance the leader of the photo film 114. According to the present invention, the force for drawing the photo film (referred to as "PF property") is limited in a preferred range. In the TABLE, A represents "Excellent", B represents "Good", C represents "Fair", and D represents "Failure" and too much force required for drawing the photo film. When the thickness t21 of the root of the ring-like projections 122 was thicker, the regulating force of the spread of the ring-like lips 121 was greater, to raise the friction between the photo film 114 and the ring-like lips 121.

To evaluate the force for the leader advancement (referred to as "STAR") in the TABLE above, an air cylinder was used. At first, the leader of the photo film 114 is advanced from the cassette. A plunger of the air cylinder is directed opposite to the advancing direction of the leader, and pressed against the leader as advanced. The force applied to the air cylinder is 150 grams at first, and is raised gradually, until the plunger pushes the leader 170 mm. The maximum force to the plunger was read and evaluated. When the maximum force is 450 grams or more, it was evaluated as "A". When the maximum force is 300–450 grams, it was evaluated as "B". When the maximum force is 300–450 grams but very near to 300 grams, it was evaluated as "C". When the maximum force is 300 grams or less, it was evaluated as "D".

It was found that the thickness t21 of the root of the ring-like projections 122 should be 0.07 mm or more. In consistency with this thickness t21, an optimum range of the thickness t22 of the tip of the ring-like projections 122 was 0.1–0.25 mm, as understood from TABLE 7.

In relation to the flanges 27 and 28 of FIG. 4, the spool core 26 is insertable into the flanges 27 and 28 while moved in a single direction, as referred to above. Improvement of flanges 27 and 28 to raise the insertability of the spool core 26 is described with another preferred embodiment of a photo film cassette, with reference to FIGS. 22–35.

Flanges 219 and 220 have respective ring-like lips 221, of which inside faces 221a are inclined to come closer to the spool core in the projected direction of the ring-like lips 221 over the flanges 219 and 220.

There are ring-like projections 222, of which inside faces 222a are inclined to come away from one another in the radial direction of the flanges 219 and 220.

Flanges 219 and 220 are different in function from one another. Should the flanges 219 and 220 be secured in wrong positions, the leader of the photo film could not be advanced. A spool core 213 is formed with larger and smaller receiving portions 213a and 213b. A bearing hole 219a in the flange 219 is larger than a bearing hole 220a in the flange 220. This is favorable in preventing errors in assembly of the flanges.

Figure 22:
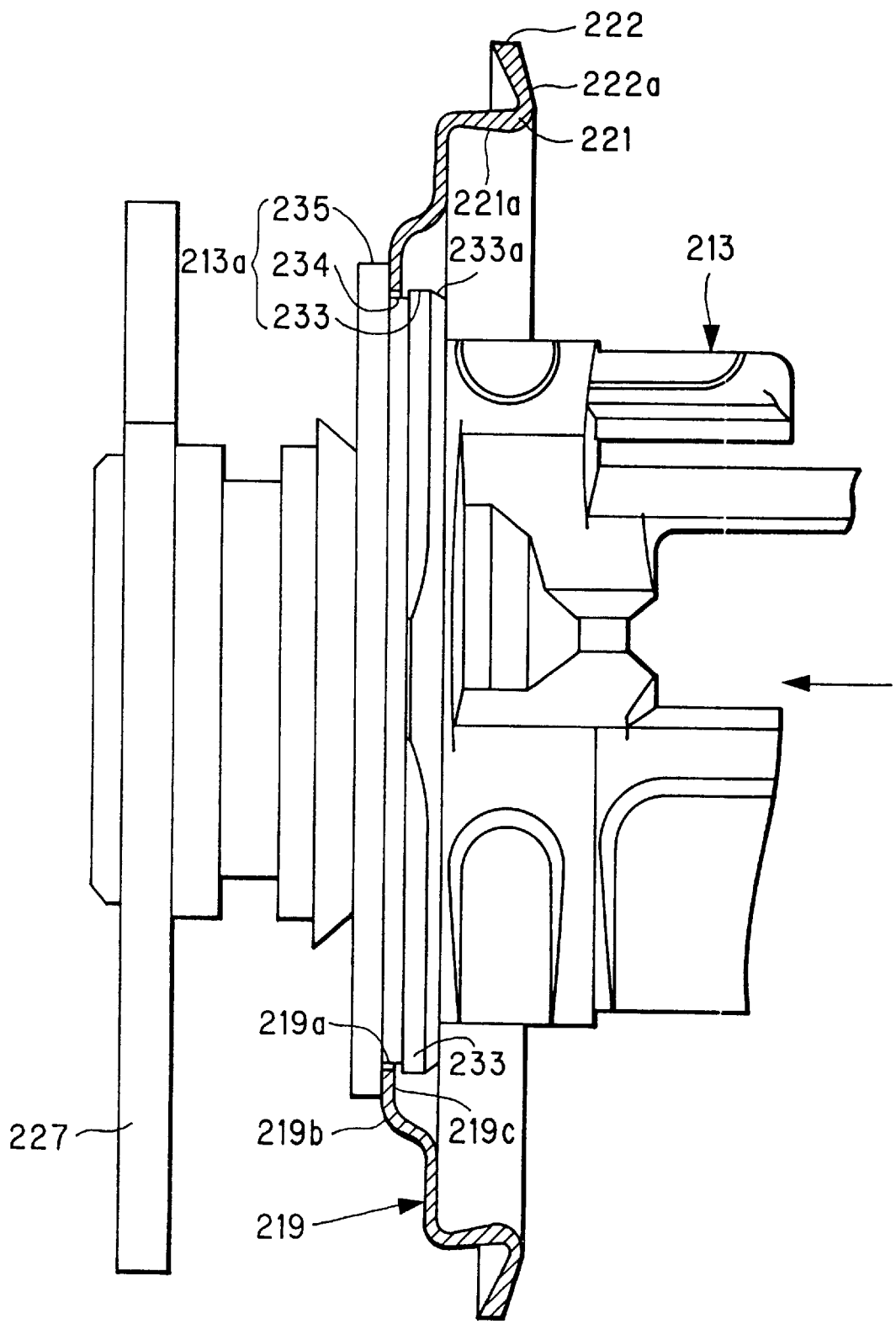
FIG. 22 is an explanatory view in elevation, illustrating another preferred embodiment to raise insertability of a spool core of a spool into flanges, one of which is secured to a flange receiving portion.
Figure 23:
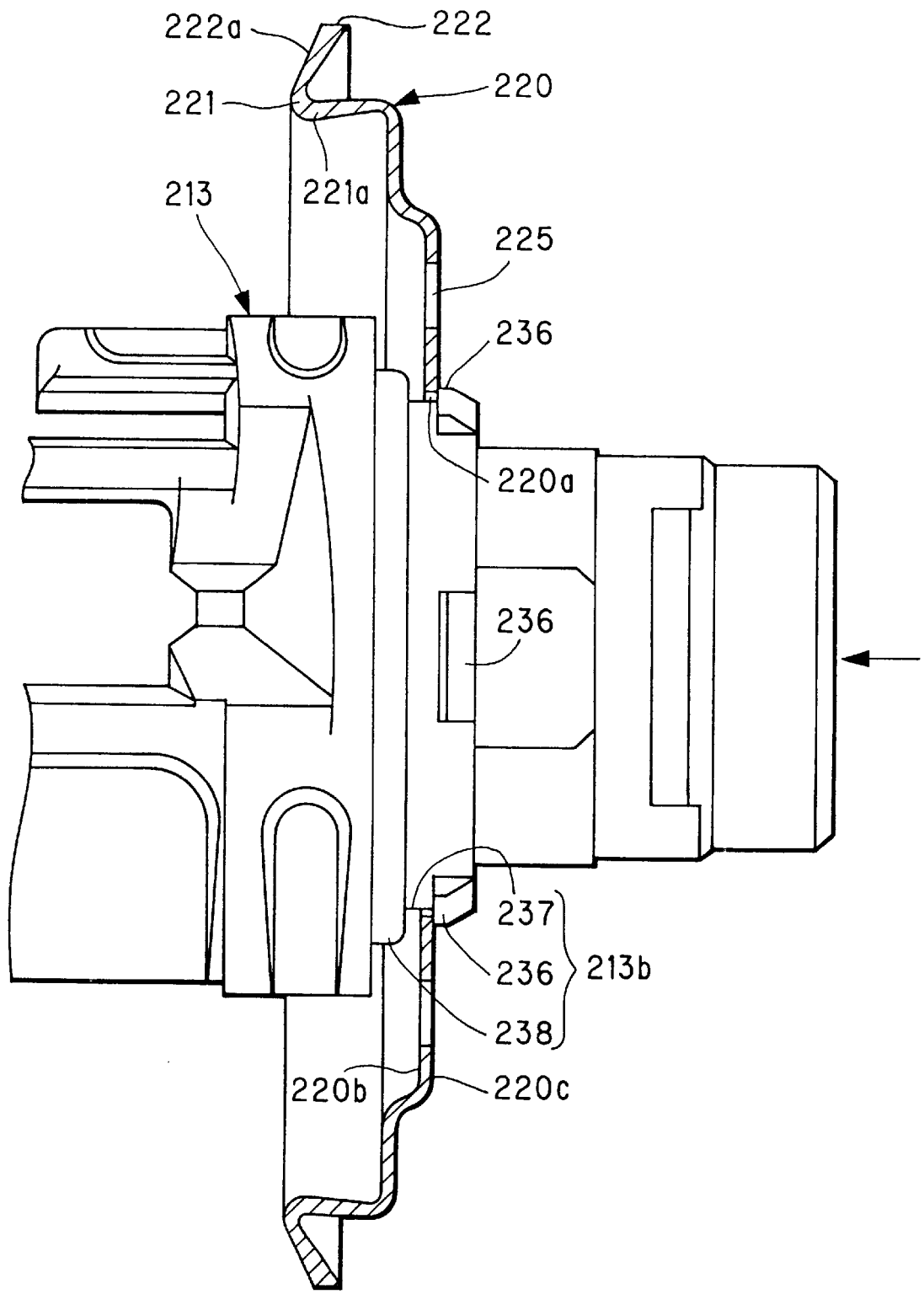
FIG. 23 is an explanatory view in elevation, illustrating a state where another flange of the spool of FIG. 22 is secured to a flange receiving portion.

As illustrated in FIG. 22, the receiving portion 213a has greater diameter than the middle of the spool core 213, and includes retaining claws 233, a recess 234 and a stopper 235. The retaining claws 233 are disposed about the spool core 213 at a regular pitch. Each of the retaining claws 233 has an inclined face 233a which is faced to receive an access of the flange 219.

A bar code data plate 227 has a greater diameter than the receiving portion 213a. The flanges 219 and 220 are mounted on to the spool core 213 while moved in a single direction past the receiving portion 213b. An exterior face 219b of the flange 219 is directed toward the spool core 213 before the flange 219 is secured to the spool core 213. The inclined face 233a of the retaining claws 233 is pressed against the edge of the bearing hole 219a to spread the bearing hole 219a with deformation, to allow passage of the flange 219 toward the recess 234. When the flange 219 is set in the recess 234, an erect face of the retaining claws 233 opposite to the inclined face 233a is contacted on the edge of the bearing hole 219a. The flange 219 is prevented from moving past the retaining claws 233 in the direction reverse to the insertion.

The diameter of the bottom of the recess 234 is smaller than the diameter of the bearing hole 219a. The width of the recess 234 is greater than the thickness of the flange 219, to support the flange 219 in rotatable fashion. The stopper 235 contacts on an edge of the bearing hole 219a of the flange 219, to limit insertion of the flange 219.

FIG. 28 illustrates the receiving portion 213b. An interior face 220b of the flange 220 is directed toward the spool core 213 before the flange 220 is secured to the spool core 213. The receiving portion 213b has the smaller diameter than the receiving portion 213a, and includes retaining claws 236, a recess 237 and a stopper 238. The structure and operation of the retaining claws 236, the recess 237 and the stopper 238 are the same as those of the retaining claws 233, the recess 234 and the stopper 235 in FIG. 22. Detailed description is omitted.

It is necessary to make it easy to secure the flanges 219 and 220 to the spool core 213. No resin powder should be created even when the flanges 219 and 220 are rubbed on the spool core 213. Such conditions might not be met in accordance with the manner of molding the flanges 219 and 220. Experiments were conducted to observe ease of securing of the flanges 219 and 220, and creation of resin powder about the spool core 213.

1st Example. Continuous resin sheet ZAIRON 9101 (trade name, manufactured by Asahi Chemical Industry Co., Ltd.) was formed by extrusion, to a thickness of 0.11 mm. The continuous sheet was heated and softened in a heating step, and thermoformed in a forming step in accordance with the vacuum forming or pressure forming. The continuous sheet was subjected to the punching step. The punching machine was provided with two kinds of punch/die sets. One of the punch/die sets was adapted to forming the flange 219 with the bearing hole 219a by punching the continuous sheet. Another of the punch/die sets was adapted to forming the flange 220 with the bearing hole 220a and plural engaging openings 225. The continuous sheet was moved at a monitored length. Both punch/die sets were simultaneously driven, to form the flanges 219 and 220 at the same time. In the punching machine, two punch devices included in the punch/die sets were arranged in the same orientation. Two die devices included therein were arranged in the same orientation.

2nd Example. The thermoforming of the 1st Example included the heating step, the forming step, the punching step, and a step for withdrawing the sheet. There are drawbacks in that the scale of the manufacturing system is enlarged, to raise the cost for the facilities of the system. The surplus sheet remains after the punching, as waste of raw material. There are differences in the angle of the bending after thermoforming. It is difficult to change thickness locally. In view of this, the flange according to the 2nd Example was molded by injection molding.

In the injection molding, moldability depends on the outer shape, thickness and resin of the flanges 219 and 220. The flanges 219 and 220 had an outer diameter of 18 mm, and a maximum projected area of 250 mm$^2$ or more inside a circular contour. The bearing hole 219a in the flange 219 was 12 mm across. The bearing hole 220a in the flange 220 was 8 mm across. The flanges 219 and 220 had an average thickness of 0.07–0.2 mm. If the thickness is too small, smoothness in the flow of the resin in the mold is insufficient. If the thickness is too great, the frictional resistance between the photo film and the ring-like lips 221 is considerably great as the ring-like lips 221 have considerable force of regulating the looseness of the film.

This condition was met by 6/6 nylon alloy Y19A (trade name) manufactured by Sumitomo Chemical Co., Ltd.

As an injection molding machine, SAI-CAP 165/75 M III (trade name) manufactured by Sumitomo Heavy Industries, Ltd. was used. A mold set 239 for the flange 219 was constituted by a movable mold 240 and a stationary mold 241, as illustrated in FIG. 16. An interior face 219c of the flange 219 was formed by the movable mold 240. The exterior face 219b of the flange 219 was formed by the stationary mold 241. The movable mold 240 was moved along a guide pin 242, and simply back and forth to form the flange 219. Note that an alternative mold set which may be used may be a family mold set adapted to simultaneously molding the flanges 219 and 220.

The gate of the present embodiment was a disk gate, or a diaphragm gate. The gate thickness was determined equal to the average thickness of the flanges 219 and 220. The length F of the gate land was determined 0.1–2 mm.

A sprue 243 was disposed on the stationary mold 241 and lies on the axis of the flange 219 through the bearing hole 219a. A distal end of a runner lock pin 245 extended to a cold-slug well 244 of the movable mold 240. The runner lock pin 245 operated to draw the molded flange while the movable mold 240 opened, and then to push the molded flange after the movable mold 240 was fully opened. Note that an ejector pin may be added for ejection of the molded flange. The inside face 221a of the ring-like lip 221 was an undercut to be released from the movable mold 240. However the inside face 221a was given an angle free from deformation if ejected forcibly.

For the injection molding, the cylinder temperature was 280° C. The mold temperature was 80° C. Note that the mold set for the flange 220 was similar to the mold set 239. The engaging openings 225 were formed at one time between the movable mold 240 and the stationary mold 241.

The molded flange (See FIG. 17) was then subjected to punching in a punching machine, in which a runner 246 was cut away along the disk gate to form the bearing holes 219a and 220a. As a pressing machine for the punching, HYP 305S (bench hydraulic pressing) (trade name) manufactured by Japan Automatic Machine Co., Ltd. was used. A punch device and a die device were formed of powder of high speed steel. The clearance between the punch device and the die device was 7 μm for each side. A blade portion was coated with titanium nitride (TiN) for ultrahigh hardness.

The punched edge of the bearing holes 219a and 220a happens to have "shear droop", "broken face" and/or "burr (fin)". The "shear droop" is formed as rounded portions along the punched edge and on a side of receiving a punch device. The "burr (fin)" is formed as a slightly projected segment along the punched edge and on a side of exiting the punch device. The "broken face" is created along the punched edge, between the "shear droop" and the "burr (fin)", and in a shape roughened by cracks.

Figure 24:
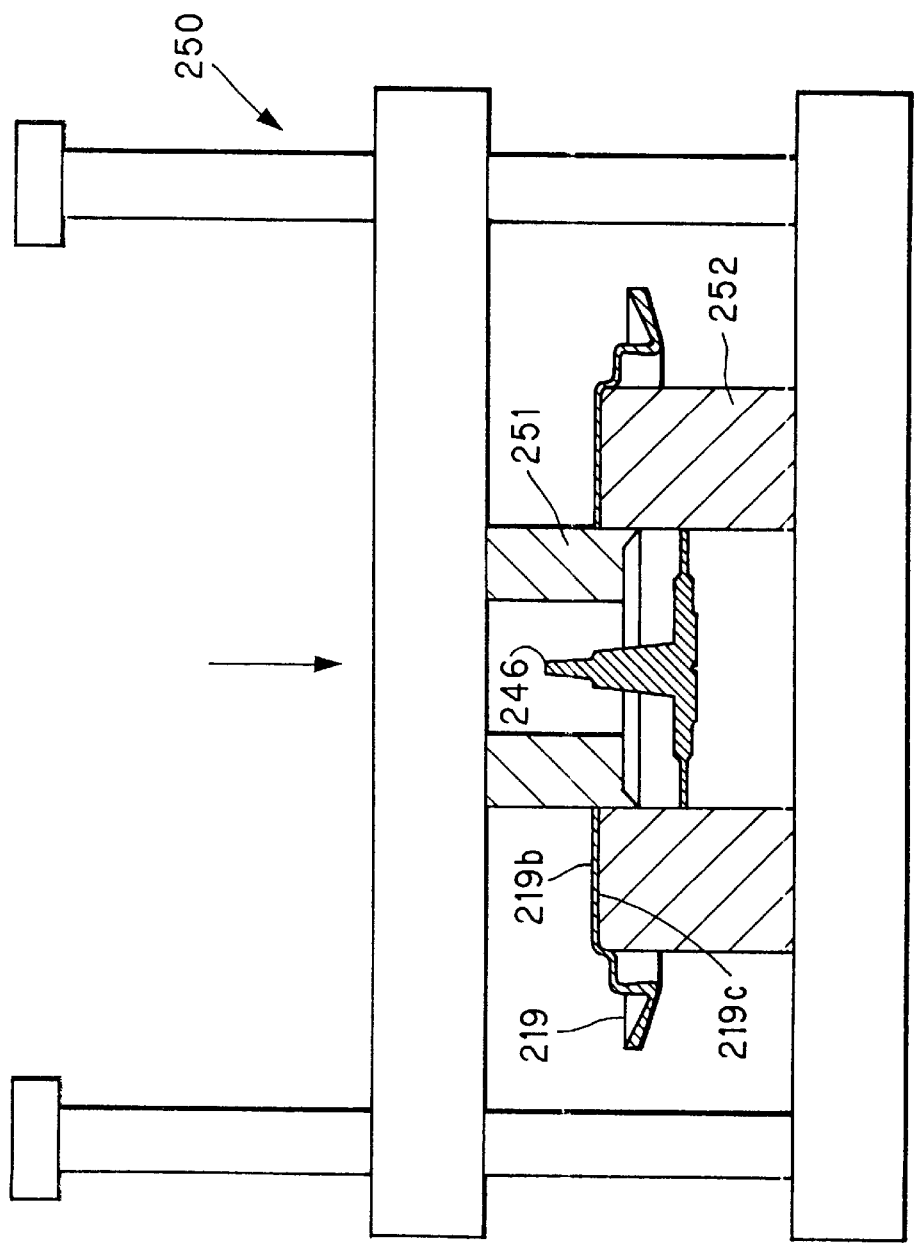
FIG. 24 is a cross section illustrating a punch/die set for punching the flange of FIG. 22.
Figure 25:
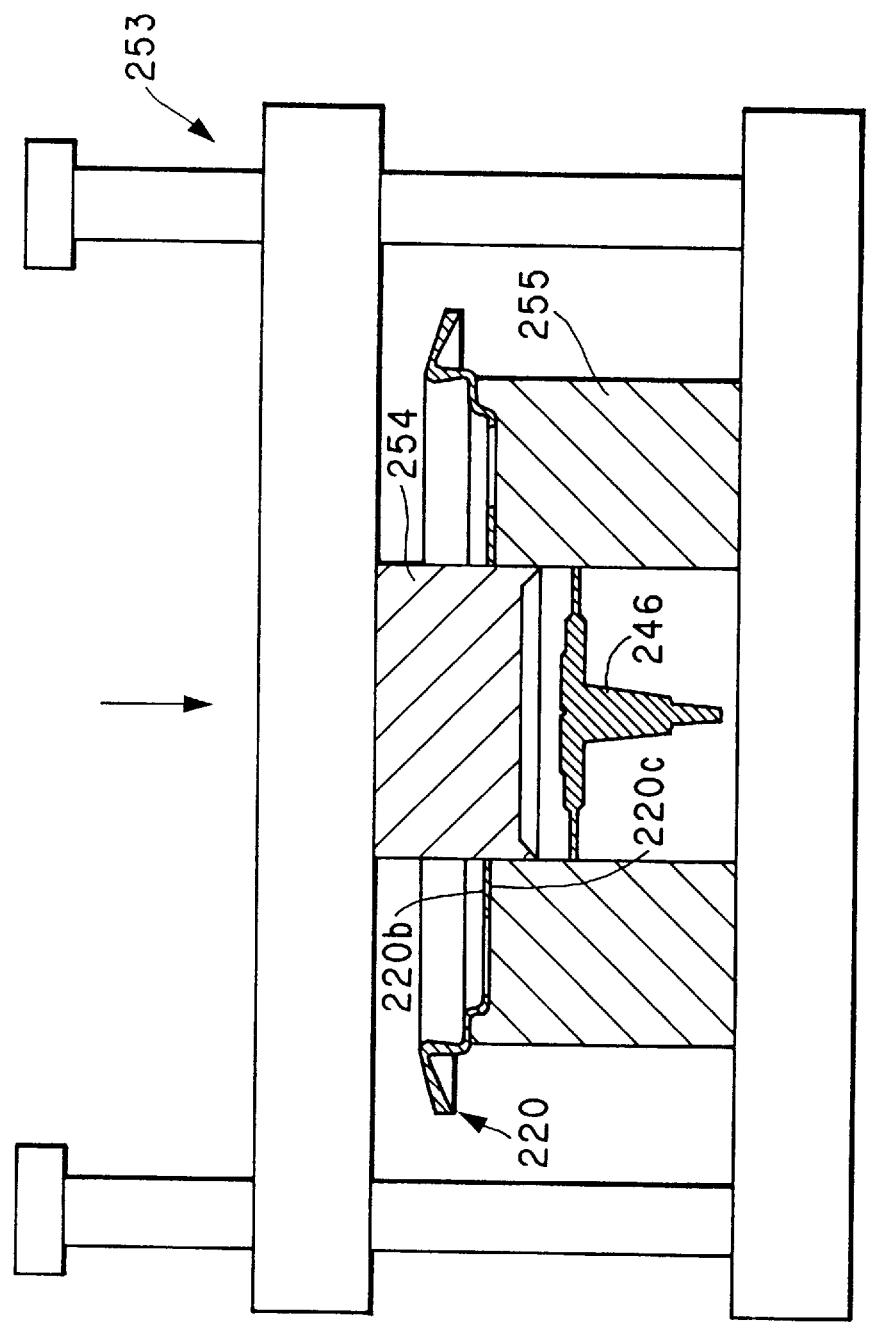
FIG. 25 is a cross section illustrating a punch/die set for punching the flange of FIG. 23.

It is necessary to form the flanges 219 and 220 with to be secured to the spool core 213 with ease. In the punching step, it was considered to avoid difficulties of capturing "burrs (fins)" at the retaining claws 233 and 236 of the receiving portions 213a and 213b in securing of the flanges 219 and 220. To punch the bearing holes 219a and 220a in the molded pieces for the flanges 219 and 220, punch devices in the punching were moved toward the molded pieces in directions the same as the directions of the spool core 213 relative to the flanges 219 and 220 while the spool core 213 would be inserted into the flanges 219 and 220. FIG. 24 illustrates a punching machine 250 for the flange 219. In consideration of the direction of the flange 219 of which the exterior face 219b would be directed to the spool core 213, the flange 219 was set on a die device 252 to confront the exterior face 219b with a punch device 251. FIG. 25 illustrates a punching machine 253 for the flange 220. In consideration of the direction of the flange 220 of which the interior face 220b would be directed to the spool core 213, the flange 219 was set on a die device 255 to confront the interior face 220b with a punch device 254.

Figure 27:
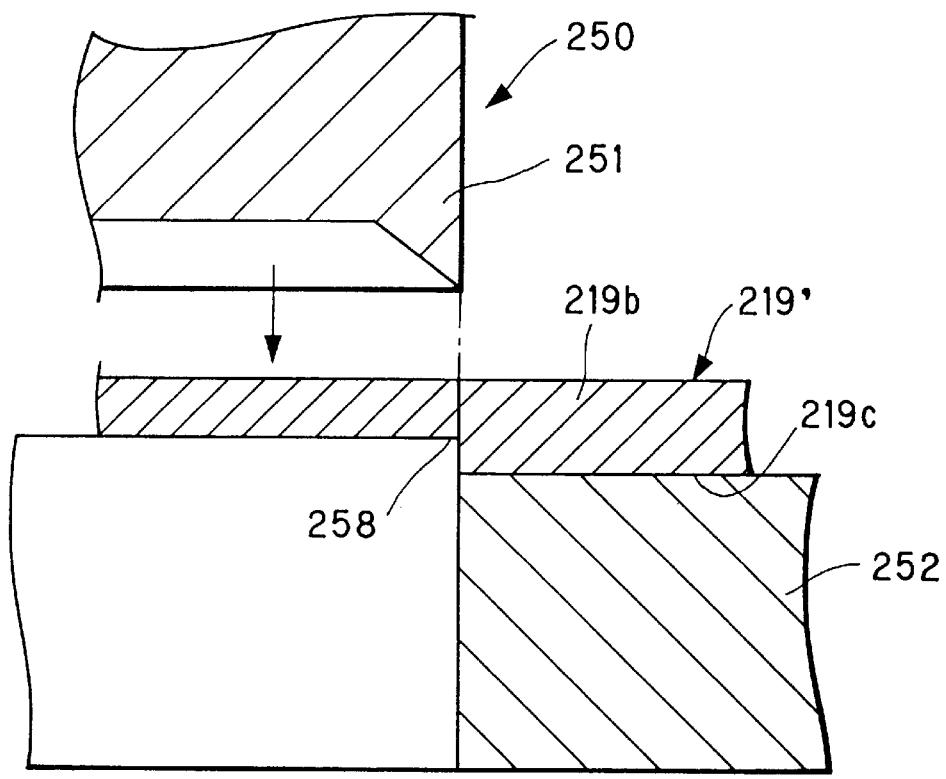
FIG. 27 is an explanatory view in cross section, illustrating a punch/die set for punching the molded piece of FIG. 26A.

3rd Example. The 3rd Example is the same as the 2nd Example, except for a circular recess 258 along a disk gate portion 247 of the piece molded by the injection molding. The circular recess 258 was formed by reducing the thickness, and is disposed on a side opposite to receiving the punch devices 251 and 254. As illustrated in FIGS. 26A and 26B, a mold set 257 for the flange 219 included a movable mold 256 where thickness t31 of a gate land was reduced at 10 μm below the level of the interior face 219c. A molded piece 219' formed by the mold set 257 had the gate land which was retracted in the interior face 219c, was t31 thick, and was thinner than the interior face 219c nearly by 10 μm. The molded piece 219' was set in the punching machine 250 with the circular recess 258 directed to the die device 252, as illustrated in FIG. 27. Blades of the punch device 251 and the die device 252 sheared along the circular recess 258 in the punching.

For the flange 220, a mold set included a stationary mold, where thickness of a gate land was reduced at 10 μm below the level of an exterior face 220c of the flange 220. A molded piece formed by the mold set had the gate land which was retracted in the exterior face 220c, was t31 thick, and was thinner than the exterior face 220c nearly by 10 μm. The molded piece was set in the punching machine 253 with the circular recess 258 directed to the die device 255 of FIG. 25. Blades of the punch device 254 and the die device 255 sheared along the circular recess 258 in the punching.

4th Example. The 4th Example is the same as the 3rd Example, except for the deepness of the circular recess 258 in the molded flange. The thickness t31 of a gate land was reduced at 30 μm below the level of the interior face 219c.

5th Example. The 5th Example is the same as the 3rd Example, except that the circular recess 258 was formed with each of the exterior and interior faces 219b, 219c, 220b and 220c. The molded piece for a flange requires a thickness of at least 70 μm in view of sufficient smoothness in the flow of the melted resin in the mold. The thickness of a gate land in the 5th Example was reduced at 20 μm below the levels of the exterior and interior faces 219b, 219c, 220b and 220c. As illustrated in FIG. 28, there was a sloped portion 259 formed in the injection molding, while rounding off a circular edge about the circular recess in the exterior face 219b and the interior face 220b, namely the punch-receiving face of the molded piece. For the punching in the punching machine 250, blades of the punch device 251 and the die device 252 sheared along the circular recess 258, to form the flange 219. In the punching machine 253 in turn, blades sheared along the circular recess 258, to form the flange 220.

The flanges 219 and 220 as formed according to the Examples above were subjected to the experiments, where the easiness of securing of the flanges 219 and 220, and creation of resin powder about the spool core 213 were observed.

TABLE 8

| Examples | Ratio of Defectives in Securing | Creation of Powder |
|---|---|---|
| 1st | 0.017 | Existed |
| 2nd | 0.008 | Existed |
| 3rd | 0.003 | Existed (⅓ as much as 1st Ex.) |
| 4th | 0.001 or less | Existed (⅕ as much as 1st Ex.) |
| 5th | 0.001 or less | None |

To evaluate the "ratio of defectives in securing" in the TABLE, 1000 samples of the flanges formed by the respective methods of the Examples were produced. When it was difficult or impossible to secure any of the samples to the spool core 213, the sample was regarded as defective. The ratio is the number per 1000. To evaluate the "creation of powder" in the TABLE, each sample of the Examples was secured to the spool core 213 to produce a sample of the photo film cassette. The spool core 213 was rotated to advance the leader for 50 times. Then the sample cassette was disassembled. The spool core 213 and the periphery of the flanges were observed through a 10-power magnifying glass by a human eye.

As is seen from TABLE 8, the flanges 219 and 220 of the 1st Example were unacceptable in view of the ratio of defectives in the securing and the creation of the resin powder. In the punching machine for the flanges 219 and 220, the punch devices were moved substantially in parallel, to form the bearing holes 219a and 220a from the continuous sheet. Considering the lowered suitability of the flanges 219 and 220 in the securing to the spool core 213 and the great amount of resin powder created from the spool core 213 and/or the flanges 219 and 220, it is estimated that the burrs (fins) were formed about the bearing holes 219a and 220a to project over the level of the predetermined thickness of the flanges 219 and 220. Note that it is estimated that, if the 1st Example is modified, the ratio of defectives in the securing may be reduced considerably like the 2nd Example to be referred to later. To modify the 1st Example, a punching machine may have two punch/die sets having different orientations. After the continuous sheet is thermoformed in accordance with the vacuum forming or pressure forming, molded pieces for the flange 220 may be punched in the different direction from the molded pieces for the flange 219.

In the 2nd Example, the direction of punching the flanges 219 and 220 is the same as the direction of inserting the spool core 213 into the flanges 219 and 220. The ratio of defectives in securing was considerably low. However much resin powder was created in a manner similar to the 1st Example, because burr (fin) 262 was projected over the predetermined thickness of the flanges 219 and 220, as illustrated in FIGS. 29A, 29D. There were a small number of samples of the flanges of the 2nd Example which were difficult to secure to the spool core 213, because a broken face 260 was formed on the punched edge of the bearing holes 219a and 220a.

In the 3rd Example, the circular recess 258 was formed with the faces opposite to the punch-receiving faces of the flanges 219 and 220. As illustrated in FIGS. 30A to 30D, the burr (fin) 262 hardly projected over the predetermined thickness of the flanges 219 and 220. Remarkably little amount of resin powder was created. As the thickness of the gate land portion was reduced, the punching was easier. The area of the broken face 260 at the bearing holes 219a and 220a was smaller. The flanges 219 and 220 were easier to mount on the spool core 213.

In the 4th Example, the flanges 219 and 220 had little resin powder created. It is estimated that the greater deepness of the circular recess 258 avoided occurrence of the burr (fin) 262 projected over plane surfaces of the flanges 219 and 220. The gate land portion to be punched off was thinner than that of the flanges of the 3rd Example, and was easy to punch off. The area of the broken face 260 at the bearing holes 219a and 220a was rendered still smaller. The adaptability to securing the flanges 219 and 220 was raised.

In the 5th Example, the exterior and interior faces 219b, 219c, 220b and 220c respectively had the circular recess 258. The sloped portion 259 was formed about the circular recess in the punch-receiving face of the molded piece. As illustrated in FIGS. 31A to 31D, part of the sloped portion 259 remained even after the punching. The area of the broken face 260 at the bearing holes 219a and 220a was rendered extremely smaller. The adaptability to securing the flanges 219 and 220 was high. None of the burr (fin) 262 was projected over the predetermined thickness of the flanges 219 and 220. No recognizable amount of resin powder was created.

It was found that it was important, irrespective of the various manner of molding, that the punch devices 251 and 254 in the punching of the bearing holes 219a and 220a were moved toward the molded pieces for the flanges 219 and 220 in directions the same as the directions of the spool core 213 relative to the flanges 219 and 220 while the spool core 213 is inserted into the flanges 219 and 220. To avoid creation of the resin powder, it was effective to form the circular recess 258 with the molded pieces to be retracted in its face opposite to a face receiving the punch devices 251 and 254 and in a position corresponding to the bearing holes 219a and 220a. As it is difficult in thermoforming to reduce the thickness of the molded pieces, it is preferable to use injection molding to form the molded flange. It was also found that the circular recess 258 with both faces of the molded pieces and the sloped portion 259 on the punch-receiving side were effective in facilitating the securing of the flanges.

Figure 32:
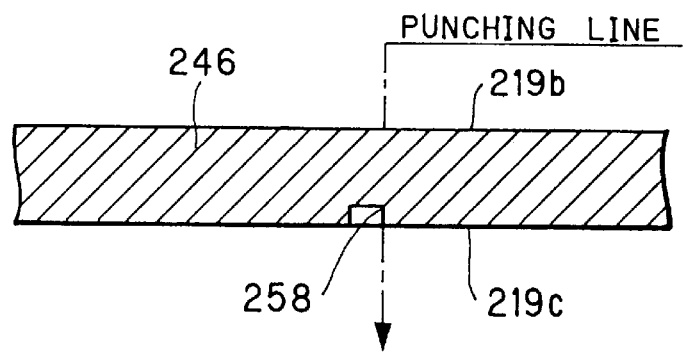
FIG. 32 is a cross section, with portions broken away, illustrating another variant shape of a molded piece.

Note that, instead of the shape of the circular recess 258 formed in the above-described manner, a ring-like recess can be formed in the flanges 219 and 220 as illustrated in FIG. 32, for the same operation as the 3rd Example. It is also possible as illustrated in FIG. 33 to form the sloped portion 259 with both faces of the molded piece. After punching, part of the sloped portion 259 remains on both faces of the molded piece. This is effective in avoiding creation of resin powder.

In the above embodiments, the sloped portion 259 is formed while rounding off a circular edge about the circular recess in inclination on the punch-receiving face of the molded piece. It is alternatively possible in injection molding to form a sloped portion while cutting off the circular edge like a frustum of a cone at the inclining line of 45 degrees or another angle. This can operate in a manner similar to the rounded sloped portion.

Figure 34:
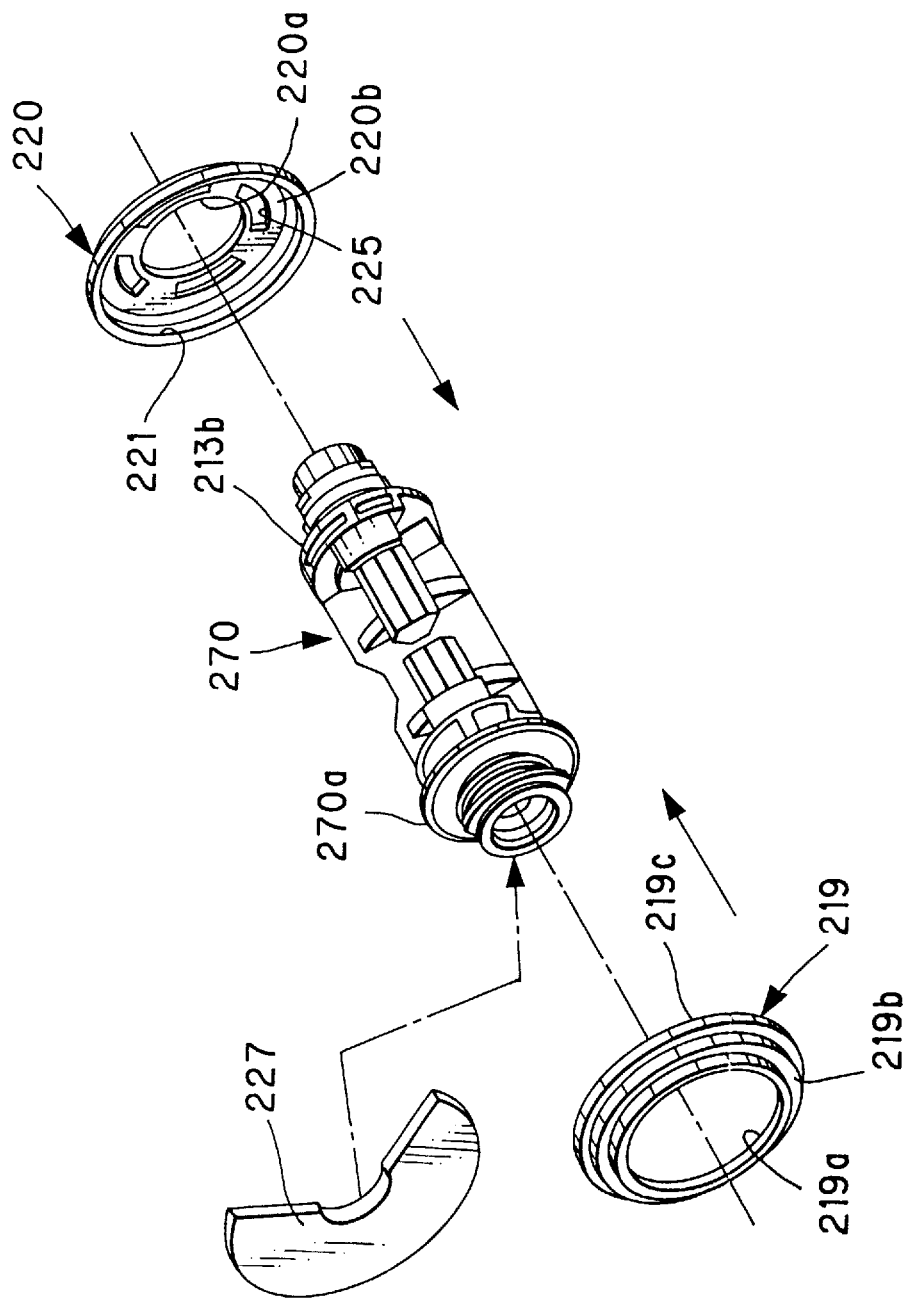
FIG. 34 is an exploded perspective view illustrating a variant spool, where flanges are moved in opposite directions to be secured to a spool core.

In the embodiment of FIGS. 34 and 35, the two flanges 219 and 220 are moved in directions opposite to one another to be mounted on a spool core 270. Namely the interior face 219c is directed toward the spool core 270. An engaging portion 270a for engaging the flange 219 with the spool core 270 includes retaining claws 271, a recess 272 and a stopper 273, which are arranged in the relative moving direction of the flange 219. After mounting of the flange 219, the bar code data plate 227 previously molded is mounted on the spool core 270 by movement vertical to an axial direction of the spool core 270. Note that, to punch the bearing holes 219a and 220a in the molded pieces for the flanges 219 and 220, punch devices are moved toward the molded pieces in directions the same as the directions of the spool core 270 relative to the flanges 219 and 220 while the spool core 270 is inserted into the flanges 219 and 220.

In relation to the flange 28 of the spool 13 of FIG. 4, when the spool core 26 is rotated in the unwinding direction, one of the ratchet claws 37 of the barrel member 29 is engaged with the engaging openings 28b. The one of the ratchet claws 37 in engagement transmits rotation of the spool core 26 to the flange 28. Improvement of the ratchet claws 37 and the engaging openings 28b is described with still other preferred embodiment of a photo film cassettes, with reference to FIGS. 36–51.

Figure 36:
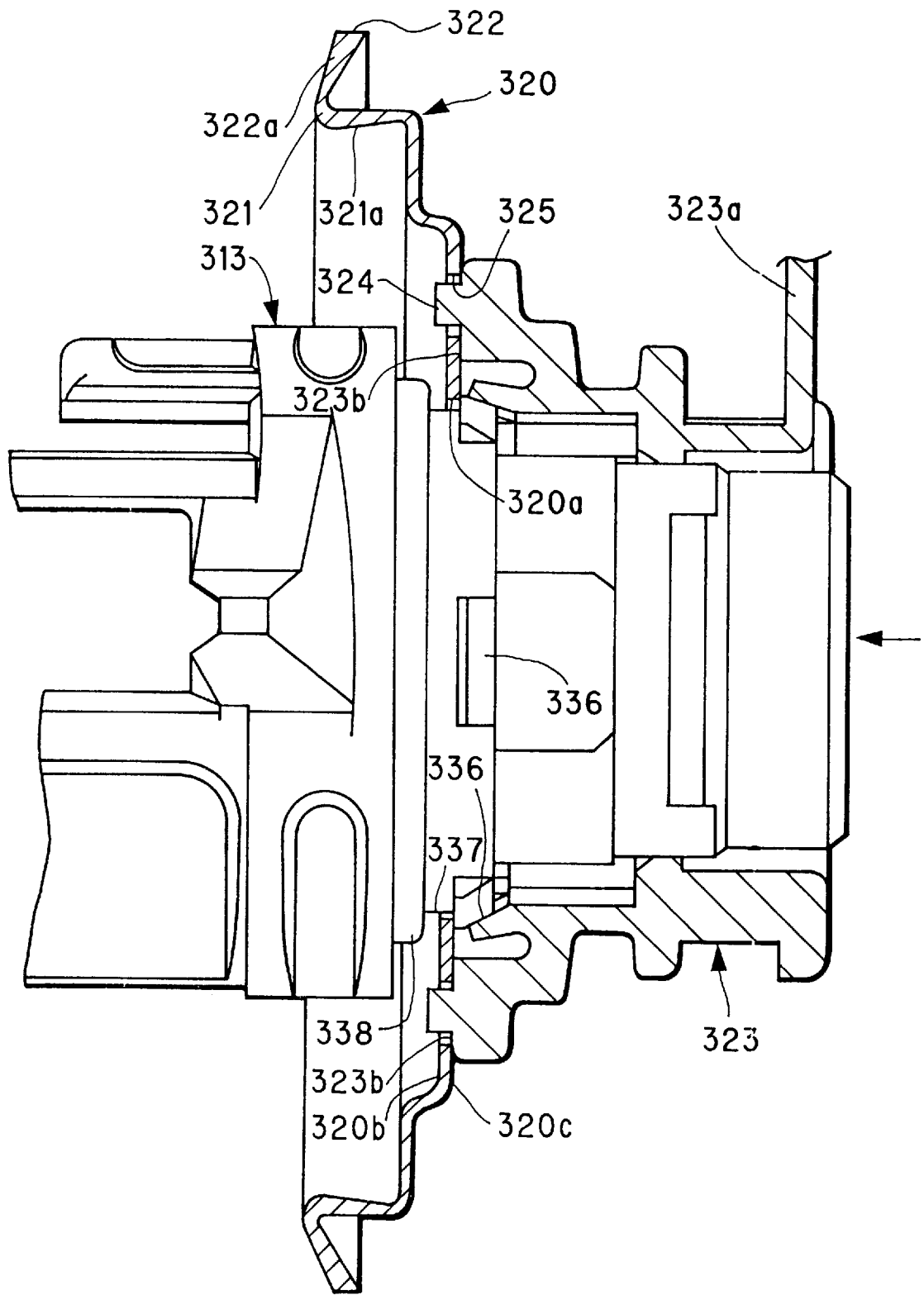
FIG. 36 is an explanatory view in elevation, illustrating an additional preferred embodiment with improved ratchet claws and engaging openings, which are formed in an illustrated flange secured to a flange receiving portion.

In FIG. 36, a flange 320 has a ring-like lip 321, of which inside face 321a is inclined to come closer to the spool core in the projected direction of the ring-like lip 321 over the flange 320.

There is a ring-like projection 322, of which inside face 322a is inclined to come away from one another in the radial direction of the flange 320.

FIG. 36 illustrates a flange receiving portion, which includes retaining claws 336, a recess 337 and a stopper 338 for the purpose of engagement with a flange 320. The receiving portion 213b has the smaller diameter than a flange receiving portion for a mated flange. The flange 320 has an exterior face 320c. A barrel 323 is fixed on a spool core 313 on the side of the exterior face 320c. An internal face 323b of the barrel 323 confronts the exterior face 320c, and operates to avoid dropping of the flange 320.

The barrel 323 has an indicator plate 323a, which is adapted to indication of either of exposed and unexposed statuses of the photo film in the cassette shell. The indicator plate 323a is positioned at indicator windows formed in the cassette shell. It is possible to recognize any of the statuses of the photo film when the indicator plate 323a is seen inside the windows.

Figure 37:
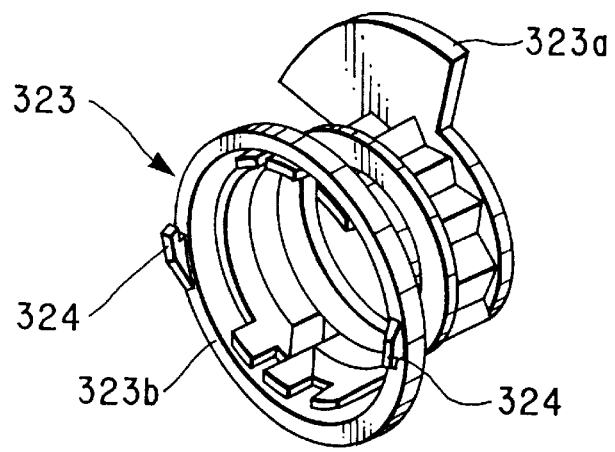
FIG. 37 is a perspective view illustrating a barrel member with an indicator.
Figure 38:
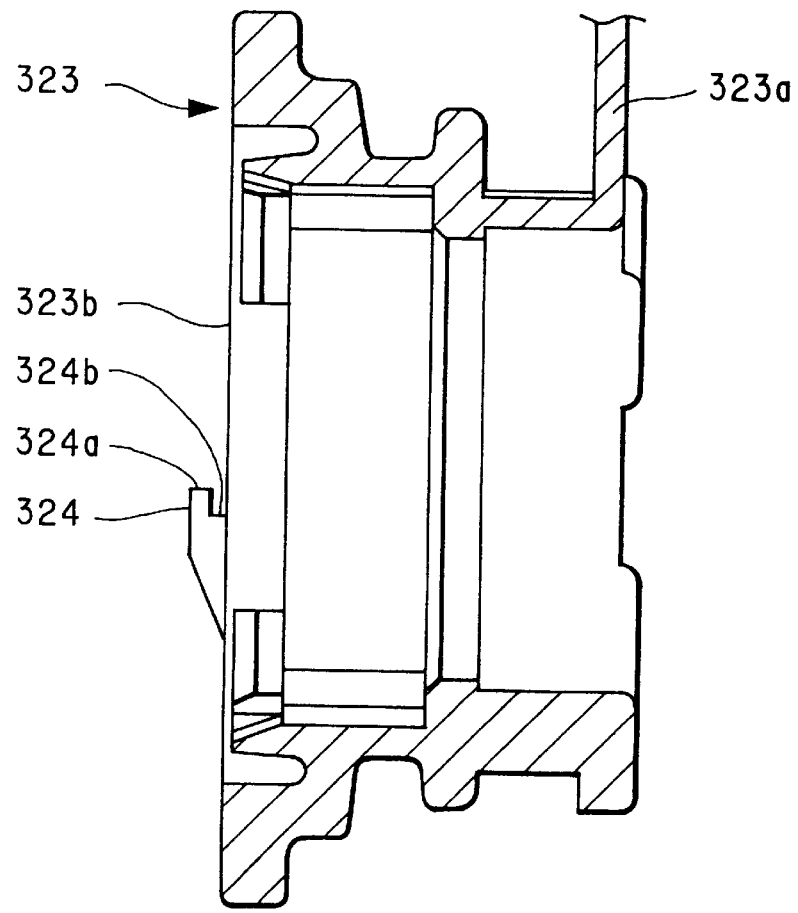
FIG. 38 is a cross section illustrating the barrel member.

As illustrated in FIG. 37, the internal face 323b of the barrel 323 is formed with two ratchet claws 324, which are disposed in positions rotationally symmetrical with each other. In FIG. 38, the ratchet claws 324 have a hook shape. Each ratchet claw 324 includes a claw base portion and a claw tip portion 324a projected from the claw base portion. A gap bottom 324b is formed behind the claw tip portion 324a and defined beside the claw base portion, and adapted to contact with an engaging edge 325a of one of engaging openings 325. An inside face of the claw tip portion 324a keeps the one engaging opening 325 in contact with the gap bottom 324b. A gap between the inside face of the claw tip portion 324a and the internal face 323b of the barrel 323 is formed as wide as to regulate the play of the flange 320.

The flange 320 and the mated flange have a bearing hole 320a, and are formed by punching away the center of molded pieces formed by injection molding. To avoid creation of "shear droop" and/or "burr (fin)" at the engaging openings 325, the engaging openings 325 are formed in the injection molding with the flange 320.

The flange 320 and the mated flange have an outer diameter of 18 mm, and a maximum projected area of 250 mm$^2$ or more inside a circular contour. The bearing hole 320a in the flange 320 is 8 mm across. The bearing hole in the mated flange is 12 mm across. Preferably, the flange 320 and the mated flange have an average thickness of 0.07–0.2 mm.

This condition was met by 6/6 nylon alloy Y19A (trade name) manufactured by Sumitomo Chemical Co., Ltd.

As an injection molding machine, SAI-CAP 165/75 M III (trade name) manufactured by Sumitomo Heavy Industries, Ltd. is used. A mold set 339 for the mated flange was constituted by a movable mold 340 and a stationary mold 341, as illustrated in FIGS. 39A and 39B. An interior face 320b of the flange 320 is formed by the movable mold 340. The exterior face 320c of the flange 320 is formed by the stationary mold 341. The movable mold 340 is moved along a guide pin 342, and simply back and forth to form a molded piece 320' for the flange 320. To mold the mated flange, a mold set similar to the mold set 339 is used in the injection molding.

The engaging openings 325 are formed with the molded piece 320' in the injection molding process. As illustrated in FIGS. 39A and 39B in enlargement, the stationary mold 341 is provided with a projected portion 341a at which the engaging edge 325a lies perpendicularly to the advancing face of the movable mold 340. The projected portion 341a is contected on the movable mold 340 in forming the engaging openings 325. Note that an alternative mold set which may be used may be a family mold set adapted to simultaneously molding the flange 320 and the mated flange.

The gate of the present embodiment is a disk gate, or a diaphragm gate. The gate thickness is equal to the average thickness of the flange 320 and the mated flange. The length F of the gate land is determined 0.1–2 mm. Reference numeral 347 designates a disk gate portion.

A sprue 343 is disposed on the stationary mold 341 and lies on the axis of the flange 320 through the bearing hole 320a. A distal end of a runner lock pin 345 extends to a cold-slug well 344 of the movable mold 340.

As illustrated in FIG. 40, the molded piece for the flange is then subjected to the punching, in which a runner 346 is cut away along the disk gate to form the bearing hole 320a. As a pressing machine for the punching, HYP 305S (bench hydraulic pressing) (trade name) manufactured by Japan Automatic Machine Co., Ltd. is used. A punch device and a die device are formed of powder of high speed steel. The clearance between the punch device and the die device is 7 μm for each side. A blade portion is coated with titanium nitride (TiN) for ultrahigh hardness. Note that it is also possible to adapt in-mold degating, according to which a gate mark is cut away inside the mold along the disk gate for the purpose of forming the bearing hole 320a.

The flange 320 and the mated flange are extremely thin, and require a mold temperature of 80°–150° C. in injection molding. Improved efficiency in the manufacture depends on shortening cycle time constituted by injection time, dwell time, cooling time, mold open time, intermediate stage time, and mold close time. However there are a number of difficulties in the injection molding process in which the resin of nylon 6/6 is molded at the extremely smalle thickness: the effective dwell for the injection is difficult; and the shrinking factor is high as compared with molding of a thick piece. Also, the projected portion 341a of the stationary mold 341 is located on the shrinking side of the molded piece. In a certain manner of contacting the molds, releasability of the molds may be low, as the molded piece 320' may be stuck on the projected portion 341a. Even when the molds open, the molded piece 320' may not be removed from the stationary mold 341 without damage.

The mold temperature during injection molding is 80°–150° C. The resin temperature of the molded piece 320' at the time of release is as high as 100° C. or more. If there is not sufficient cooling time, unwanted deformation occurs at the engaging edge 325a of the engaging openings 325. In view of avoiding the unwanted deformation, it is necessary to consider a manner of contacting the molds, and cooling time.

Experiments were conducted to observe a relationship between the manner of contacting the molds and cooling time. Results of the experiments were evaluated according to the moldability of the molded piece 320' according to the Examples hereinafter described. The results of the experiments are indicated in TABLE 9.

1st Example. In FIG. 41, the projected portion 341a was so formed on the stationary mold 341 as to define the engaging edge 325a perpendicularly to the advancing face of the movable mold 340. The projected portion 341a was contacted on the movable mold 340 to form the engaging openings 325.

2nd Example. In FIG. 42, a projected portion 340a was so formed on the movable mold 340 as to define the engaging edge 325a of which a narrow face is perpendicular to the advancing face of the movable mold 340. The projected portion 340a was contacted on the stationary mold 341 to form the engaging openings 325.

Figure 43:
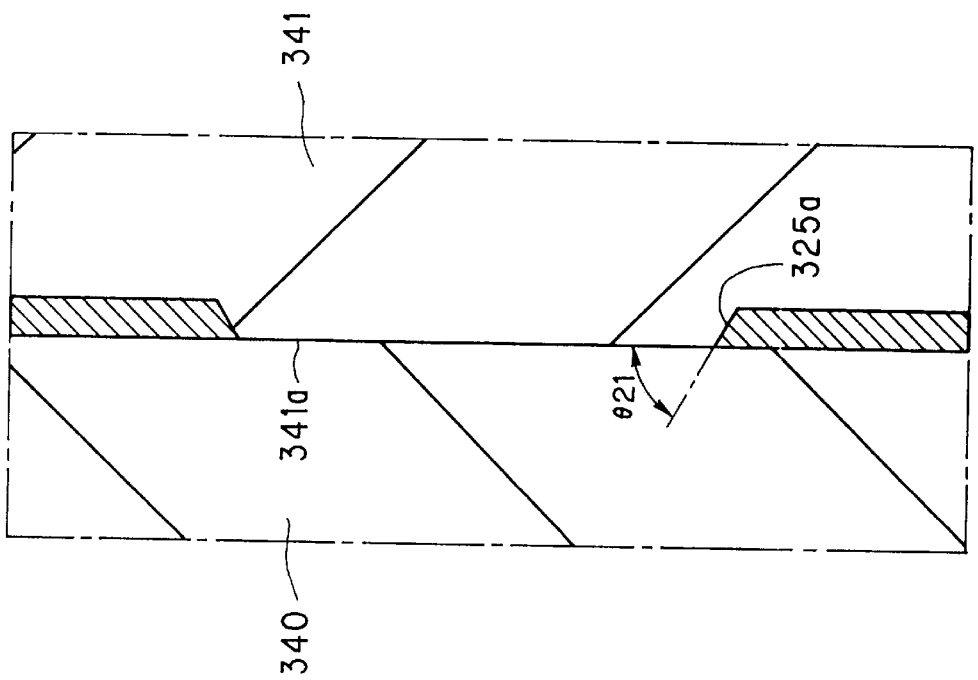

3rd Example. In FIG. 43, the projected portion 341a was so formed with draft on the stationary mold 341 as to define a narrow face of the engaging edge 325a at the angle θ21 relative to the advancing face of the movable mold 340.

Figure 44:
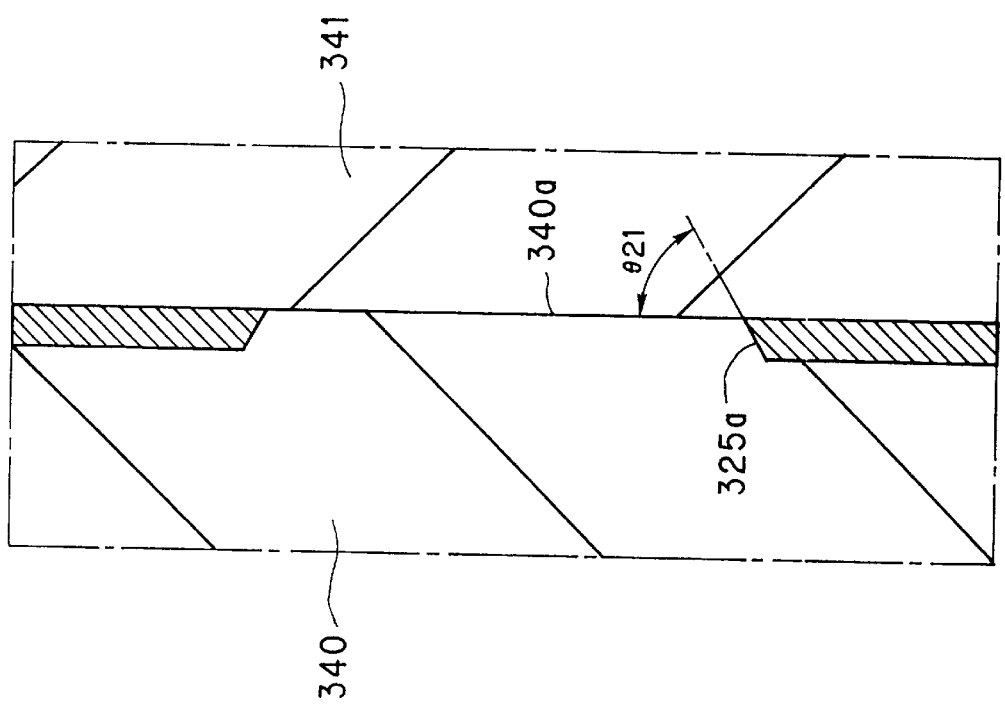

4th Example. In FIG. 44, the projected portion 340a was so formed with draft on the movable mold 340 as to define a narrow face of the engaging edge 325a at the angle θ21 relative to the advancing face of the movable mold 340.

Conditions for the injection molding is as follows:

Resin temperature: changed as indicated in TABLE 9 in the range of 270°–290° C. for the thickness of the flange 320;

Mold temperature: changed as indicated in TABLE 9 in the range of 95°–130° C. for the thickness of the flange 320;

Injection time: 0.02–0.04 second;

Mold opening speed: 40% (approximately 200 mm per 0.5 second);

Ejection time: 1.5 second; and

Dwell time: 1 second, followed by cooling time as predetermined.

It is to be noted that, in TABLE 2, the "minimum cooling time" is cooling time at which failure in the release from the stationary mold occurs less frequently than 1%. The "deformed amount" is a measured deformed size of the molded piece 320' that was smoothly released without sticking to the stationary mold after the lapse of 6 second as cooling time.

In view of the results indicated in the TABLE above, the minimum cooling time and the deformed amount were considered. When no inclination as draft was formed on the molds, the manner of contacting the molds in FIG. 42 was found desirable, as the movable mold 340 has the projected portion 340a for forming the engaging openings 325. When an inclination as draft was formed on the molds like FIGS. 43 and 44, it was found that the preferable angle θ21 in the manners of contacting the molds was at 80 degrees or less, or rather 70 degrees or less.

When the stationary mold 341 had the projected portion 341a like FIGS. 41 and 43, it was found that the molds in FIG. 43 having the inclination as draft, preferably inclination of θ21≦80°, or desirably inclination of θ21≦70°, made it possible to shorten the cooling time by 30% or more, as compared with the molds in FIG. 41 without draft.

Figure 48:
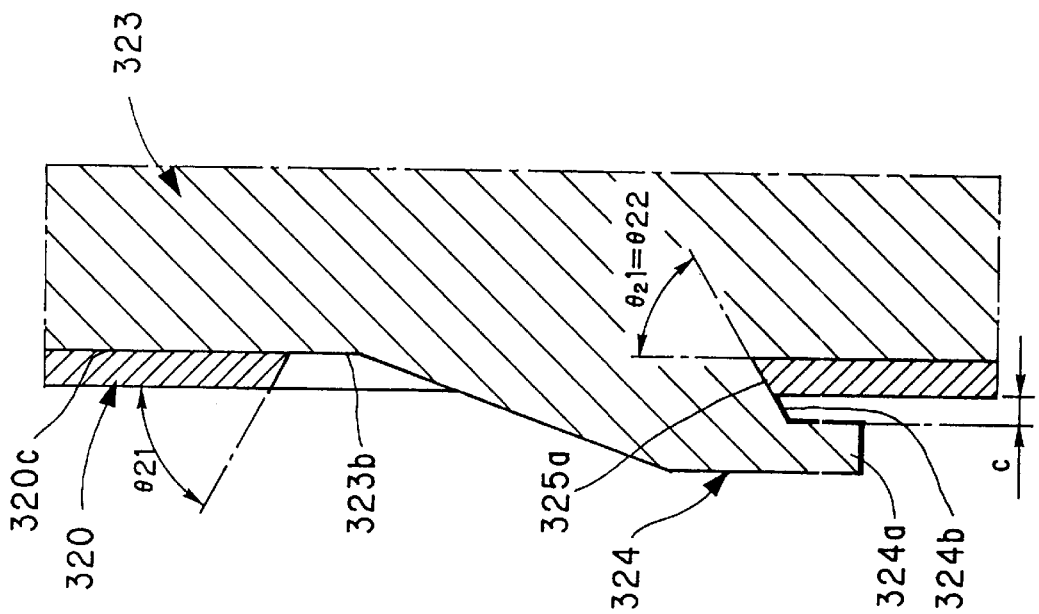
FIG. 48 is an explanatory view in cross section, illustrating the flange from the piece of FIG. 44 and the ratchet claw of FIG. 45C, in combination.

Next experiments were conducted to observe optimum combinations of the thickness of the flange 320, the shape of the engaging edge 325a of the engaging openings 325, and the shape of the gap bottom 324b of the ratchet claws 324 (See FIGS. 45A, 45B and 45C) having the angle θ22. Results of the experiments are indicated in TABLE 10. The combinations of the shapes in the experiments are illustrated in FIGS. 46–48.

TABLE 9

| Thickness (mm) | Examples | Figs. | θ21 | Resin Temperature | Mold Temperature | Minimum Cooling Time (sec.) | Deformed Amount (μm) |
|---|---|---|---|---|---|---|---|
| 0.12 | 1st | 41 | 90° | 290° C. | 130° C. | 8 | 30 |
|  | 3rd | 43 | 60° | " | " | 5.8 | 10 or less |
| 0.15 | 2nd | 42 | 90° | 285° C. | 125° C. | 5.8 | 25 |
|  | 4th | 44 | 80° | " | " | 5.8 | 18 |
|  |  |  | 70° | " | " | 5.8 | 10 or less |
|  |  |  | 60° | " | " | 5.8 | 10 or less |
|  | 1st | 41 | 90° | " | " | 7 | 23 |
|  | 3rd | 43 | 80° | " | " | 6.2 | 14 |
|  |  |  | 70° | " | " | 5.8 or less | 10 or less |
|  |  |  | 60° | " | " | 5.8 or less | 10 or less |
| 0.18 | 2nd | 42 | 90° | 280° C. | 118° C. | 5.8 or less | 22 |
|  | 4th | 44 | 70° | " | " | 5.8 or less | 10 or less |
|  |  |  | 50° | " | " | 5.8 or less | 10 or less |

TABLE 10

| Thickness (mm) | Examples | Figs. of Molds | θ21 | Figs. of Claw | θ22 | Force for Film Advancement | Deformation of Opening | Durability (times) | Figs. |
|---|---|---|---|---|---|---|---|---|---|
| 0.12 | 1st | 41 | 90° | 45A | 90° | 150 g · cm | B | — | 46 |
|  | 3rd | 43 | 60° | 45A | 90° | 132 g · cm | B | — | — |
|  |  |  |  | 45B | 60° | 184 g · cm | A | — | 47 |
| 0.15 | 2nd | 42 | 90° | 45A | 90° | 180 g · cm | A | 150 | 46 |
|  | 4th | 44 | 70° | 45A | 90° | 170 g · cm | B | 148 | — |
|  |  |  |  | 45C | 70° | 208 g · cm | A | 214 | 48 |
|  |  |  | 50° | 45C | 90° | 167 g · cm | C | 147 | — |
|  |  |  |  | 45C | 50° | 220 g · cm | B | 224 | 48 |
|  |  |  | 40° | 45C | 90° | 135 g · cm | C | 132 | — |
|  |  |  |  | 45C | 40° | 247 g · cm | B | 218 | 48 |
|  |  |  | 20° | 45C | 90° | 153 g · cm | D | 110 | — |
|  |  |  |  | 45C | 20° | 196 g · cm | B | 209 | 48 |
|  | 1st | 41 | 90° | 45A | 90° | 180 g · cm | A | — | 46 |
|  | 3rd | 43 | 60° | 45A | 90° | 167 g · cm | B | — | — |
|  |  |  |  | 45B | 60° | 212 g · cm | A | — | 47 |
|  |  |  | 40° | 45A | 90° | 135 g · cm | C | — | — |
|  |  |  |  | 45B | 40° | 230 g · cm | B | — | 47 |
| 0.18 | 2nd | 42 | 90° | 45A | 90° | 240 g · cm | A | — | 46 |
|  | 4th | 44 | 60° | 45A | 90° | 222 g · cm | B | — | — |
|  |  |  |  | 45C | 60° | 288 g · cm | A | — | 48 |
| 0.20 | 2nd | 42 | 90° | 45A | 90° | 280 g · cm | A | — | 46 |
|  | 4th | 44 | 60° | 45A | 90° | 260 g · cm | B | — | — |
|  |  |  |  | 45C | 60° | 331 g · cm | A | — | 48 |

To evaluate the combinations, the force for film advancement, the deformation of an engaging opening, and durability were checked. To detect the force for the film advancement in the TABLE, the ratchet claw 324 was engaged with the engaging edge 325a of the engaging opening 325. While the flange 320 was fixedly held, the barrel 323 was rotated in the unwinding direction. Upon occurrence of deformation at the engaging edge 325a of the engaging opening 325, the torque to the barrel 323 was measured, to obtain the force for the film advancement.

To evaluate the deformation of the engaging edge 325a, the film advancement was repeated. The deformation of the engaging edge 325a of the engaging opening 325 was visually observed. In the TABLE, A represents deformation of 10 μm or less. B represents deformation of 20 μm or less. C represents deformation of 30 μm or less. D represents deformation more than 30 μm.

To detect durability (repeated unwinding and winding) in the TABLE above, operation of drawing the whole photo film out of the cassette shell and subsequently rewinding the photo film into the cassette shell was repeated many times, the maximum number of which was obtained upon breakage of the flange 320. Note that the barrel 323 in the experiments had a gap between the internal face 323b and the claw tip portion 324a of the ratchet claw 324 being 0.15 mm greater than the thickness of the flange 320.

As is seen from TABLE 10, it was found that the force for the film advancement was heightened by raising the thickness of the flange 320. When the gap bottom 324b of the ratchet claw 324 had 90 degrees, the durability was lowered according to the decrease of the θ21 of the engaging edge 325a of the engaging opening 325. The durability was remarkably low when θ21 ≦ 20°.

The combination of the engaging edge 325a of the engaging opening 325 with the gap bottom 324b of the ratchet claw 324 had a higher value of the "force for the film advancement" than the combination of an erected engaging edge and a rectangular gap bottom. Particularly, the combination in FIG. 48 was the optimum in view of the force for film advancement, the deformation of the engaging opening, and durability. In the optimum combination, the projected portion 340a of the movable mold 340 in FIG. 48 was given the draft having the angle θ21, so as to form the flange 320 with the engaging edge 325a inclined at the angle θ21. The ratchet claw 324 had the gap bottom 324b formed in consistency with the inclination of the engaging edge 325a of the engaging opening 325. The most preferable range of the angle θ21 was found as 40–70 degrees.

The combination in FIG. 48 was found optimum. According to this, the inclination of the engaging edge 325a and the gap bottom 324b was formed to cause the flange 320 to come near to the internal face 323b of the barrel 323 in the course of advancing the photo film. The flange 320 had an unchanged state where the exterior face 320c was supported by the internal face 323b and the engaging edge 325a was supported on the gap bottom 324b. Consequently the torque applied for rotation could be sufficiently heightened while the ratchet claw 324 presses the engaging opening 325. The flange 320 was highly resistant to being bent while supported in two directions. It is observed that this mechanism of the combination in FIG. 48 caused the high durability.

The greater a gap between the internal face 323b and the claw tip portion 324a of the ratchet claw 324, the greater the play of the flange 320. It would be impossible sufficiently to raise the force for the film advancement. Further experiments were conducted to observe changes in the force for the film advancement while the gap was changed. Results are indicated in TABLE 11.

TABLE 11

| Combinations | Gap (mm) | Force for Film Advancement |
|---|---|---|
| FIG. 46 | a + b  0.15 | 180 g · cm |
| (θ21 = 90°) | 0.12 | 183 g · cm |
|  | 0.10 | 195 g · cm |
|  | 0.08 | 199 g · cm |
|  | 0.07 | 202 g · cm |
|  | 0.06 | 204 g · cm |

TABLE 11-continued

| Combinations | Gap (mm) | Force for Film Advancement |
|---|---|---|
|  | 0.04 | 208 g · cm |
|  | 0.02 | 211 g · cm |
|  | 0.01 | Failure |
| FIG. 48 c | 0.15 | 220 g · cm |
| (θ21 = 60°) | 0.12 | 242 g · cm |
|  | 0.10 | 253 g · cm |
|  | 0.08 | 262 g · cm |
|  | 0.06 | 268 g · cm |
|  | 0.04 | 273 g · cm |
|  | 0.02 | 350 g · cm |
|  | 0.01 | Failure |

In the experiments of TABLE 11, the flange 320 was given the thickness of 0.15 mm. In the TABLE, "Failure" indicates that the engaging edge 325a of the engaging opening 325 could not be inserted into the gap bottom 324b of the ratchet claw 324, because the gap was too small.

As is seen from TABLE 11, the smaller the gap, the greater the force for the film advancement. However an excessively small gap makes it impossible to insert the flange 320. The optimum lower limit of the gap is found 0.02 mm. To advance the photo film stably, the force of 190 g·cm is required. Accordingly an upper limit of the gap is 0.1 mm. The force for the film advancement should have allowance in view of reliability in stable operation. Considering the allowance of force, the force for the film advancement can be 200 g·cm or more. It is concluded that, in consistency with this, the optimum upper limit of the gap is 0.07 mm. In short, the gap for the flange 320 as play is 0.02–0.1 mm, desirably 0.02–0.7 mm.

Figure 49:
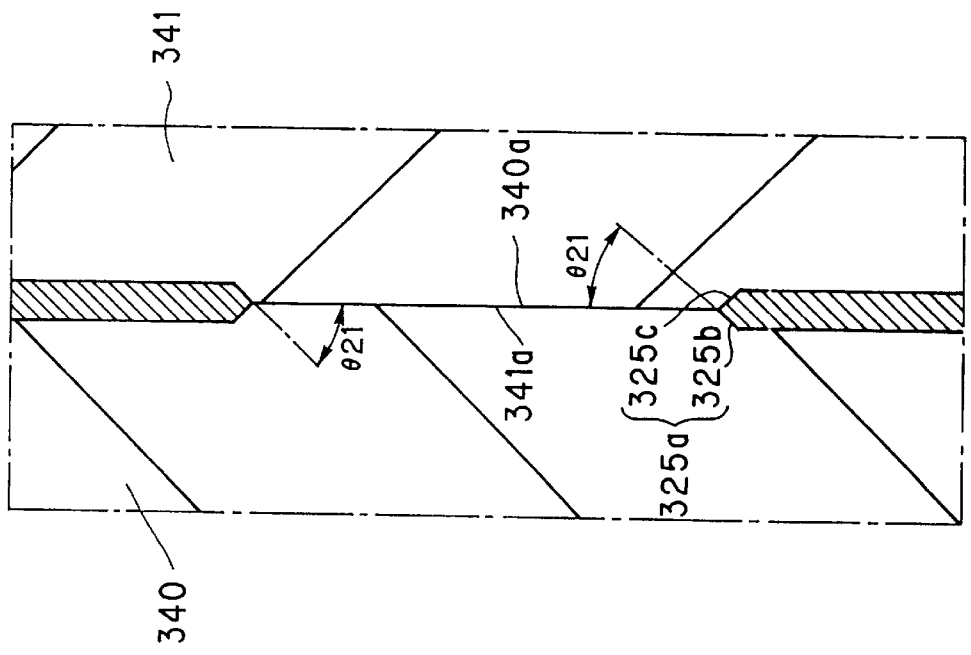
FIG. 49 is a section illustrating a variant mold set, which is used for molding a piece to be a flange, and in which two molds have respective inclinations as drafts.
Figure 50:
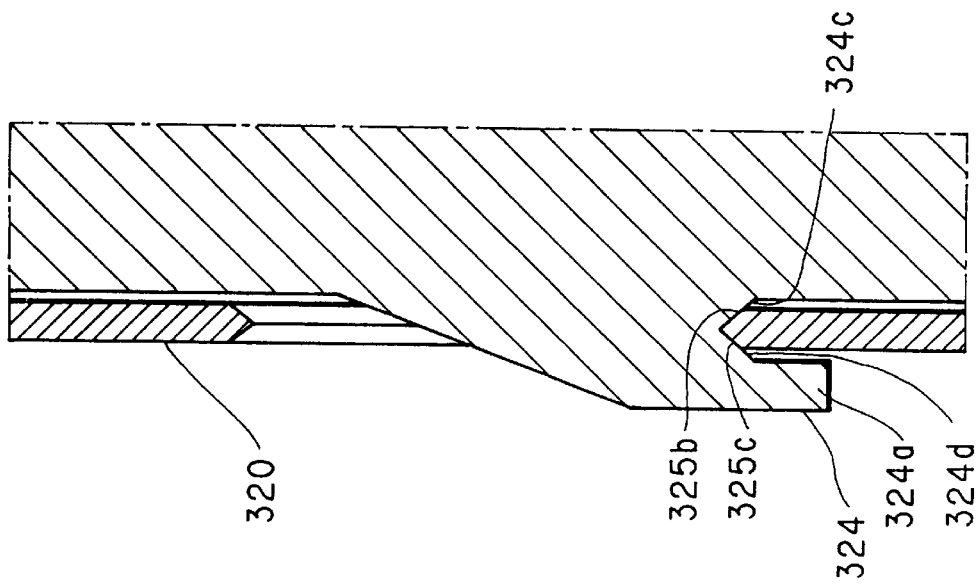
FIG. 50 is an explanatory view in cross section, illustrating the flange from the piece of FIG. 49 and a suitably formed ratchet claw, in combination.

In the embodiments above, the engaging edge 325a of the engaging openings 325 has a single plane surface. Alternatively, an engaging edge of an engaging opening can be constituted by two plane surfaces. In FIG. 49, the projected portion 340a of the movable mold 340 and the projected portion 341a of the stationary mold 341 are contacted together in a position central with reference to the cavity. Respective inclinations as draft are formed on the projected portion 340a and 341a at the angle θ21. The engaging edge 325a of the engaging openings 325 can include two planes 325b and 325c, which can define a ridge projected toward the center of the engaging openings 325. The planes 325b and 325c are inclined at the angle of θ21, which is preferably 40–70 degrees, in the same manner obtained in the above experiments. Note that the plane 325c may be inclined at an angle different from that of the plane 325b. The gap bottom 324b of the ratchet claws 324, as illustrated in FIG. 50, can include two planes 324c and 324d, which can define a narrow recess formed to come away from the tip of the ratchet claws 324, in consistency with the engaging edge 325a. This structure operates to limit the play of the flange 320. Consequently the force for the film advancement can be sufficiently raised. Durability of the engaging edge 325a of the engaging openings 325 is also raised.

Figure 51:
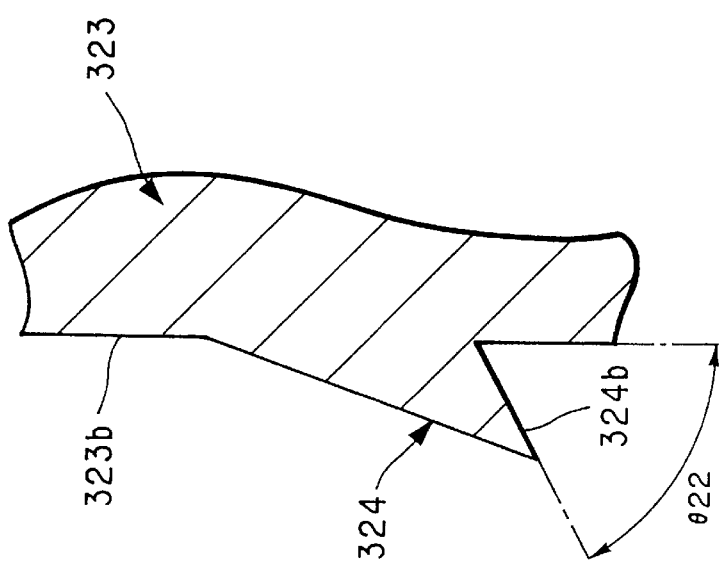
FIG. 51 is a cross section illustrating a variant ratchet claw.

In the above embodiments, the ratchet claws 324 have the hook shape. However, the ratchet claw 324 can have a triangular shape as illustrated in FIG. 51. The θ22 of the gap bottom 324b for contact with the engaging edge 325a of the engaging openings 325 can be in the range of 40–70 degrees.

In the above embodiments, the ratchet claws 324 are formed integrally with the barrel 323 having the indicator mechanism. The ratchet claw can also be formed integrally with a barrel member without any indicator mechanism.

In the embodiments of FIGS. 14–21, the flanges 119 and 120 have no portion having remarkably smaller thickness. Other preferred embodiments having the bent portions C1, C2 and C3 with reduced thickness are described with reference to FIGS. 52–58. Elements similar to those in the above embodiments are designated with identical reference numerals.

Figure 52:
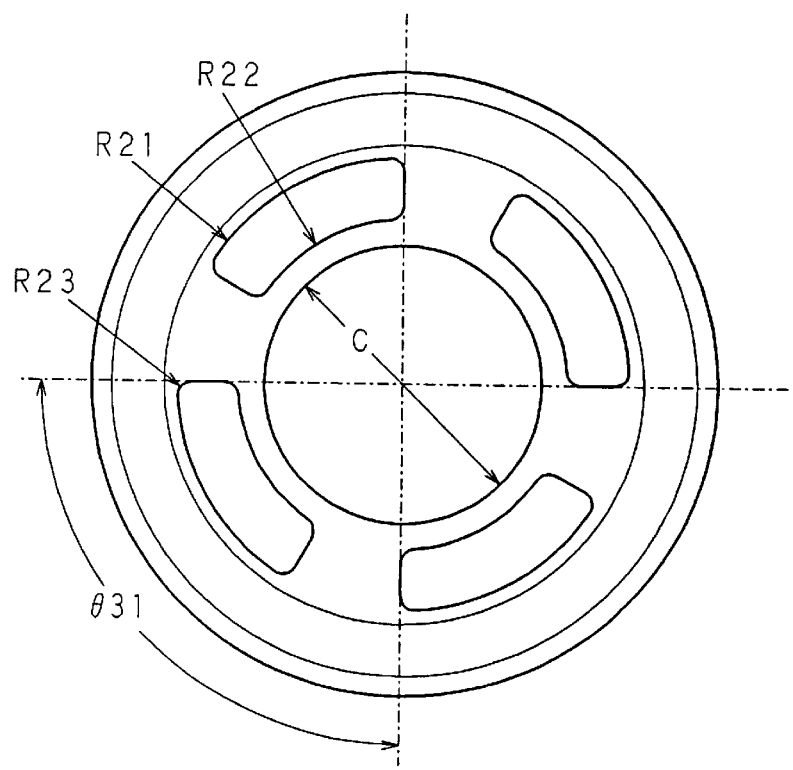
FIG. 52 is a side elevation illustrating a flange of another preferred embodiment.
Figure 53:
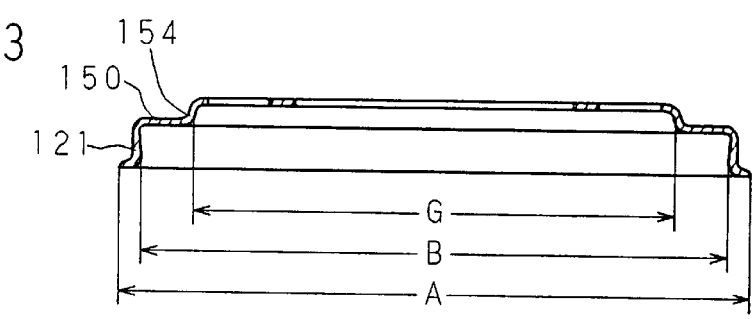
FIG. 53 is a cross section illustrating the flange of FIG. 52.

In FIG. 52 and 53, the flange 120 has dimensions of A=18.24 mm, B=17.06 mm, C=8.14 mm, and G=14 mm. An angle θ31 is 50 degrees. Radii of curvatures are R21=5.6 mm, R22=4.8 mm, and R23=0.4 mm. A reference numeral 150 designates an outer ring-like wall. A reference numeral 154 designates a ring-like rise portion.

In the present embodiments, at least one of the ring-like rise portion 154 and the three bent portions C1–C3 has thickness t2, tc1–tc3 smaller than thickness t3 of the outer ring-like wall 150.

Figure 54:
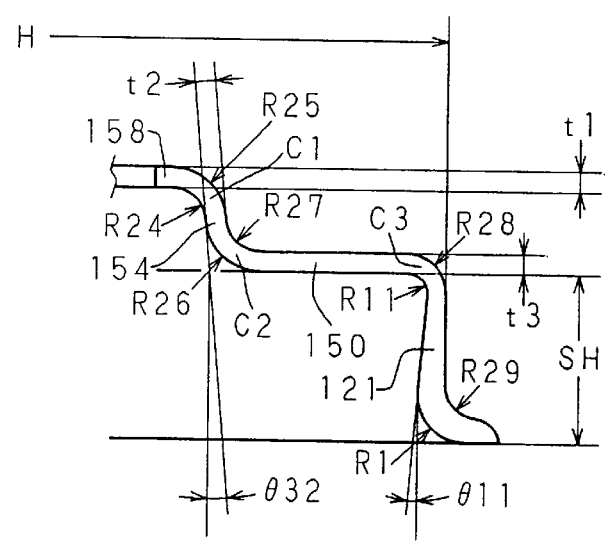
FIG. 54 is a cross section in enlargement, illustrating peripheral portions of the flange of FIGS. 52 and 53.

In FIG. 54 depicting part of the same flange 120, H=17.46 mm, SH=1.40 mm, t1=0.15 mm, t2=0.15 mm, t3=0.15 mm, R1=0.35 mm, R11=0.15 mm, R24=0.25 mm, R25=0.40 mm, R26=0.4 mm, R27=0.25 mm, R28=0.3 mm, R29=0.25 mm, θ11 is 5 degrees, and θ32 is 5 degrees.

Figure 55:
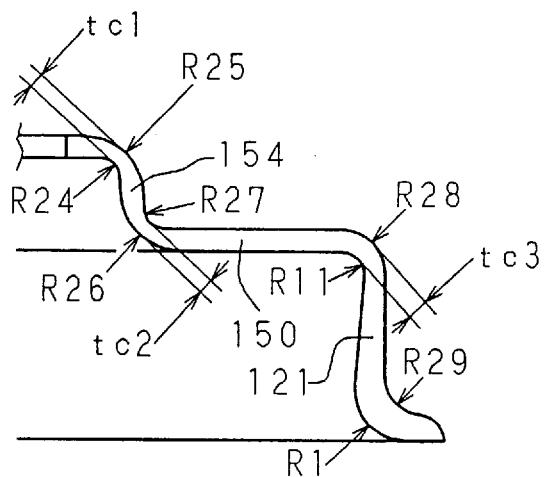
FIGS. 55–58 are cross sections in enlargement, illustrating peripheral portions of respective variant flanges.

FIGS. 55–58 illustrate variants of determining the sizes R1, R11, R24–R29 and tc1–tc3. In FIG. 55, R1=0.35 mm, R11=0.15 mm, R24=0.12 mm, R25=0.4 mm, R26=0.4 mm, R27=0.12 mm, R28=0.3 mm, R29=0.25 mm, tc1=tc2=0.10 mm, and tc3=0.15 mm.

Figure 56:
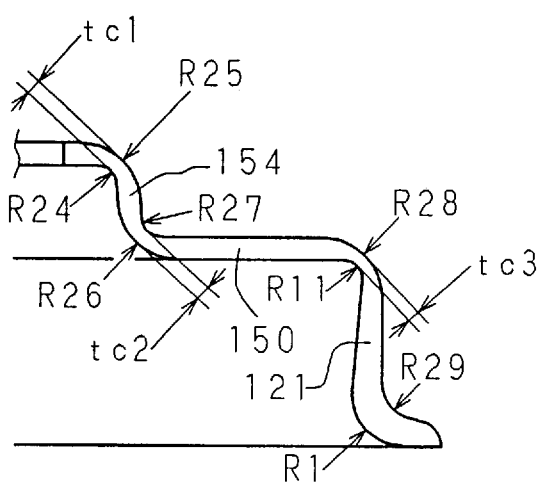

In FIG. 56, R1=0.35 mm, R11=0.12 mm, R24=0.12 mm, R25=0.4 mm, R26=0.4 mm, R27=0.12 mm, R28=0.3 mm, R29=0.25 mm, tc1=tc2=0.10 mm, and tc3=0.10 mm.

Figure 57:
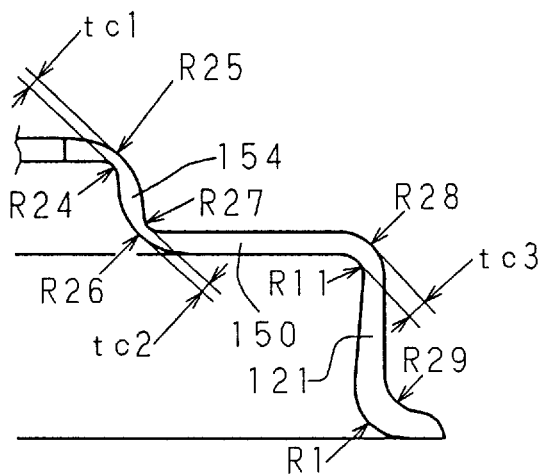

In FIG. 57, R1=0.35 mm, R11=0.15 mm, R24=0.1 mm, R25=0.455 mm, R26=0.455 mm, R27=0.1 mm, R28=0.3 mm, R29=0.25 mm, tc1=tc2=0.07 mm, and tc3=0.15 mm.

Figure 58:
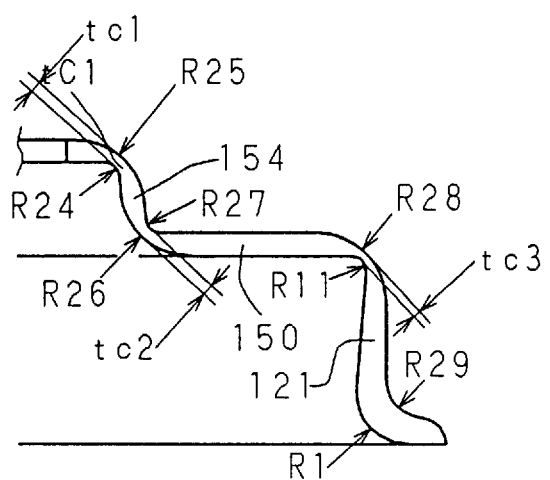

In FIG. 58, R1=0.35 mm, R11=0.1 mm, R24=0.1 mm, R25=0.455 mm, R26=0.455 mm, R27=0.1 mm, R28=0.455 mm, R29=0.25 mm, tc1=tc2=0.07 mm, and tc3=0.07 mm.

Experiments were conducted regarding the cassettes having various flanges of FIGS. 54–58. The force for drawing the photo film (referred to as "PF property") was evaluated. Durability, occurrence of noises, and creation of resin powder were observed.

TABLE 12

| Thickness | | t1–t3 (mm) of Flange | | | | | |
|---|---|---|---|---|---|---|---|
|  |  | 0.11 | 0.13 | 0.15 | 0.17 | 0.20 | 0.25 |
| No Thinning (tc1 = tc2 = tc3 = t3) | | A | A | B | C | D | D |
| Thinned Bends C1 & C2 (tc3 = t3) | tc1 = tc2 = 0.07 mm | A | A | A | B | C | C |
|  | tc1 = tc2 = 0.10 mm | — | A | A | B | C | D |
|  | tc1 = tc2 = 0.15 mm | — | — | — | C | C or D | D |
| Thinned Blends C1–C3 | tc1 = tc2 = tc3 = 0.07 mm | A | A | A | A | B | C |
|  | tc1 = tc2 = tc3 = 0.10 mm | — | A | A | A | B | C |
|  | tc1 = tc2 = tc3 = 0.15 mm | — | — | — | B | C | D |

In evaluation, A in the TABLE represents "Excellent", B represents "Good", C represents "Fair", and D represents "Failure".

To observe "durability", operation of drawing the photo film out of the cassette shell and subsequently rewinding the photo film into the cassette shell was repeated for times as many as possible. With a flange having t1–t3 of 0.11 mm without any thinning, the drawing/rewinding operation was repeated at 100–200 times. With a flange having t1–t3 of 0.13 mm without any thinning, the drawing/rewinding operation was repeated at 200–400 times. With a flange having t1–t3 of 0.15 mm without any thinning, the drawing/rewinding operation was repeated at 1000 times or more. When flanges of thinned portions was tested, there was no significant difference in results from the flanges without thinning.

To observe the "occurrence of noises", noises in the drawing/rewinding operation was checked. As a result, there was a correlation between the stiffness of the flange and the noise. The volume of the noises was the same as the grades A–D in evaluation of the PF property.

To observe the "creation of resin powder", resin powder was observed after the drawing/rewinding operation repeated for 200 times. The amount of resin powder had results the same as the grades A–D in evaluation of the PF property. In the examples of the grade D, there was a greater ratio of powder of film base and emulsion than flange powder.

It is concluded that, in the present invention, at least one of the ring-like rise portion 154 and the three bent portions C1–C3 has thickness t2, tc1–tc3 smaller than thickness t3 of the outer ring-like wall 150. It is preferred that tc3 and one or two selected from t2, tc1 and tc2 are smaller than t3. It is desirable that all of t2, tc1–tc3 are smaller than t3.

The thickness t3 of the outer ring-like wall 150 is 0.11–0.25 mm. It is preferable that t3 is 0.13–0.18 mm.

The thickness t2, tc1–tc3 are at least 0.07 mm and at most 90% of the thickness t3. Preferably, t2, tc1–tc3 are at most 80% of t3. Desirably, t2, tc1–tc3 are at most 67% of t3.

The inner and outer corners of the three bent portions C1–C3 are rounded at a radius R11, R24–R28 of 0.10–0.40 mm.

It is to be noted that the experiments related to TABLE 12 were conducted after molding the flange 120 in the injection molding conditioned as referred to now.

Molds had a screw diameter of 25 mm. Cylinder temperature and the mold temperature were changed while the injection speed was commonly set as 600 mm per second. Injection pressure and occurrence of burr were observed.

TABLE 13

| | Regular Thickness (mm) | | | |
|---|---|---|---|---|
| | 0.11 | 0.15 | 0.17 | 0.20 |
| Lowest Mold Temperature (°C.) | 145 | 125 | 115 | 110 |
| Lowest Resin | 295 | 285 | 275 | 265 |

TABLE 13-continued

| | Regular Thickness (mm) | | | |
|---|---|---|---|---|
| | 0.11 | 0.15 | 0.17 | 0.20 |
| Temperature (°C.) Injection Pressure (kg/cm²) | 2600 | 2200 | 2000 | 1850 |
| Burr | Much | Little | Little | None |

In the TABLE, the "lowest mold temperature" and the "lowest resin temperature" are values in consideration of possibility of injecting the resin. The "injection pressure" is hydraulic pressure.

With the flange having the bent portions C1 and C2 with smaller thickness tc1=tc2=0.07 mm, the injection pressure was raised at 8% over that of the similar flange without the thinning. With the flange having the bent portions C1 and C2 with smaller thickness tc1=tc2=0.10 mm, the injection pressure was raised at 5% over that of the similar flange without the thinning. With the flange having the bent portions C1–C3 all with smaller thickness tc1–tc3, the injection pressure was raised further at 1–3% over that of the similar flange having only the bent portions C1 and C2 thinner.

There was no problem in the flanges thinned locally at the bent portions, because there were little change in the conditions of the injection molding.

Further experiments were conducted regarding the same flanges while changing the modulus in elasticity of the resin. The force for drawing the photo film (referred to as "PF property") was evaluated. The thickness t3 was commonly set as 0.15 mm. The examples of resins were acrylonitrilebutadiene-styrene (ABS).

TABLE 14

| Resins | P | Q | R | S | T | U | V |
|---|---|---|---|---|---|---|---|
| Modulus in Elasticity in Flexure (kg/cm²) | 13000 | 15000 | 17000 | 22000 | 27000 | 32000 | 37000 |
| tc1 = tc2 = tc3 = t3 | A | A | A | B | C | D | D |
| tc3 = t3, tc1 = tc2 = 0.10 mm | A | A | A | A | B | C | D |
| tc1 = tc2 = tc3 = 0.10 mm | A | A | A | A | A | B | C |

The seven examples P–V of ABS resin in the TABLE are as follows:
P: MONKALLOY N-NX45 (trade name, manufactured by Mitsubishi Chemical Industries Ltd.);
Q: MALECCA B20 (trade name, manufactured by Denki Kagaku Kogyo K.K.);
R: TOYOLAC 930 (trade name, manufactured by Toray Industries, Inc.);
S: CYCOLAC EX10U (trade name, manufactured by Ube Cycon, Ltd.);
T: TUFREX TFX-220 (trade name, manufactured by Mitsubishi Chemical Industries Ltd.);
U: STYLAC ABS GF R420A (trade name, manufactured by Asahi Chemical Industry Co., Ltd.);
V: PLASFIL HD417 (trade name, manufactured by Ube Cycon, Ltd.).

As a result of the experiments, the PF property can be sufficiently low even though the resin has greater modulus in elasticity. This is because of reduction of tc1 and tc2, or all of tc1–tc3. The present invention is effective in enlarging a number of kinds of usable resins. Resin having greater modulus in elasticity naturally has high resistance to heat. It is possible to use resin for flanges with high durability under a condition of high temperature.

It is concluded that the flange 120 in the present invention is formed from resin which has modulus in elasticity in flexure being 13,000–30,000 kg/cm$^2$. Preferred modulus in elasticity in flexure is 15,000–25,000 kg/cm$^2$.

Although the present invention has been fully described by way of the preferred embodiments thereof with reference to the accompanying drawings, various changes and modifications will be apparent to those having skill in this field. Therefore, unless otherwise these changes and modifications depart from the scope of the appended claims, they should be construed as being included therein.

What is claimed is:

1. A photo film cassette for containing photo film, comprising:
    a spool core, on which said photo film is wound in a form of roll;
    a cassette shell for containing said spool core in rotatable fashion;
    first and second flanges, respectively secured to first and second ends of said spool core, for regulating positions of sides of said roll;
    a first ring-like lip, formed integrally with a periphery of said first flange, projected toward said roll, contacted on one edge of an outermost turn of said roll, for preventing said roll from being loosened;
    said first and second flanges being formed from resin in accordance with injection molding, said resin having a temperature of thermal deformation of at least 90° C. under a pressure of 18.6 kg/cm$^2$, a modulus in elasticity in flexure in the range of 13,000–30,000 kg/cm$^2$, a surface hardness of at least 80 in Rockwell R-scale, and high fluidity in molds for said injection molding;
    wherein said resin is at least one selected from among nylon-modified polyophenyl ether, polystyrene-modified polyphenyl ether, polyolefin-modified polyphenyl ether, polyacetal, polycarbonate, nylon, modified nylon, alloy of polyphenylene sulfide and polyphenyl ether, alloy of polyphenylene sulfide and polybutylene terephthalate, alloy of polyphenyl ether and liquid crystal resin, and mixture of polyphenylene sulfide and glass fiber or glass bead; and
    said first and second flanges having an outer diameter of at least 15 mm, a maximum thickness of 0.3 mm, and a maximum projected area of 100 mm$^2$ as measured with a contour thereof kept substantially circular.

2. A photo film cassette as defined in claim 1, further comprising:
    a second ring-like lip, formed integrally with a periphery of said second flange, projected toward said roll, contacted on one edge of said outermost turn of said roll, for preventing said roll from being loosened;
    a separator device for releasing a leader of said photo film from regulation of said first ring-like lip in response to rotation of said spool core, so as to enable said leader to advance to an outside of said cassette shell.

3. A photo film cassette as defined in claim 1, further comprising:
    plural engaging openings formed in said first flange and arranged about said spool core;
    a barrel member secured to said spool core and contacted on an exterior face of said first flange; and
    a ratchet claw formed on said barrel member, including:
        a claw base portion projected from said barrel member toward said first flange; and a claw tip portion formed on said claw base portion, projected in a rotational direction of unwinding said photo film about said spool core, engaged with one of said engaging openings when said spool core is rotated in said unwinding direction, to transmit rotation of said spool core to said first flange, said ratchet claw being free from said one engaging opening during rotation of said spool core in a winding direction.

4. A photo film cassette as defined in claim 3, wherein said ratchet claw has an inclined face inclined in a single direction along said rotational direction, and is moved past said engaging openings during said rotation of said spool core in said winding direction; and
    said engaging openings have an edge which includes a substantially straight portion directed radially with reference to an axis of said spool core, and engageable with said ratchet claw.

5. A photo film cassette as defined in claim 1, wherein said flanges are formed by injection/compression molding in accordance with which said resin is injected into a set of molds, and subsequently said resin is compressed within said molds.

6. A photo film cassette as defined in claim 1, further comprising:
    a circular bearing hole, formed in a middle of each of said flanges, for insertion of said spool core;
    wherein molds are adapted to said injection molding of said flange;
    a central gate is disposed in said molds, located in association with said bearing hole, and said resin of said flange being injected through said central gate for said injection molding; and
    during said injection molding, a portion at said central gate is cut away from a piece molded within said molds, to produce said flange with said bearing hole.

7. A photo film cassette as defined in claim 1, wherein molds are adapted to said injection molding of each of said flanges;
    a reference projected face is formed on a molded piece molded within said molds and at a portion for being scrapped after said injection molding;
    said scrap portion being cut away from said molded piece with reference to said reference projected face, to form said flange;
    wherein said reference projected face is inclined from a middle of said molded piece, and defined around in a frustum of a cone or a frustum of a pyramid; and
    said scrap portion being cut away to define a bearing hole through which said spool core is inserted.

8. A photo film cassette for containing photo film, comprising:
    a spool core, on which said photo film is wound in a form of roll;
    a cassette shell for containing said spool core in rotatable fashion;
    first and second flanges, respectively secured to first and second ends of said spool core, for regulating positions of sides of said roll;
    a ring-like lip, formed integrally with a periphery of said first flange, projected toward said roll, contacted on one edge of an outermost turn of said roll, for preventing said roll from being loosened;

said first and second flanges being formed respectively by a set of two molds in accordance with injection molding;

said ring-like lip having an inside face contacted with said outermost turn of said roll, said inside face being inclined at an angle of 2–10 degrees to come nearer to said spool core in a projected direction of said ring-like lip from said first flange, and said ring-like lip having thickness increasing in said projected direction; and said ring-like lip having an outside face opposite to said inside face, said outside face being inclined at an angle of 0–3 degrees to come farther from said spool core in said projected direction of said ring-like lip.

9. A photo film cassette as defined in claim 8, wherein a root portion of said ring-like lip close to said first flange is 0.07–0.25 mm thick, and an inner corner formed between said ring-like lip and said first flange is rounded at a radius of 0.2–0.4 mm;

further comprising a ring-like projection formed on a periphery of said ring-like lip in a radial direction of said first flange, said ring-like projection having thickness increasing in said radial direction of said first flange.

10. A photo film cassette as defined in claim 8, wherein said first flange further includes:

a first ring-like wall which is substantially flat and substantially perpendicular to an axis of said spool core, and around which said ring-like lip is formed;

a ring-like rise portion, formed on an inside of said first ring-like wall, to rise away from said roll; and a second ring-like wall which is substantially flat and substantially parallel with said first ring-like wall, and which is formed on a farther edge of said ring-like rise portion from said roll;

a first bent portion being defined between said ring-like lip and said first ring-like wall;

a second bent portion being defined between said first ring-like wall and said ring-like rise portion;

a third bent portion being defined between said ring-like rise portion and said second ring-like wall;

wherein at least one of said ring-like rise portion and said first to third bent portions has first thickness smaller than second thickness of said first ring-like wall.

11. A photo film cassette as defined in claim 10, wherein said second thickness of said first ring-like wall is 0.11–0.25 mm;

said first thickness is at least 0.07 mm and at most 90% of said second thickness;

inner and outer corners of said first to third bent portions are rounded at a radius of 0.10–0.40 mm; and said first flange is formed from resin having modulus in elasticity in flexure being 13,000–30,000 kg/cm$^2$.

12. A photo film cassette for containing photo film, comprising:

a spool core, on which said photo film is wound in a form of roll;

a cassette shell for containing said spool core in rotatable fashion;

first and second flanges, respectively provided with first and second bearing holes formed in a middle thereof, and secured to first and second ends of said spool core;

said first and second bearing holes being punched in flange disk pieces to be said first and second flanges by use of a punch device, said punch device punching said first and second bearing holes by moving relative to said flange disk pieces in a direction equal to a direction of relative movement of said spool core in insertion through said first and second flanges; and wherein said flange disk pieces are molded in accordance with injection molding;

said resin having a temperature of thermal deformation of at least 90° C. under a pressure of 18.6 kg/cm$^2$, a modulus in elasticity in flexure in the range of 13,000–30,000 kg/cm$^2$, a surface hardness of at least 80 in Rockwell R-scale, and high fluidity in molds for said injection molding;

said first and second flanges having an outer diameter of at least 15 mm, a maximum thickness of 0.3 mm, and a maximum projected area of 100 mm$^2$ as measured with a contour thereof kept substantially circular; and wherein said resin is at least one selected from among nylon-modified polyphenyl ether, polystyrene-modified polyphenyl ether, polyolefin-modified polyphenyl ether, polyacetal, polycarbonate, nylon, modified nylon, alloy of polyphenylene sulfide and polyphenyl ether, alloy of polyphenylene sulfide and polybutylene terephthalate, alloy of polyphenyl ether and liquid crystal resin, and a mixture of polyphenylene sulfide and glass fiber or glass bead.

13. A photo film cassette as defined in claim 12, wherein said first and second flanges are moved in directions opposite to one another relative to said spool core before being secured to said spool core.

14. A photo film cassette as defined in claim 12, wherein said first and second flanges are moved in one common direction relative to said spool core before being secured to said spool core.

15. A photo film cassette as defined in claim 12, further comprising a first circular recess formed in each of said flange disk pieces by said injection molding, and in a face of said flange disk piece opposite to a face receiving said punch device, associated with each of said bearing holes, said flange disk piece being punched along said first circular recess to form said bearing hole.

16. A photo film cassette as defined in claim 15, wherein said first circular recess has a ring shape.

17. A photo film cassette as defined in claim 15, further comprising:

a second circular recess formed in each of said flange disk pieces by said injection molding, and in said punch-receiving face of said flange disk piece, associated with each of said bearing holes; and a first circular sloped portion formed at said punch-receiving face of said flange disk piece and by cutting away a circular edge around said second circular recess in inclination.

18. A photo film cassette as defined in claim 17, further comprising a second circular sloped portion formed at said face opposite to said punch-receiving face of said flange disk piece and by cutting away a circular edge around said first circular recess in inclination.

19. A photo film cassette as defined in claim 12, further comprising a ring-like lip, formed integrally with a periphery of said first flange, projected toward said roll, contacted on one edge of an outermost turn of said roll, for preventing said roll from being loosened;

said ring-like lip having an inside face contacted with said outermost turn of said roll, said inside face being inclined at an angle of 2–10 degrees to come nearer to said spool core in a projected direction of said ring-like lip from said first flange, and said ring-like lip having thickness increasing in said projected direction; and said ring-like lip having an outside face opposite to said inside face, said outside face being inclined at an angle of 0–3 degrees to come farther from said spool core in said projected direction of said ring-like lip.

20. A photo film cassette for containing photo film, comprising:

a spool core, on which said photo film is wound in a form of a roll;

a cassette shell for containing said spool core in rotatable fashion;

first and second flanges, respectively provided with first and second bearing holes formed in a middle thereof, and secured to first and second ends of said spool core;

plural engaging openings formed in said first flange and arranged about said first bearing hole, and formed in injection molding for said first flange;

a barrel member secured to said spool core and contacted on an exterior face of said first flange;

a ratchet claw disposed on said barrel member, including: a claw base portion projected from said barrel member toward said first flange; and a claw tip portion formed on said claw base portion, projected in a rotational direction of unwinding said photo film about said spool core, engaged with one of said engaging openings when said spool core is rotated in said unwinding direction, to transmit rotation of said spool core to said first flange, said ratchet claw being free from said one engaging opening during rotation of said spool core in a winding direction;

a gap bottom defined on said ratchet claw and between said claw tip portion and said barrel member, formed in inclination, and contacted on an engaging edge of said engaging openings in said unwinding direction; and said engaging edge of said engaging openings being inclined in a direction of being fitted on said gap bottom;

said first and second flanges being formed from resin, said resin having a temperature of thermal deformation of at least 90° C. under a pressure of 18.6 kg/cm$^2$, a modulus in elasticity in flexure in the range of 13,000–30,000 kg/cm$^2$, a surface hardness of at least 80 in Rockwell R-scale; and wherein said resin is at least one selected from among nylon-modified polyphenyl ether, polystyrene-modified polyphenyl ether, polyolefin-modified polyphenyl ether, polyacetal, polycarbonate, nylon, modified nylon, alloy of polyphenylene sulfide and polyphenyl ether, alloy of polyphenylene sulfide and polybutylene terephthalate, alloy of polyphenyl ether and liquid crystal resin, and mixture of polyphenylene sulfide and glass fiber or glass bead.

21. A photo film cassette as defined in claim 20, wherein said gap bottom is inclined to come in said unwinding direction about said spool core while coming away from said barrel member, and when said spool core is rotated in said unwinding direction, said gap bottom causes said first flange to come toward said barrel member.

22. A photo film cassette as defined in claim 20, wherein said gap bottom and said engaging edge are inclined at angle of 40–70 degrees with reference to said unwinding direction about said spool core.

23. A photo film cassette as defined in claim 20, wherein a space between said claw tip portion and said barrel member is greater by 0.02–0.1 mm than thickness of said first flange about said engaging openings.

24. A photo film cassette as defined in claim 20, wherein said gap bottom has a V-shaped groove, defined by two substantially plane surfaces intersecting one another, for deepening said gap bottom toward a middle position between said claw tip portion and said barrel member; and said engaging edge has a V-shaped ridge, defined by two substantially plane surfaces intersecting one another, and fitted in said V-shaped groove.

25. A photo film cassette as defined in claim 20, wherein said ratchet claw has a shape of an obtuse triangle, and said gap bottom is one side of said triangle.

26. A photo film cassette for containing photo film, comprising:

a spool core, on which said photo film is wound in a form of roll;

a cassette shell for containing said spool core in rotatable fashion;

first and second flanges, respectively formed in accordance with injection molding, provided with first and second bearing holes formed in a middle thereof, secured to first and second ends of said spool core, for regulating positions of sides of said roll;

a ring-like lip, formed integrally with a periphery of said first flange, projected toward said roll, contacted on one edge of an outermost turn of said roll, for preventing said roll from being loosened;

a ring-like projection formed on a periphery of said ring-like lip in a radial direction of said first flange, said ring-like projection being inclined away from said roll and at an angle of 1–30 degrees with reference to said radial direction of said first flange, and having thickness increasing in said radial direction of said first flange;

said ring-like lip having an inside face contacted with said outermost turn of said roll, and an outside face opposite to said inside face, said outside face being inclined at an angle of 0–3 degrees to come farther from said spool core in a projected direction of said ring-like lip from said first flange.

27. A photo film cassette as defined in claim 26, wherein said first flange is formed from resin, said resin having a melt flow index being at least 70 grams per 10 minutes under moldable temperature and load of 10 kg in accordance with JIS-K-7210, and modulus in elasticity in flexure being 15,000–30,000 kg/cm$^2$;

said ring-like projection has thickness of at least 0.07 mm;

an outermost periphery of said ring-like projection has thickness of 0.1–0.25 mm;

wherein molds are adapted to said injection molding of said first flange;

a central gate is disposed in said molds, located in association with said first bearing hole, and said resin of said first flange being injected through said central gate for said injection molding; and during said injection molding, a portion at said central gate is cut away from a piece molded within said molds, to produce said first flange with said first bearing hole.

* * * * *